United States Patent [19]

Rigoutsos

[11] Patent Number: 5,799,312
[45] Date of Patent: Aug. 25, 1998

[54] THREE-DIMENSIONAL AFFINE-INVARIANT HASHING DEFINED OVER ANY THREE-DIMENSIONAL CONVEX DOMAIN AND PRODUCING UNIFORMLY-DISTRIBUTED HASH KEYS

[75] Inventor: Isidore Rigoutsos, Long Island City, N.Y.

[73] Assignee: International Business Machines Corporation, Armonk, N.Y.

[21] Appl. No.: 786,054

[22] Filed: Jan. 21, 1997

[51] Int. Cl.$^6$ .................................................. G06F 17/30
[52] U.S. Cl. ..................... 707/103; 707/530; 345/423; 345/424
[58] Field of Search ................... 707/1–10, 100–104, 707/200–206, 530; 345/423, 424, 427

[56] References Cited

U.S. PATENT DOCUMENTS

| | | | |
|---|---|---|---|
| 5,602,979 | 2/1997 | Loop | 345/423 |
| 5,734,384 | 3/1998 | Yanof et al. | 345/424 |

OTHER PUBLICATIONS

Ambartzumian, R.V.,Factorization Calculus and Geometric Probabability. Cambridge University Press, 1990, pp. 82–99.

Califano A. et al., "FLASH: A Fast Look–Up Algorithm for String Homology" Computational Approaches Biological Systems. To Appear Feb. 1995.

(List continued on next page.)

*Primary Examiner*—Thomas G. Black
*Assistant Examiner*—Ruay Lian Ho
*Attorney, Agent, or Firm*—Louis J. Percello

[57] ABSTRACT

A uniform distribution of affine invariants (3-tuples) is produced for a plurality of one or more three-dimensional objects. Each of the three-dimensional objects, capable of a plurality of affine transformations, is defined by a set of object points (feature points) selected from an object feature domain. By selecting one or more five-point tuples of the object points, four of the object points divide the object feature domain into a region arrangement of fifteen regions while the fifth point of the five-point tuple lies in one of the fifteen regions and each of the five-point tuples further defines each of the fifteen regions as one of five reentrant polyhedral (RP) arrangements or one of ten non-reentrant polyhedral (NRP) arrangements. A five-point tuple is said to belong to class i if the fifth point of the tuple resides in the i-th of the 15 regions defined by the first four points. A tagger identifies each of the five-point tuples as having one of the arrangements with one of the regions containing the fifth point of the five-point-tuple. During a knowledge accumulation mode, and using either synthetically generated (Monte-Carlo simulation) or real data, an equalizer accumulates knowledge about occupancy patterns incurred by five-point tuples belonging to each of the 15 classes and then derives the necessary remappings that will result in an expected uniform distribution over the range of invariants for all produced invariants. After the knowledge accumulation phase, the equalizer enters its redistribution mode the end-product of which is the creation of a new distribution of affine invariants (3-tuples) that is uniform over the range of invariants. A stacker then stacks the remapped regions to create a complete uniform distribution for all the affine invariants that the transformer produces. The system produces a table which associates combinations of object points (five-point tuples) to affine invariants (3-tuples); the table can be used as the core of an indexing-based store and retrieve system, it can be used to determine and identify over-represented constructs of object points, to determine potential interaction for ligand-receptor complexes, etc.

21 Claims, 53 Drawing Sheets

OTHER PUBLICATIONS

Califano A. et al., "Multidimensional Indexing for Recognizing Visual Shapes" IEEE Trans. on Pattern Analysis & Machie Intel., 16:4, pp. 373–392, 1994.

Faloutsos C. et al., "Beyond Uniformity & Independence: Analysis of R–trees Using the . . . " Proceed. 1994 ACM PODS Conference on Principles of Database Systems, Minneapolis, MN, 1994.

Faloutsos, C., "Gray Codes for Partial Match and Range Queries" IEEE Transactions on Software Engineering, 14:10, 1987.

Flynn,P. et al., "3D Object Recognition Using Invariant Feature Indexing of Interpret . . . " Computer Visions, Graphics,& Image Processing:Image Understanding, 55:2, pp. 119–129, 1992.

Fisanick, W. et al., "Similarity Searching on CAS Registry Substances 1:Global . . . " Journal of Chemical Information & Computer Sciences, vol. 32,No. 6, pp. 664–674, 1992.

Fisanick,W. et al., "Similarity Search On CAS Registry Substances 2:2D Structural Simil . . . " Journal of Chemical Information & Computer Sciences, vol. 34, No. 1, pp. 130–140, 1994.

Gavrila D. et al., "3D Object Recognition From 2D Images Using Geometric Hashing" Pattern Recognition Letters, 13:4, pp. 263–278, 1992.

Guenther O. et al., "Research Issues In Spatial Databases" ACM Sigmod Record, 19:4, pp. 61–67, 1990.

Guttman A., "R–trees: A Dynamic Index Structure For Spatial Searching" Proceedings 1984 ACM Sigmod Conference, pp. 47–57, 1984.

Haralick R., et al., "Optimal Affine–Invariant Matching: Performance Characterization" Proceedings SPIE Conference On Image Storage & Retrieval, San Jose, CA, Jan., 1992.

Haralick, R. et al., "Optimal Affine–Invariant Point Matching" Proc. 6th Israeli Conf. On Artificial Intell. & Computer Vision, Tel Aviv, Isreal Dec. 1989.

Jagadish, H.V. "Linear Clustering of Objects with Multiple Attributes" Proceedings 1990 ACM Sigmod Conference on the Management of Data, Atlantic City, NJ 1990.

Knott, G., "Hashing Functions" The Computer Journal, 18:3, 1975.

Kroll B. et al., "Distributing A Search Structure Among A Growing Number of Processors" Proceedings 1994 ACM Sigmod Conference The Management of Data, pp. 265–276, 1994.

Lamdan Y. et al., "Geometric Hashing: A General & Efficient Model–based Recognition Scheme" Proceedings Int'l Conference on Computer Vision, pp. 238–249, 1988.

Matsliach G. et al., "An Efficient Method For Distributing Search Structures" Proc. First Int'l Conference on Parallel & Distributed Information Systems, pp. 159–166, 1991.

Press, W. et al., "Numerical Recipes in C: The Art of Scientific Computing" Cambridge University Press 1988, pp. 680–689.

Rigoutsos I. et al., "Searching In Parallel For Similar Strings" IEEE Computational Science & Engineering, pp. 60–75, Summer, 1994.

Rigoutsos I. et al., "A Bayesian Approach to Model Matching with Geometric Hashing" Computer Vision & Image Understanding, 61:7, Jul., 1995.

Rigoutsos I. et al., "Several Results on Affine Invariant Geometric Hashing" Proceed. 8th Int'l Conf. on Computer Vision & Artificial Intel., Tel Aviv, Isreal Dec. 1991.

Rigoutsos, I., "Massively Parallel Bayesian Object Recognition" PhD Thesis, New York University, Aug., 1992, pp. v–xii, 71–159, & 184–198.

Rigoutsos, I. et al., "Flexible Substructure Matching & Novel Conformer Generation For . . . " Submitted for Publication to Journal of Computer–Aided Molecular Design, Jun., 1996.

Salzberg, B., "Practical Spatial Database Access Methods" IEEE Symposium on Applied Computing, pp. 82–90, 1991.

Satoh, T. et al., "An Index Structure for Parallel Database Processing" Proceedings 2nd IEEE Workshop on Research Issues On Data Engineering, pp. 224–225, 1992.

Solomon, H. Geometric Probability. Society for Industrial & Applied Mathematics Philadelphia, Pennsylvania, 1978.

Stein F. et al., "Efficient Two–dimensional Object Recognition" Proceed. Int'l conference on Pattern Recognition, pp. 596–600, Atlantic City, NJ Jun., 1990.

Weinshall, D. et al. "3D Object Recognition By Indexing Structural Invariants From . . . " Proceed. Int'l Conference on Computer Vision, pp. 264–268, Berlin, Germany, May, 1993

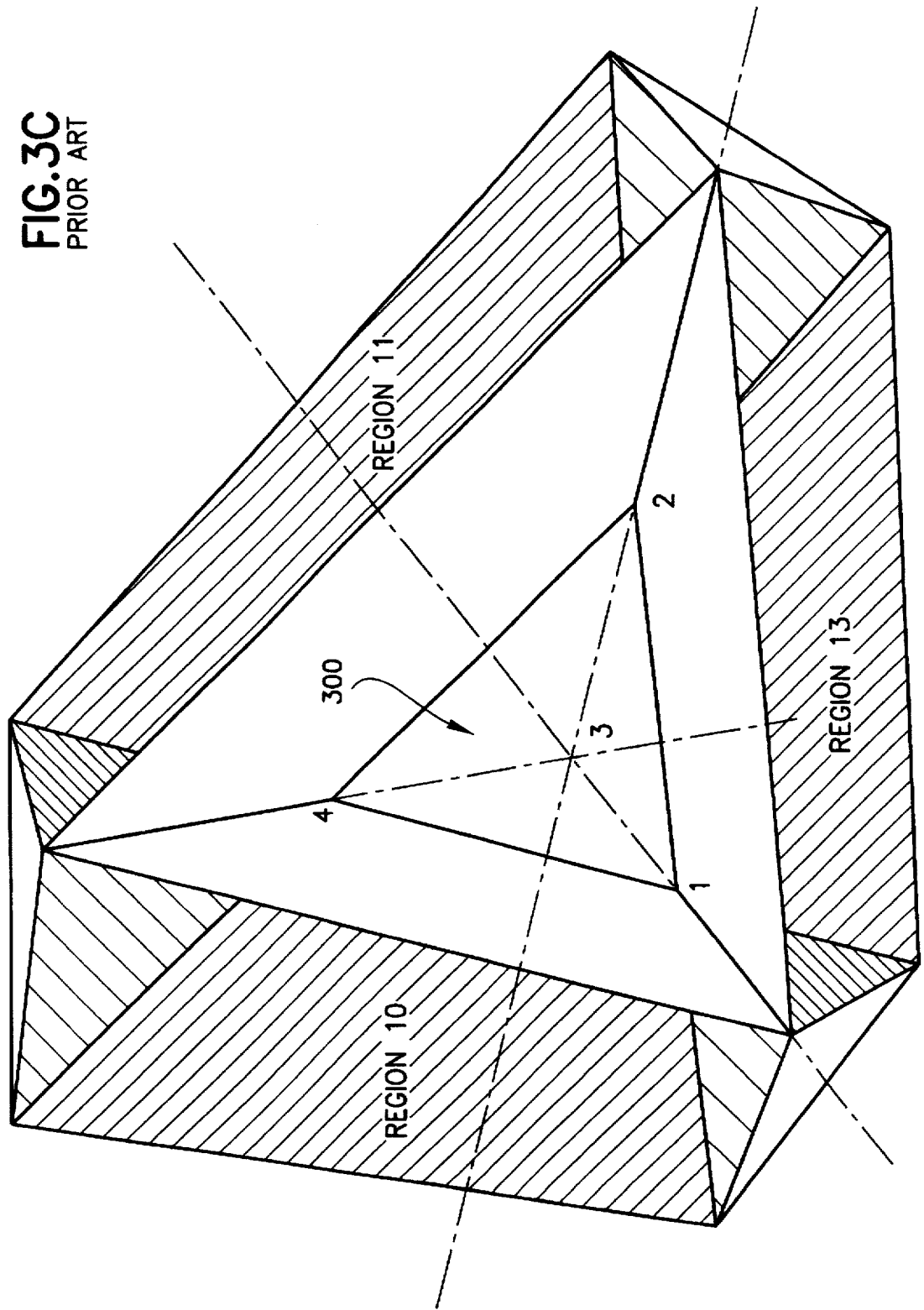

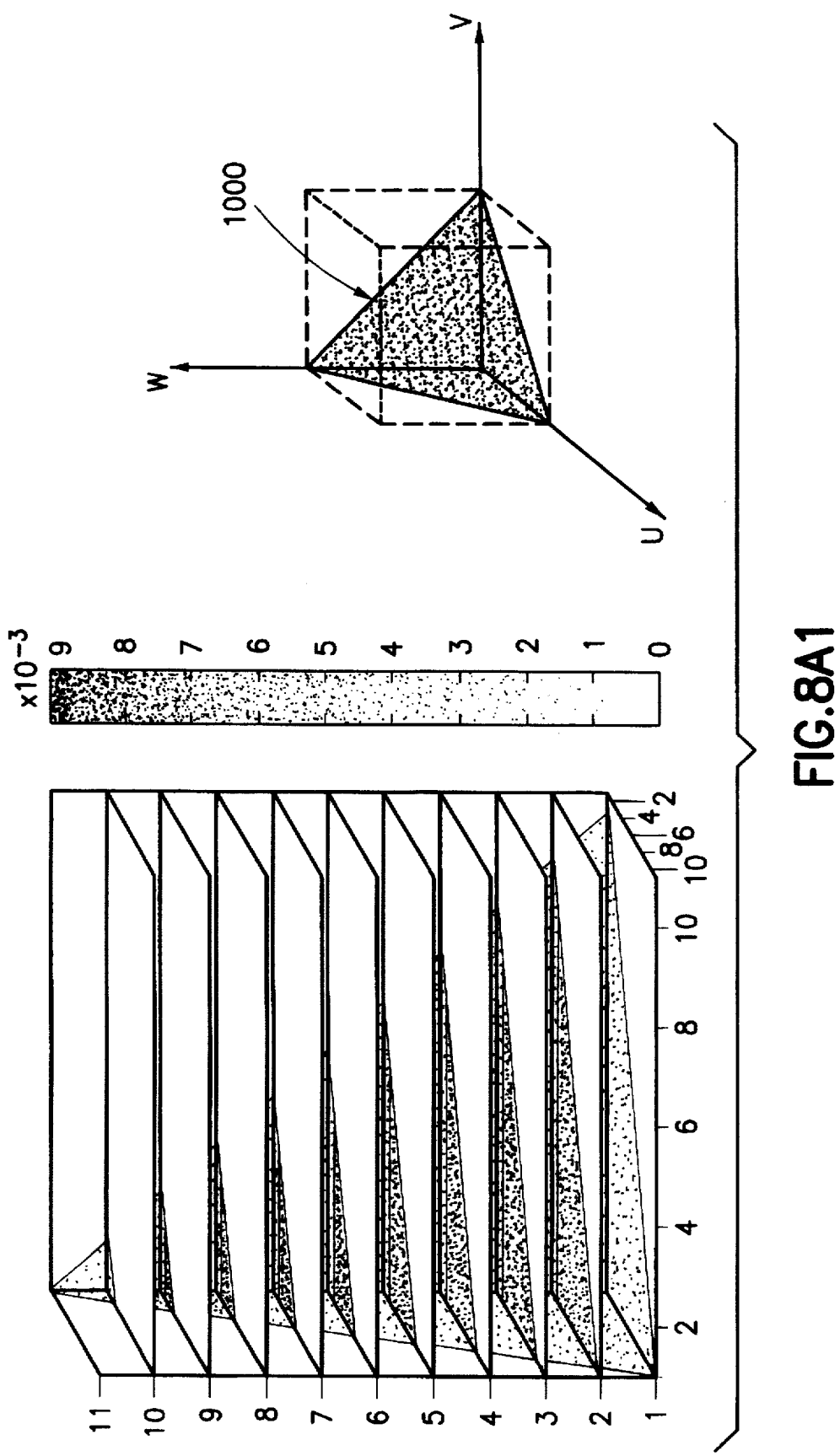
FIG. 8A1

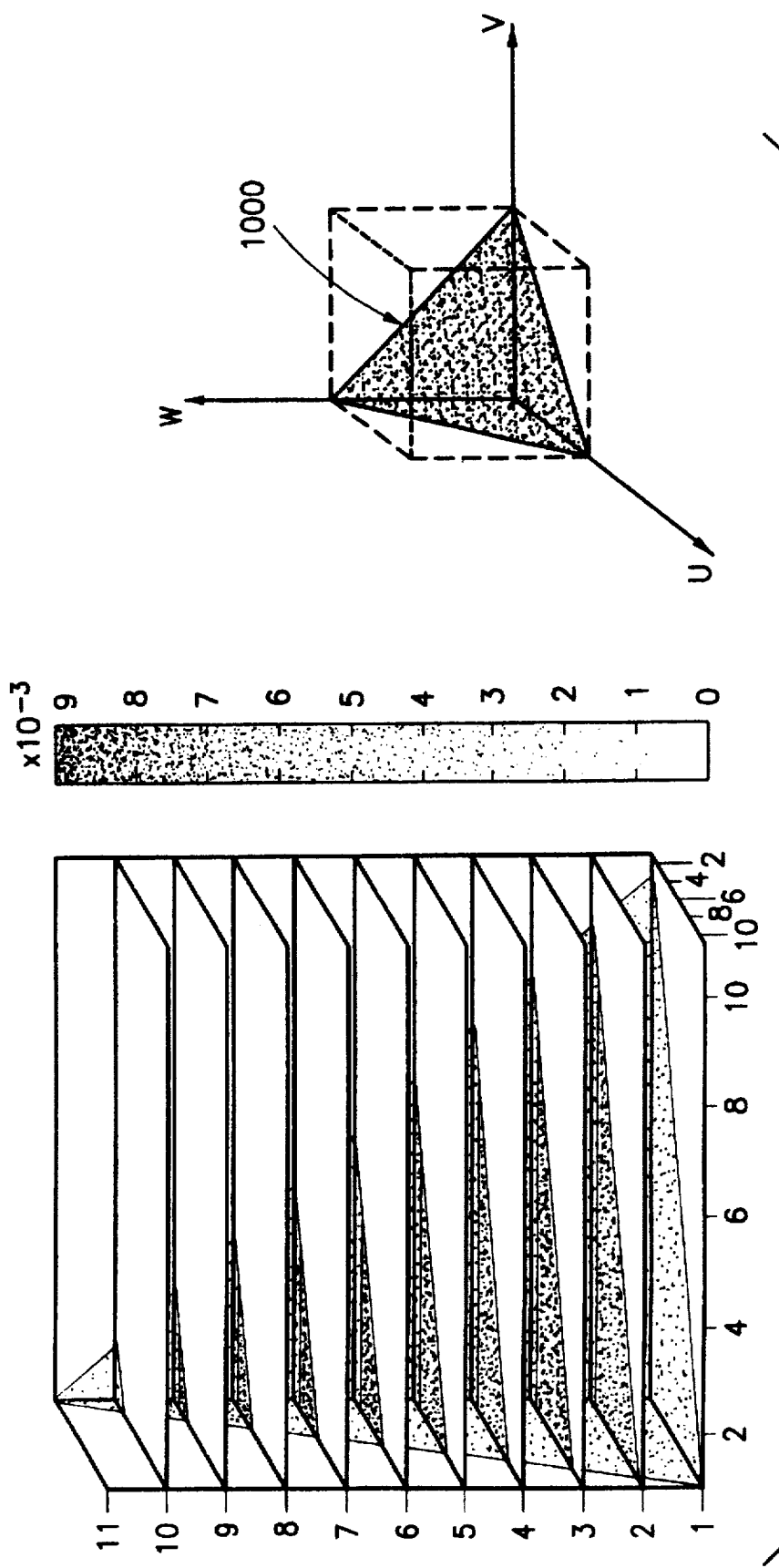
FIG. 8A2

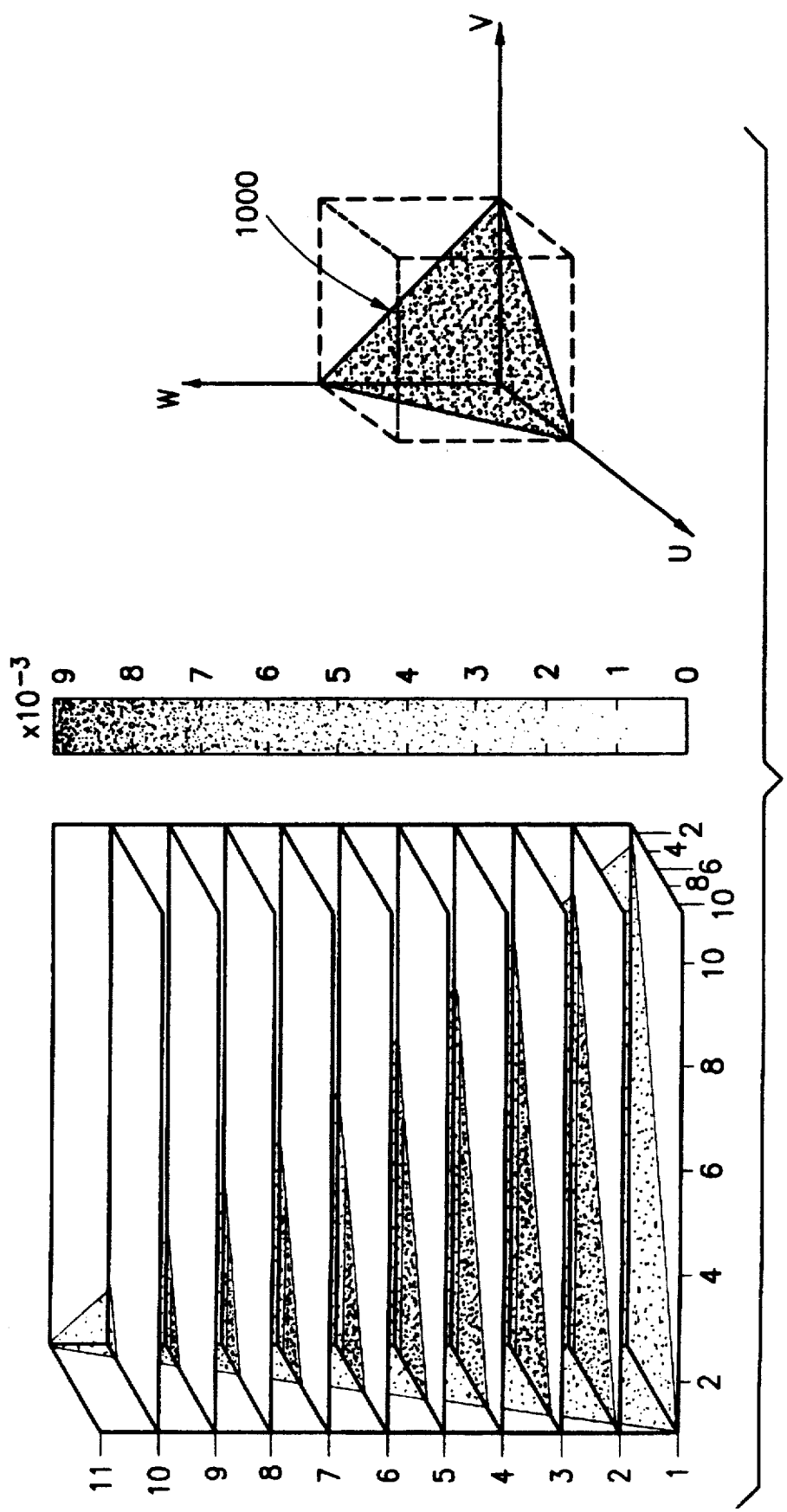
FIG. 8A3

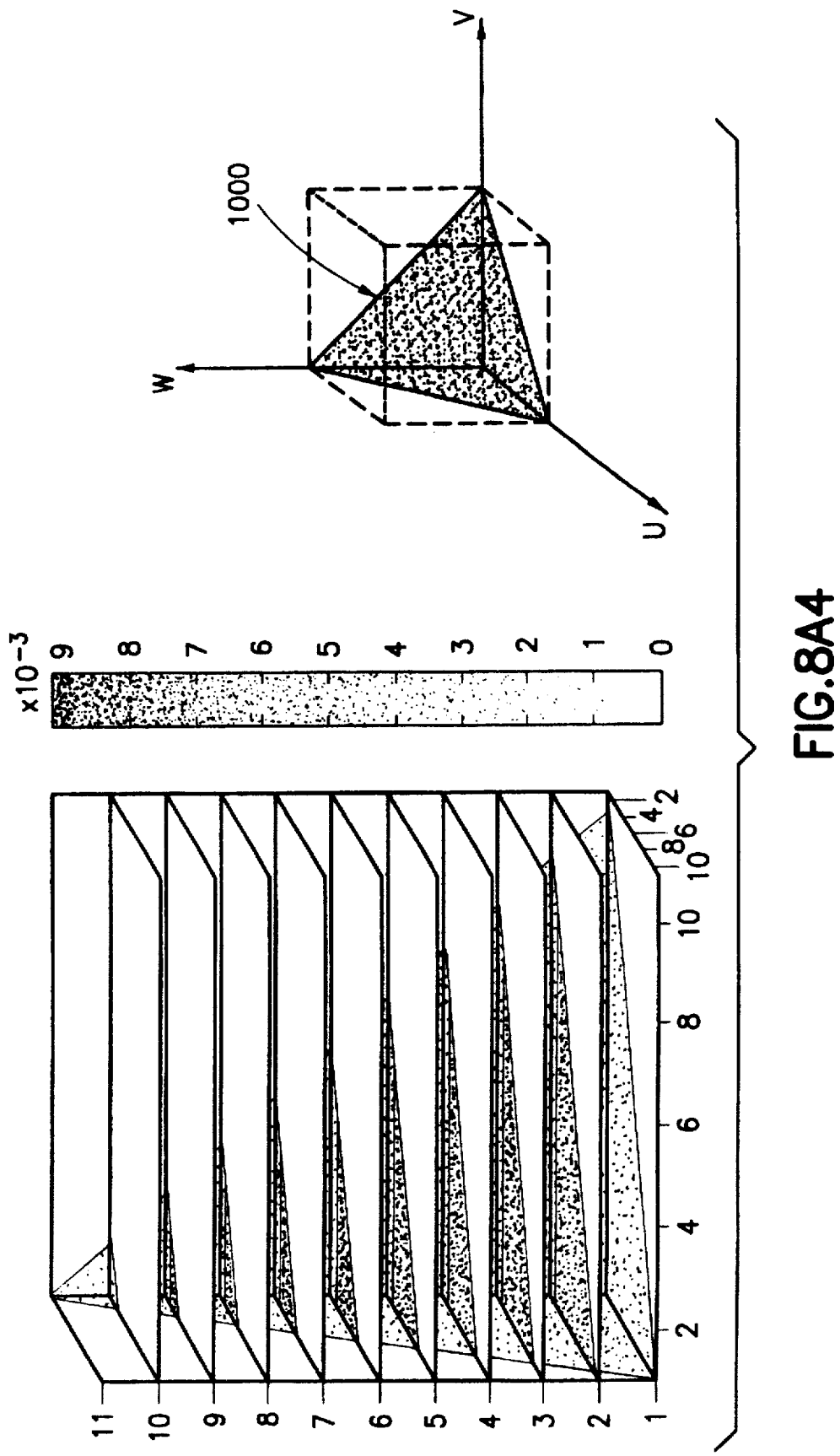
FIG. 8A4

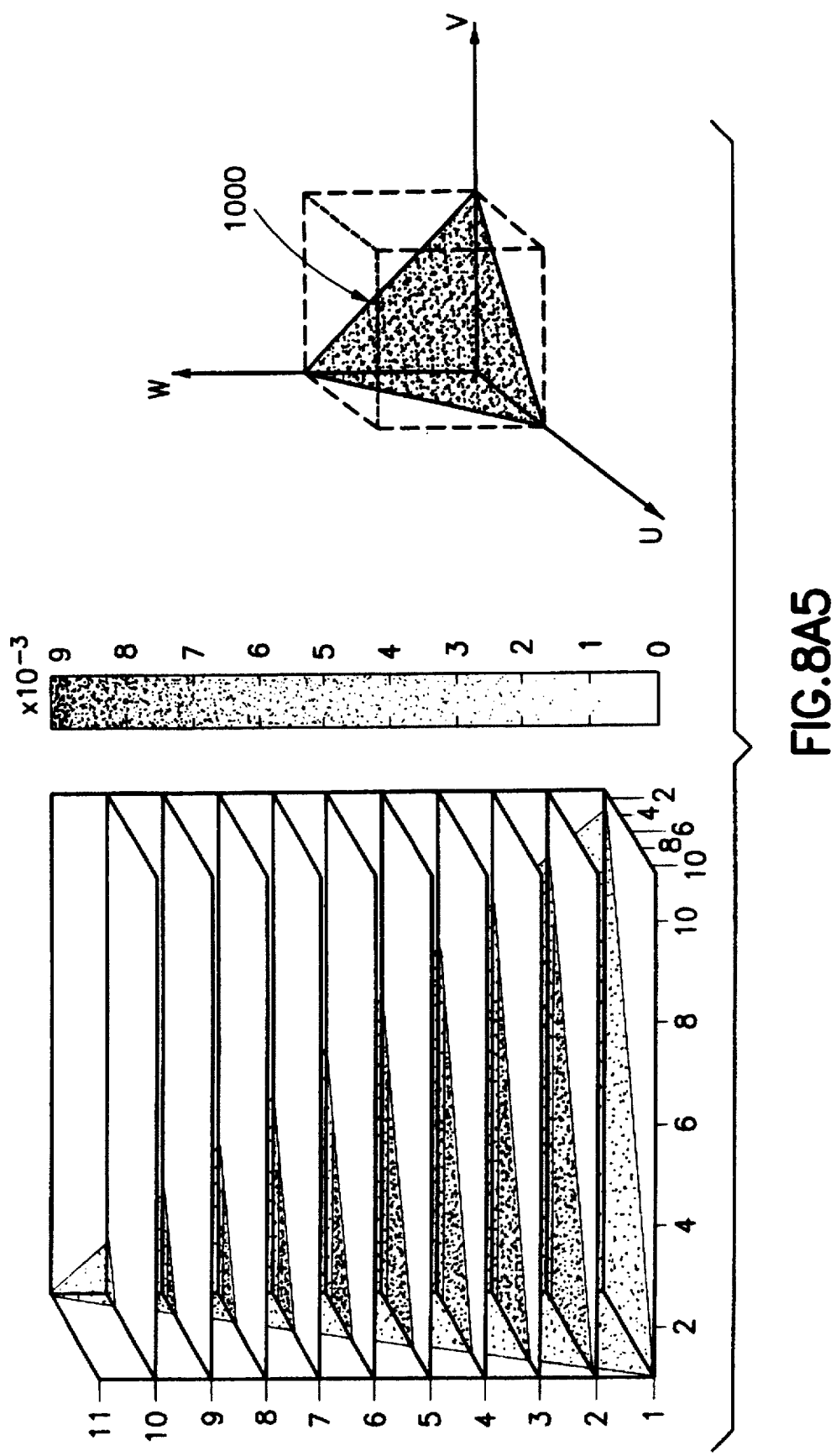
FIG.8A5

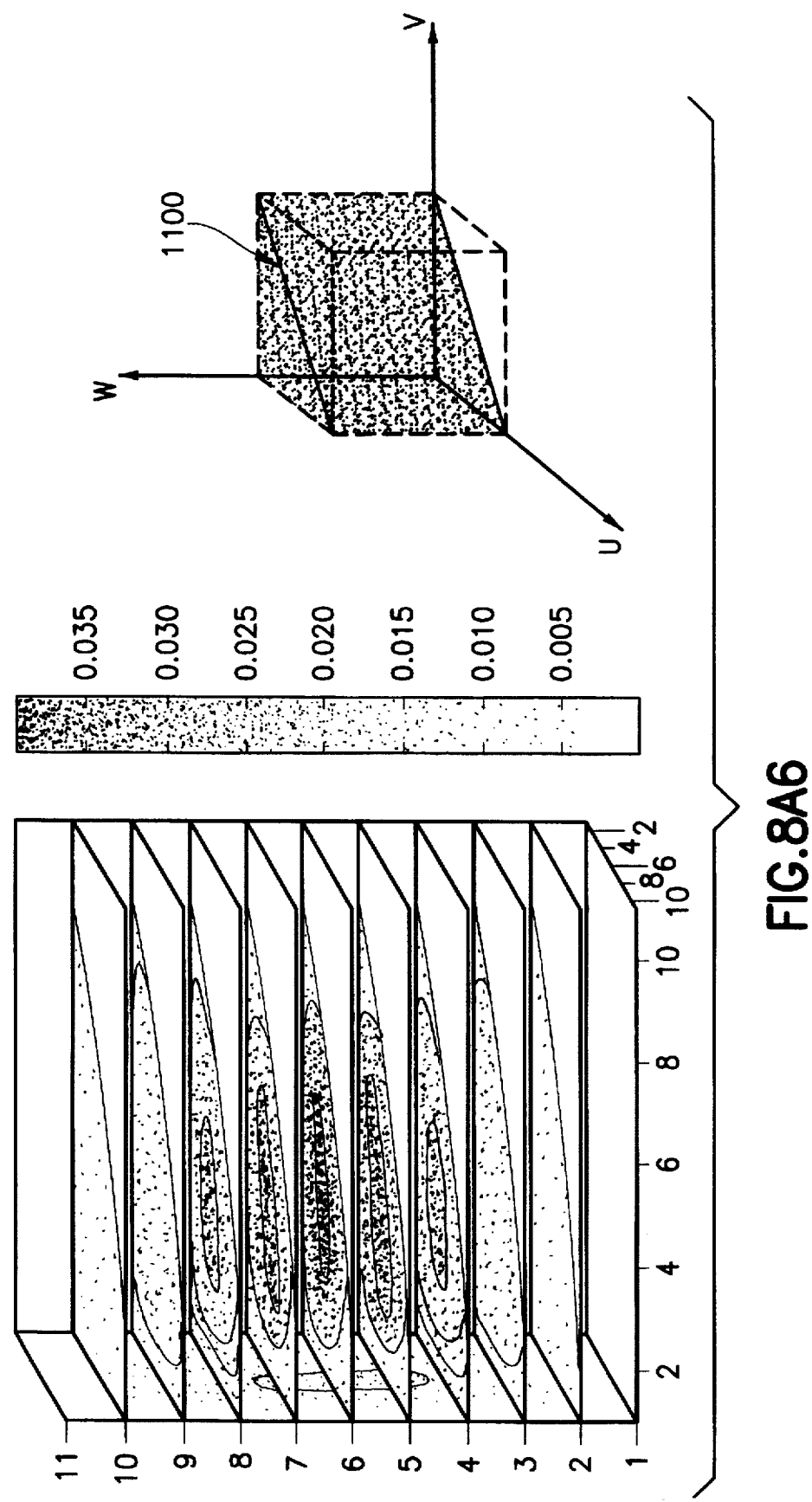
FIG. 8A6

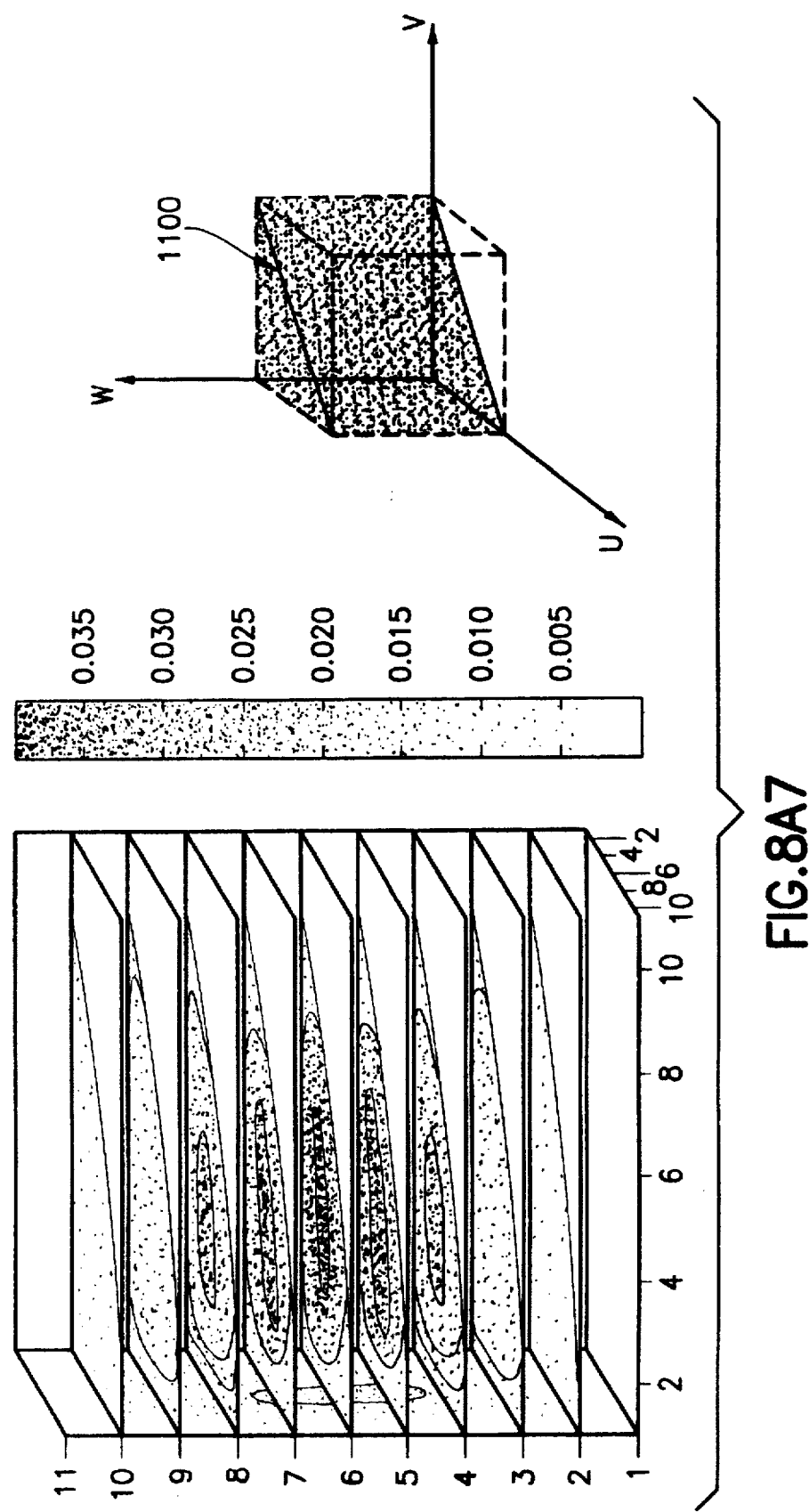
FIG. 8A7

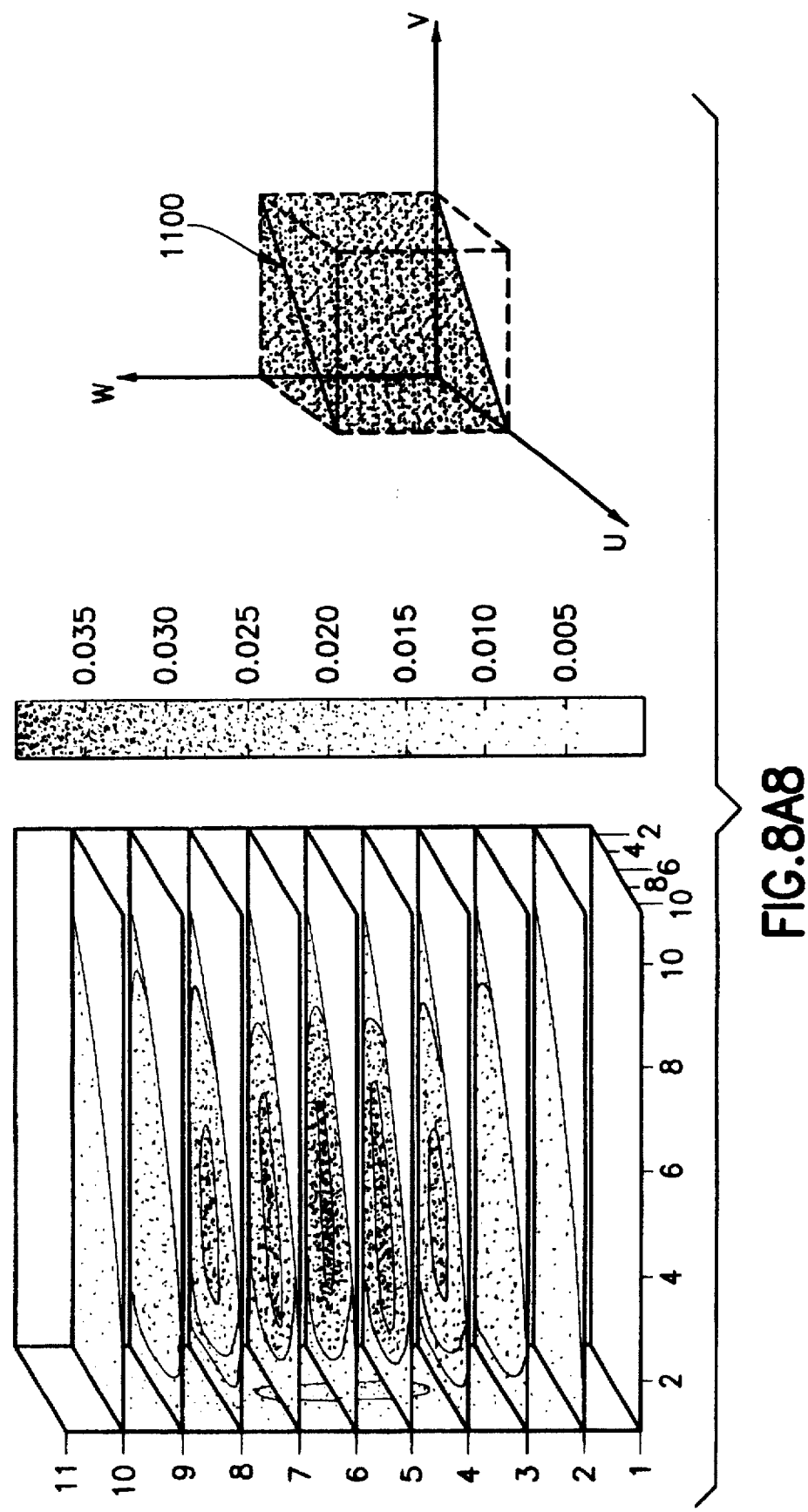
FIG. 8A8

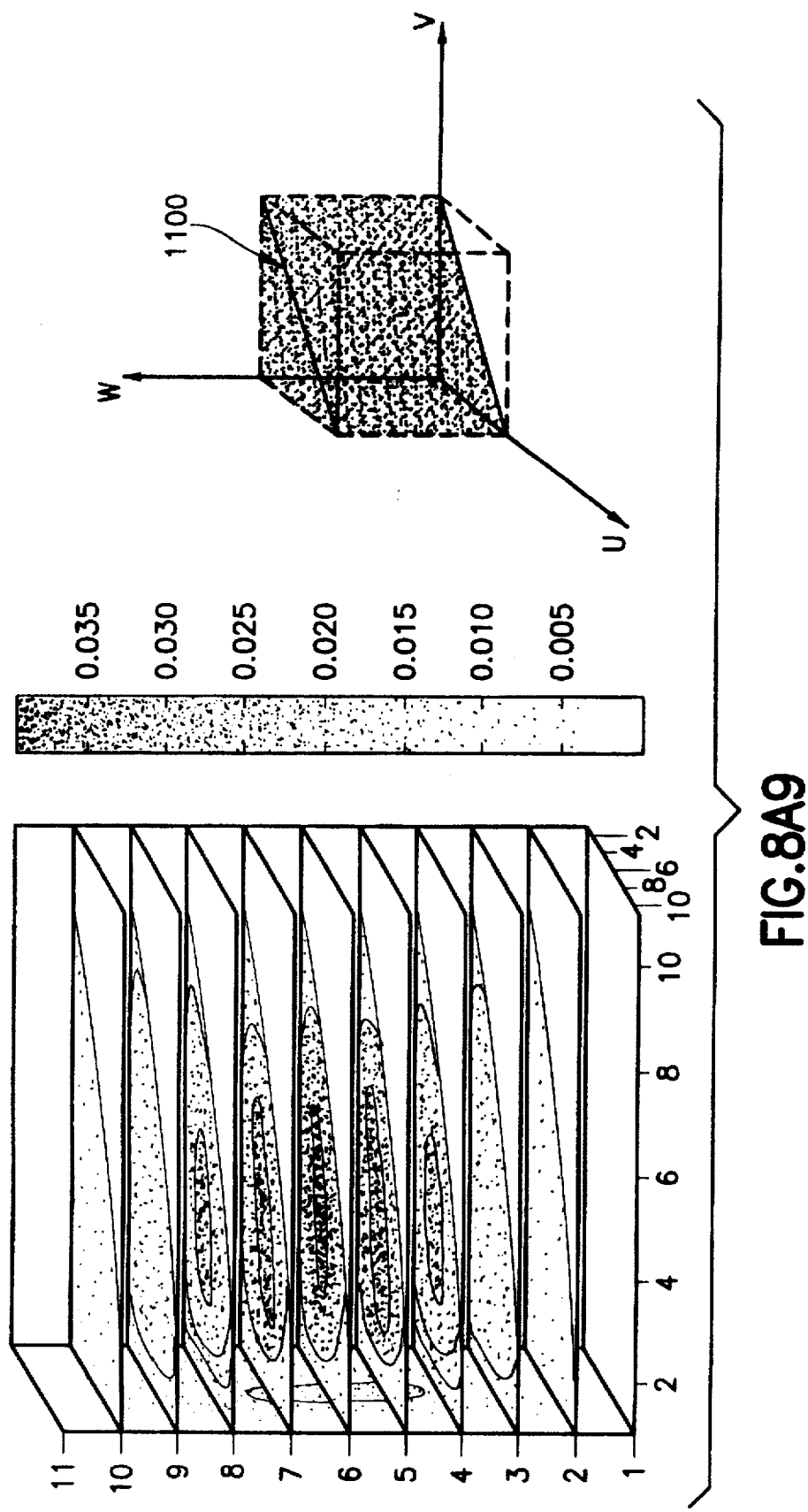
FIG.8A9

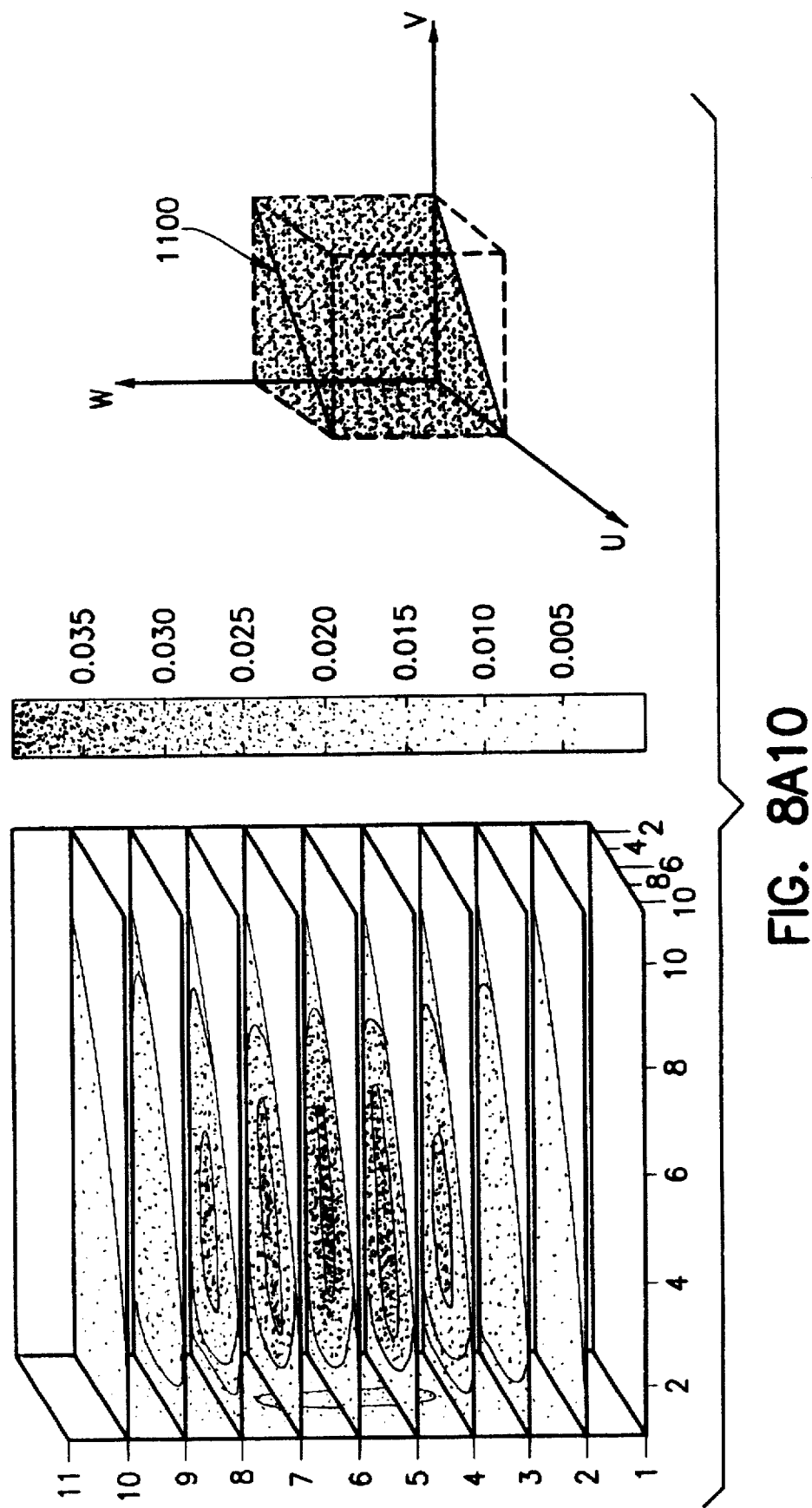
FIG. 8A10

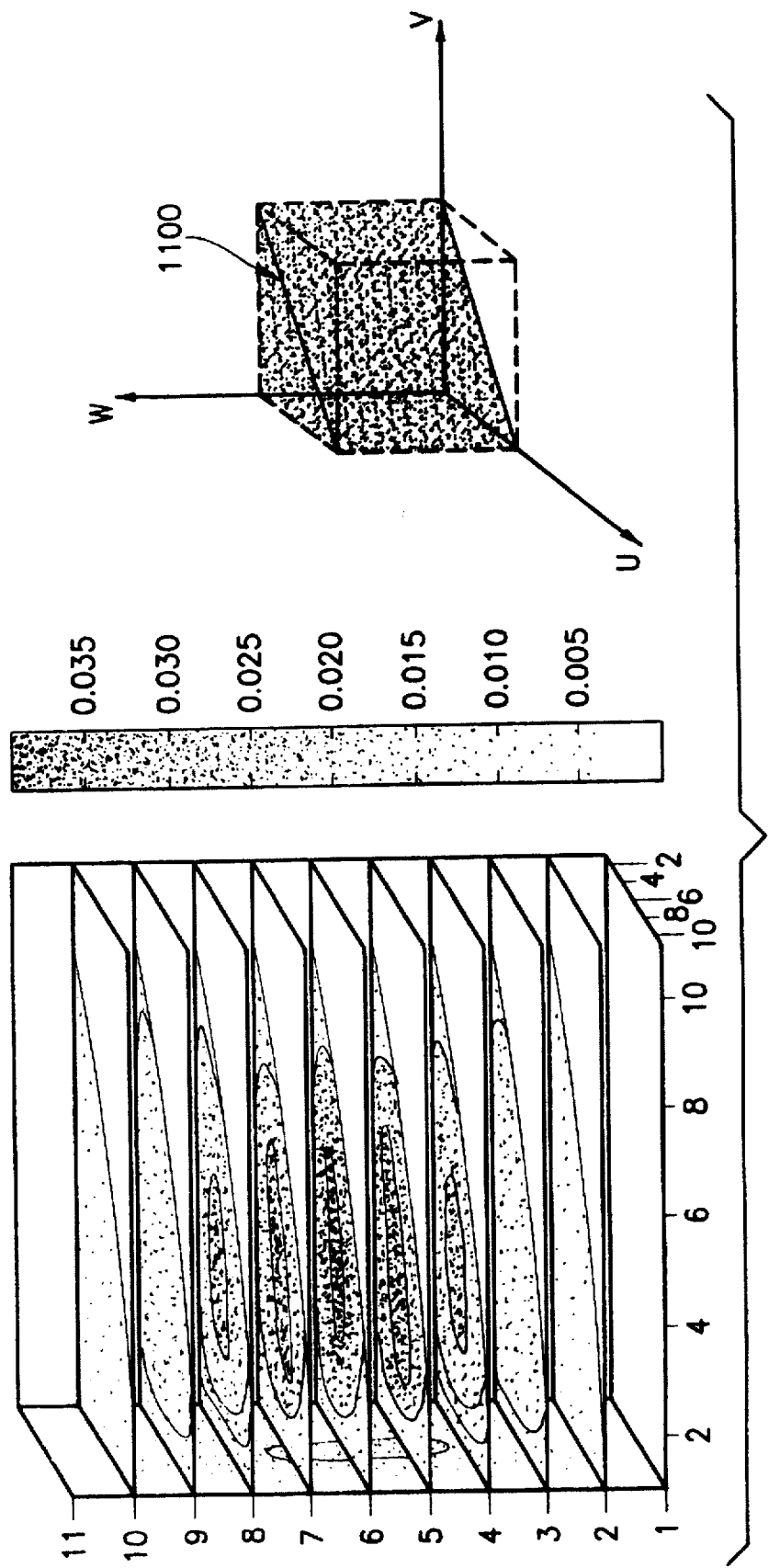
FIG. 8A11

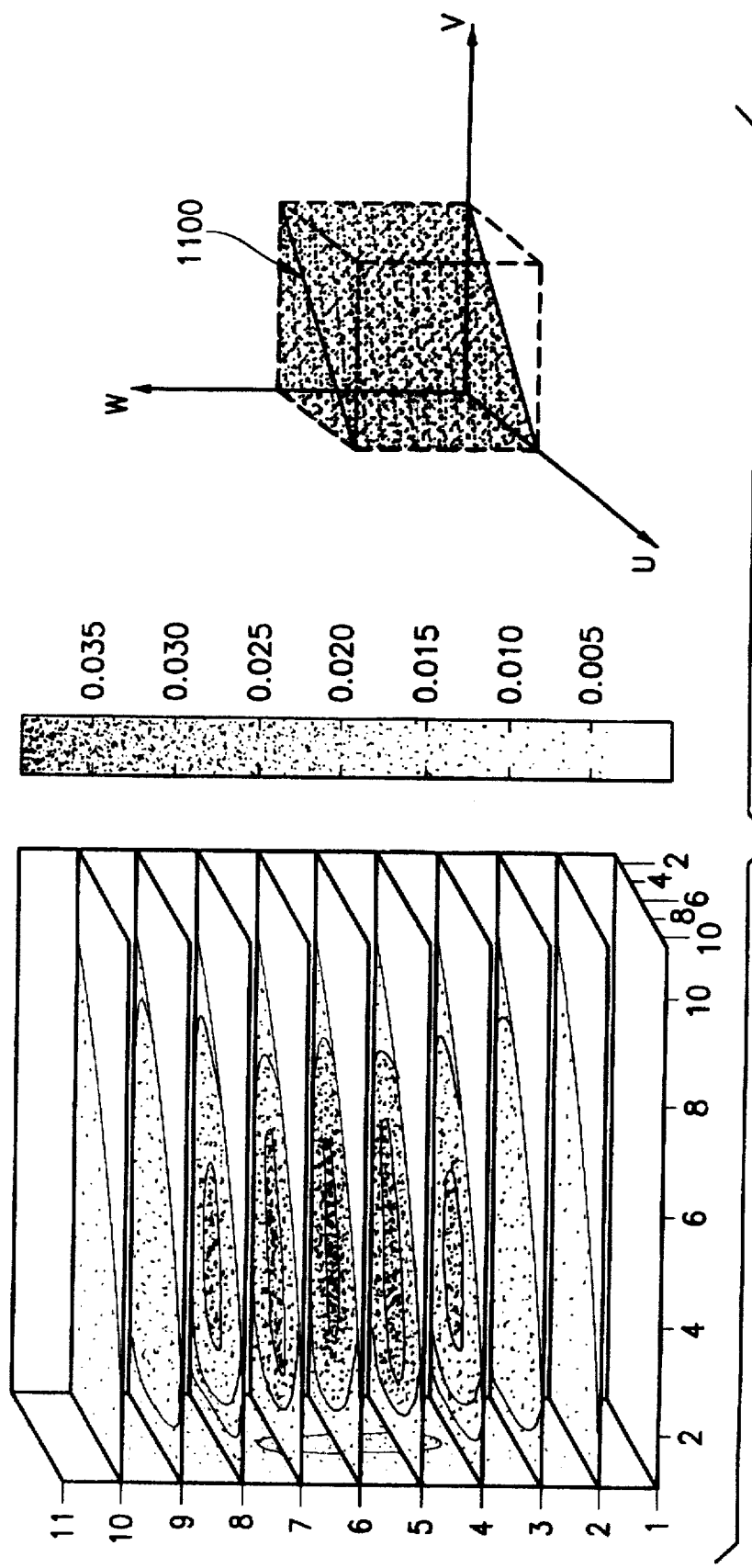
FIG. 8A12

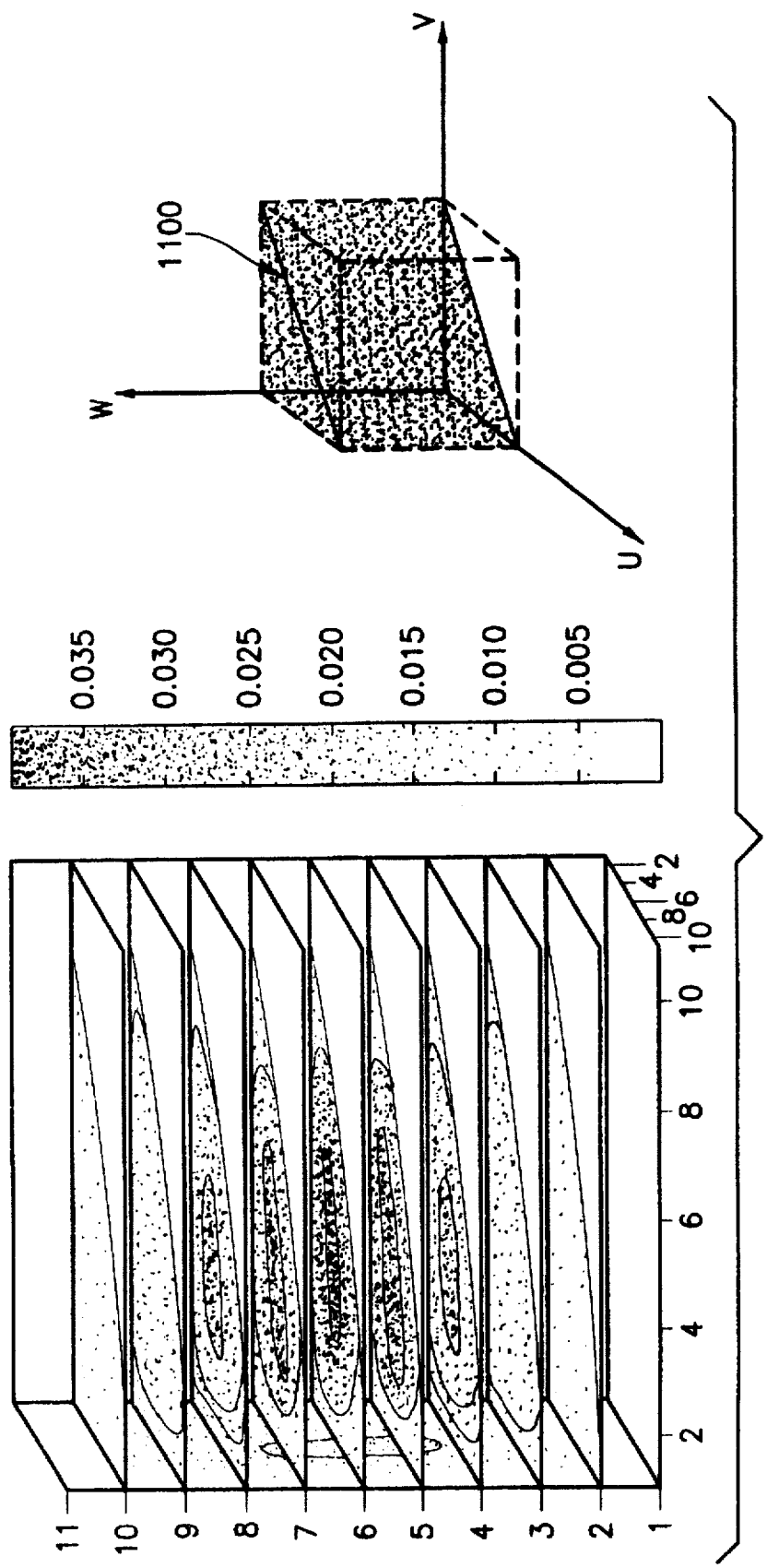
FIG.8A13

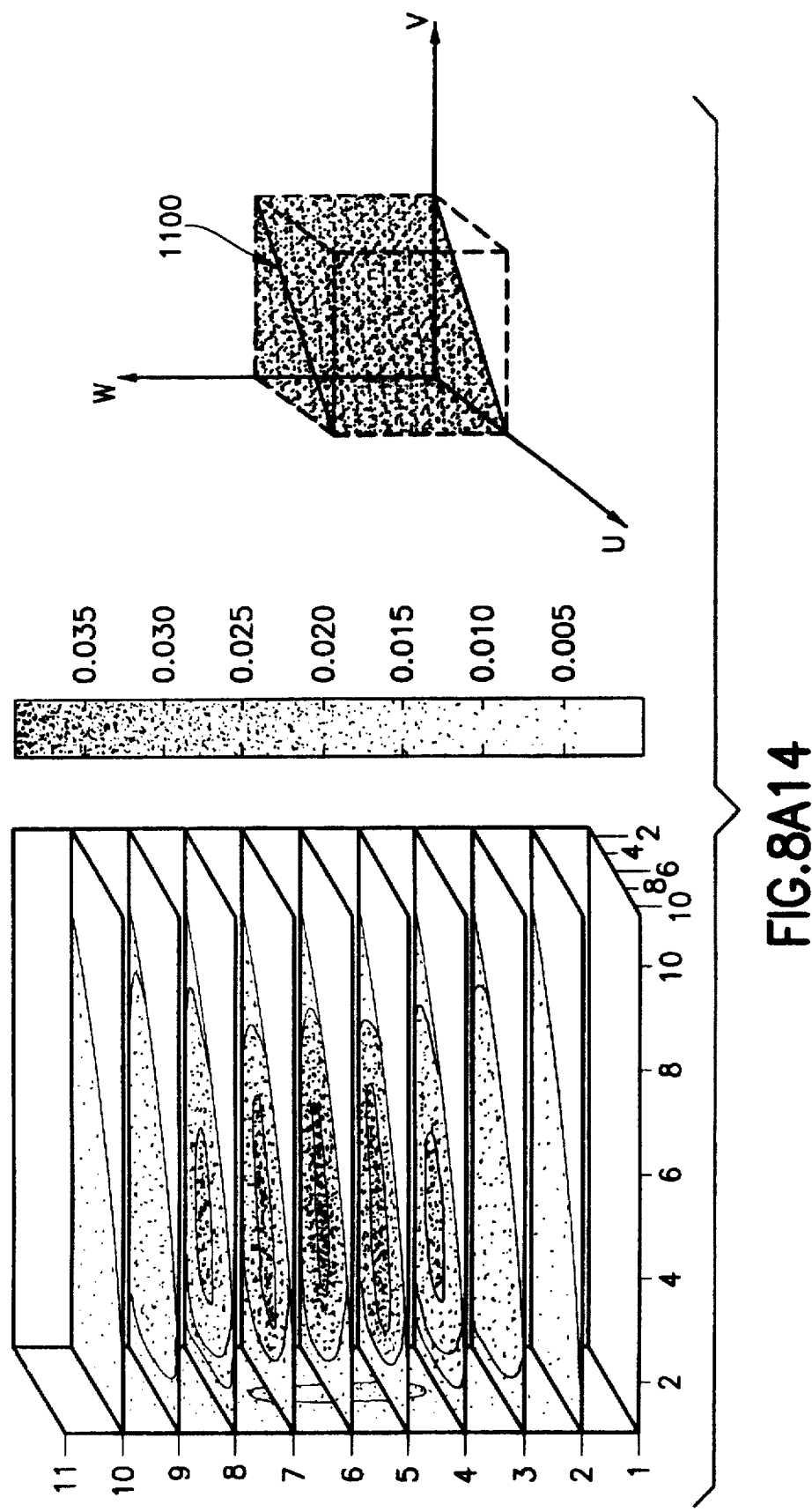
FIG.8A14

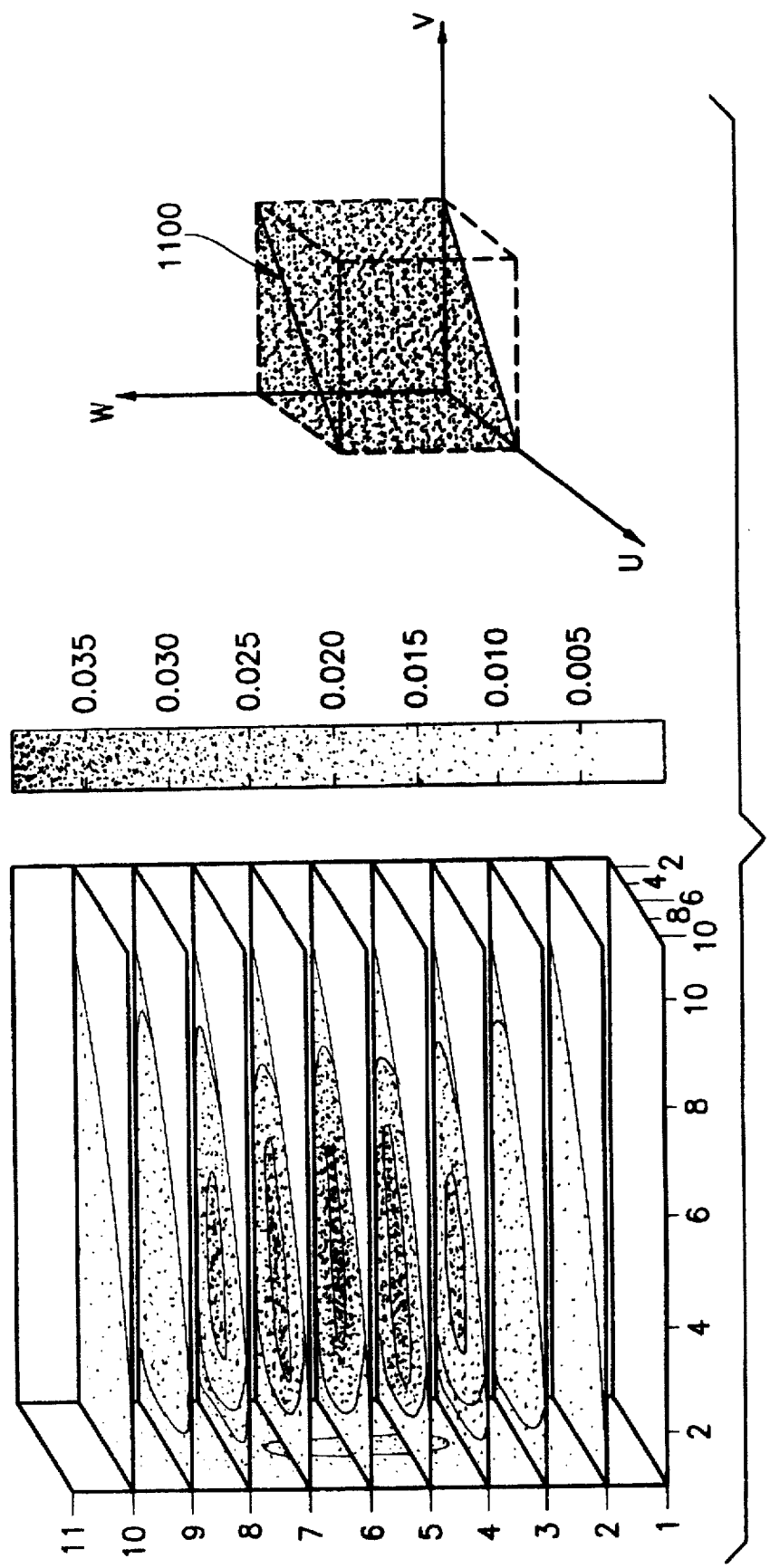
FIG.8A15

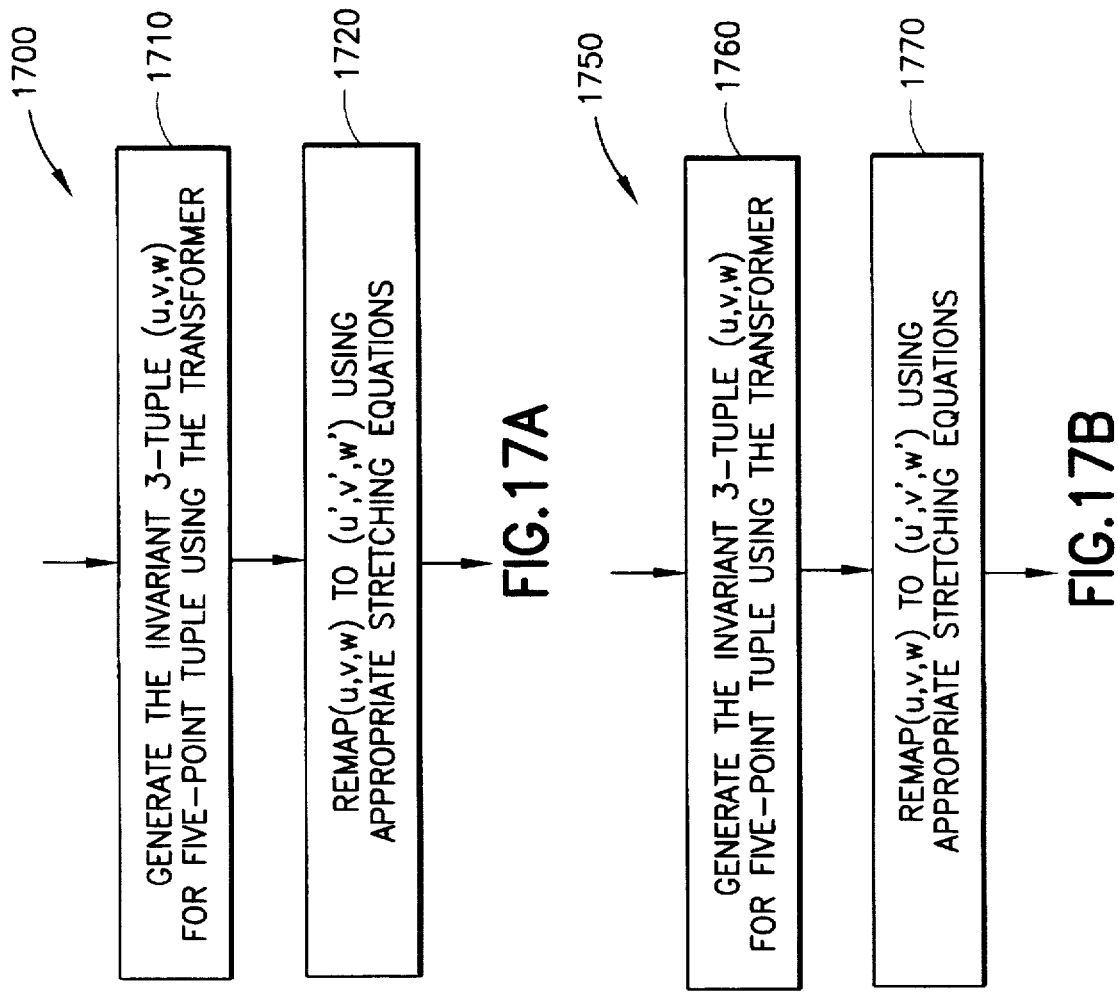

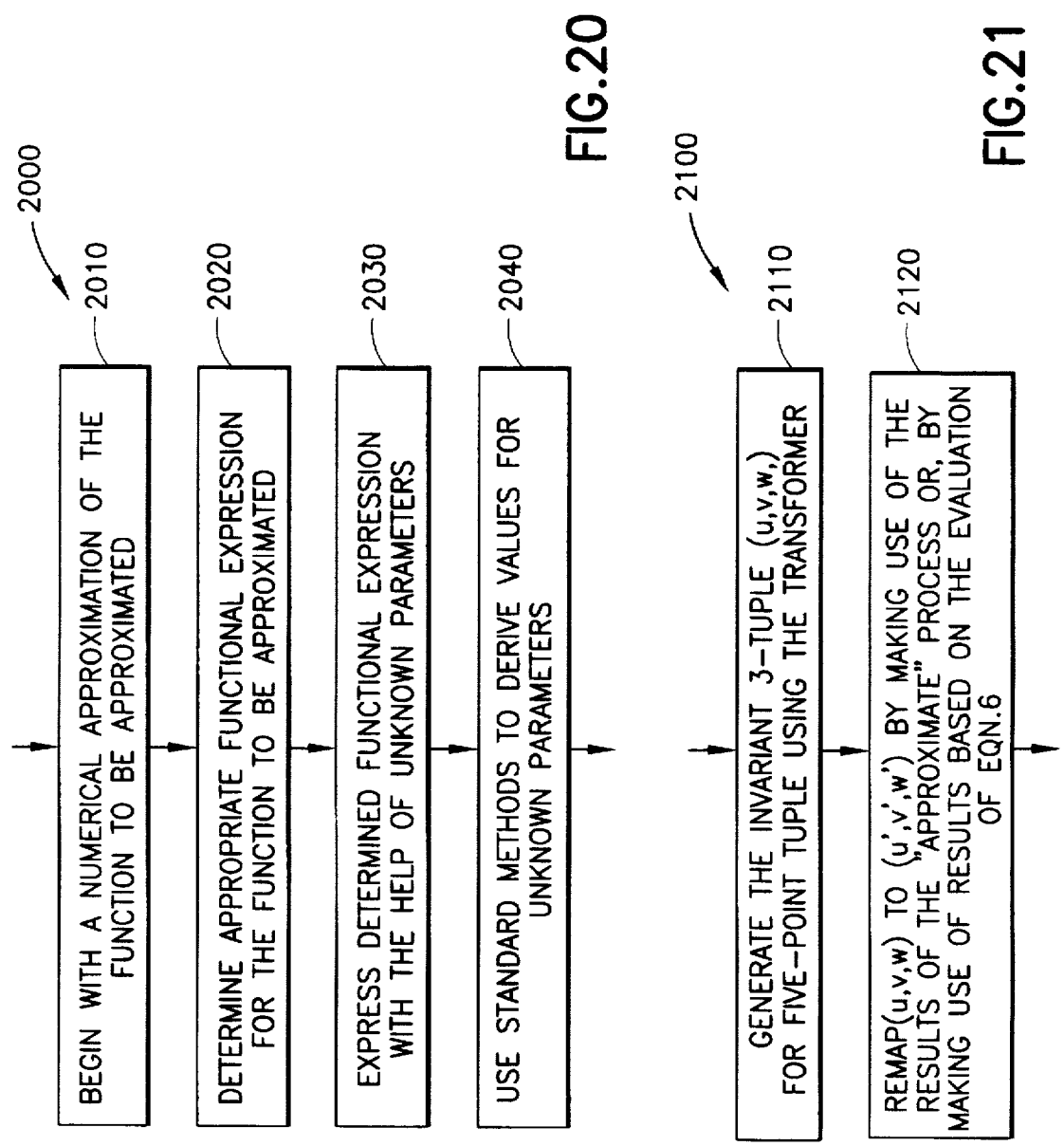

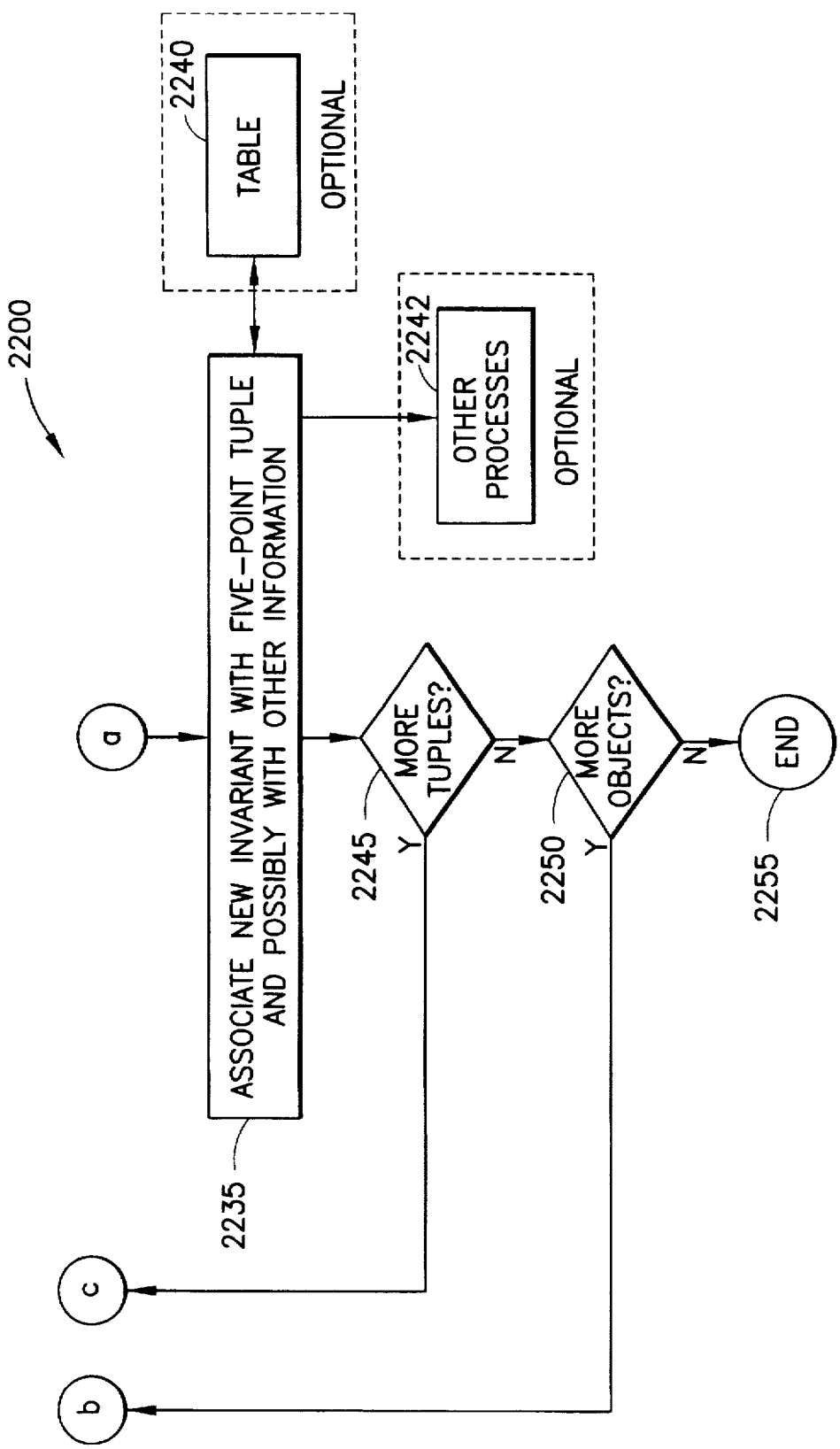

| | INDEX INFORMATION | INFORMATION 2320 | | | | | | | | | | | | |
|---|---|---|---|---|---|---|---|---|---|---|---|---|---|---|
| 1 | | | | | | | | | | | | | | |
| 2 | | | 2312 | 2312 | | | | | | | | | | |
| ... | | | 2312 | 2312 | 2312 | 2312 | 2312 | | | | | | | |
| k | u',v',w',.... | | 2312 | 2312 | | | | | | | | | | |
| | | | 2312 | 2312 | 2312 | 2312 | 2312 | 2312 | | | | | | |
| | | | 2312 | 2312 | 2312 | | | | | | | | | |
| ... | | | 2312 | 2312 | 2312 | 2312 | 2312 | 2312 | 2312 | 2312 | | | | |
| | | | | 2312 | | | | | | | | | | |
| | | | | | | | | | | | 2312 | 2312 | 2312 | 2312 |

FIG.24

| INDEX<br>INFORMATION | INFORMATION<br>2320 | | | | | | | | | | | TOLERANCE | |
|---|---|---|---|---|---|---|---|---|---|---|---|---|---|
| 1 | | 2312 | 2312 | 2312 | 2312 | 2312 | 2312 | | | | | | |
| 2 | | 2312 | 2312 | 2312 | 2312 | 2312 | 2312 | 2312 | | | | | |
| ... | | 2312 | 2312 | 2312 | 2312 | 2312 | 2312 | 2312 | | | | | |
| K | u',v',w',.... | 2312 | 2312 | 2312 | 2312 | 2312 | 2312 | 2312 | | | | | |
| | | 2312 | 2312 | 2312 | 2312 | 2312 | 2312 | 2312 | | | | | |
| ... | | 2312 | 2312 | 2312 | 2312 | 2312 | 2312 | 2312 | | | | | |
| | | 2312 | 2312 | 2312 | 2312 | 2312 | 2312 | 2312 | 2312 | | | | |
| | | 2312 | 2312 | 2312 | 2312 | 2312 | 2312 | 2312 | | | | | |
| | | 2312 | 2312 | 2312 | 2312 | 2312 | 2312 | 2312 | 2312 | | | | |
| | | 2312 | 2312 | 2312 | 2312 | 2312 | 2312 | 2312 | | | | | |
| | | 2312 | 2312 | 2312 | 2312 | 2312 | 2312 | 2312 | 2312 | | | | |
| | | 2312 | 2312 | 2312 | 2312 | 2312 | 2312 | 2312 | | | | | |
| | | 2312 | 2312 | 2312 | 2312 | 2312 | 2312 | 2312 | 2312 | | | | |

FIG.25

THREE-DIMENSIONAL AFFINE-INVARIANT HASHING DEFINED OVER ANY THREE-DIMENSIONAL CONVEX DOMAIN AND PRODUCING UNIFORMLY-DISTRIBUTED HASH KEYS

CROSS-REFERENCE TO RELATED APPLICATIONS

The present application claims priority to co-pending U.S. Provisional application 60/32042 filed on Nov. 26, 1996.

1.0 FIELD OF THE INVENTION

This invention relates to the design of hashing functions and their use in computer systems and applications programs executed by those systems. More specifically the invention relates to three-dimensional, affine-invariant hashing defined over a convex domain.

2.0 BACKGROUND OF THE INVENTION

The use of hashing techniques in the context of database access has been known for quite a number of years. During the last decade, hashing as a class of algorithms has been enjoying enormous popularity among researchers specializing in access methods for very large databases. The word hashing has been used interchangeably with the word indexing in the literature; it will also be the case with the text of this document.

The main components of any hashing scheme as applied to the context of database retrieval are the following:

a. an invariant-producing function (also commonly known as "hashing function") that operates on the objects that are to be stored in the database and later retrieved. The invariant-producing function makes use of various characteristics, and/or properties, and/or attributes in general of the objects and produces a tuple of one or more numbers that remain invariant under a well-defined set of transformations that the objects of the database are allowed to undergo. The tuple of invariant numbers can then be used to derive indices into a specific location of b. a table (also commonly known as "hash table"); the table is a collection of buckets (of fixed or variable capacity) each of which is populated with zero or more entries pertaining to objects of the database. Given an object, the invariant-producing function is evaluated one or more times for the object and one or more tuples generated: for each generated tuple, a bucket in the table is identified and an entry is made with information relating to the object under consideration.

The table of the hashing scheme is in essence a lookup table that is populated during an off-line storage phase during which the various objects to be recognized are processed and stored in the table (database). The dimensionality of the lookup table is the same as the dimensionality of the hashing function, i.e. equal to the cardinality of the tuple that the hashing function produces. Also, instead of producing invariants that can be used to generate indices into the hash table, the hashing function can be seen as directly producing indices into the hash table. This duality of the hashing function semantics will be used frequently in the discussion that follows.

Subsequent to the storage phase, the table allows fast (on-line) access to information about the objects that are stored in the database, in the following manner: when presented with an object whose identity is sought, the invariant-producing function is evaluated one or more times for the query object and the respective bucket(s) of the table accessed; all entries found in each such bucket are then collected and examined for multiple occurrences of some object's identifier—the query object is then claimed to be that database object with the most number of such entries in the retrieved collection of entries. Clearly, this is a simplified description of the hashing scheme for database storage and retrieval, but it captures the essential elements of the approach.

Although hashing techniques perform sufficiently well with databases of small sizes (tens of thousands of data records), it is becoming increasingly evident in recent years that one must exercise caution when applying such techniques to very large data sets. In particular, it is true that, with the majority of hashing functions, very large data sets result in the statistical properties of such functions to become apparent in the patterns of occupancy of the buckets of the hash table, independent of the table's dimensionality. In the middle of the last decade, hashing functions based on geometric characteristics of the database objects were proposed for searching databases. In particular, in the context of model-based object recognition, a technique known as "geometric hashing" has been adopted by many researchers in recent years. In geometric hashing, a two-dimensional and continuous hashing function is being used to allow recognition (retrieval) of two- and or three-dimensional objects from a database of known objects.

Ever since then, model-based database retrieval has been gaining popularity and has made its way to designs and implementations of store and retrieve schemes in a variety of scientific fields. In the context of computational biology, hashing functions have been devised for attacking computationally intensive problems, such as non-exact string matching, surface matching in ligand-receptor interaction, and substructure matching of three-dimensional molecular structures. The dimensionality of the employed hash tables ranges from 3 to 8 dimensions depending on the particular task at.

Finally, in the domain of the chemical database information retrieval, several systems have been built to store and retrieve data about chemical structures, the data ranging from physical and chemical properties of the structures, to toxicity information, clinical trial results etc. A large number of those systems use hashing functions that are based on geometrical properties, chemical type or other structural relations of the stored chemical entities.

In all of the above mentioned fields, researchers have realized that one of the main characteristics of the used hashing functions is the non-uniform distribution of the values produced by the hashing function over the space of invariants. This non-uniformity becomes particularly evident when the number of stored items in the database is very large. It has been observed that this non-uniformity is not specific to a particular data type but instead is endemic to all access methods that are based on hashing.

This non-uniformity of the distribution of values over the space of invariants has a number of interesting and important ramifications that directly reflect on the behavior and performance of any system that uses it. From a theoretical standpoint, it is important to know the range of values generated by the hash function. Related to this, the frequency of appearance of an invariant value allows one to draw conclusions about the discriminating power that the value (equivalently: the respective index), and thus the hashing function, carries.

Also, it is conceivable that certain hashing functions may give rise to multimodal distributions in the space of invariants; each one of these modes will correspond to a region of the hash table with a very large expected number of entries; it is important to locate such regions of the hash table, as well as the occupancy pattern in the neighborhood of these buckets. As a matter of fact, it has been shown in previous work, that the knowledge of the distribution of values over the space of invariants is instrumental to the development of Bayesian approaches to database access in the presence of noisy data inputs.

From a practical standpoint, the non-uniform distribution over the space of invariants results in different lengths for the lists of hash table entries that are associated with each of the hash table buckets. Since the length of the longest such list reflects on the time needed to process the data during a query, a non-uniform distribution will adversely affect the performance of the respective system. On the other hand, a uniform distribution not only will reduce execution time but can also result in a much more efficient storage of the hash table data structure.

Lastly, in parallel realizations of such storage and retrieval systems, a more or less constant occupancy of all the hash table buckets will result in an improved load balancing among the processors.

To this point, there appears to exist very little published work on determining quantitatively and/or qualitatively the index distributions that one can anticipate. Also very little work exists that attempts to alleviate the problem of the resulting non-uniform occupancy of the hash table bins. Four different approaches can be identified.

First, one can increase the dimensionality of the invariant-producing function, thus effectively decreasing the average number of entries in a given bucket of the employed table. Second, database-specific heuristics may be employed to improve the occupancy pattern of the table buckets. A third class of approaches comprising a mix of techniques assumes knowledge of the arrival order of the various queries, or the existence of a restrictive architecture such as a shared-memory multiprocessor etc.

Indeed, a large number of approaches have taken the view that multidimensional data can be transformed in a stepwise manner to one-dimensional representations and thus traditional access methods can be used for their manipulation. The R-tree data structure is among the first approaches that use this idea. A variation known as the hB-tree can become unbalanced and in fact acquire a severe skew with direct impact on performance.

Along similar lines, Gray coding has also been used as the technique for the mapping of multidimensional data to one-dimension; this variation can alleviate the problem to an extent but a certain degree of non-uniformity still persists. It should be stressed here that the use of Gray-encoding does not address the issue of modifying the hashing function but rather the way the corresponding multidimensional lookup table can be treated as one-dimensional and traversed using traditional access methods. Peano and Hilbert curves have also been employed in the same context. In general, such mappings can be successful if the type of the queries is known a priori and if the query path demonstrates locality. An implicit assumption with these techniques is the uniformity of the occupancy pattern of the various table buckets. More recently, the concept of the fractal dimension was proposed as the means to describe the deviation from uniformity, but all reported results have been for rather small sets (approximately 80,000 entries) of sample two-dimensional data.

It can been argued that existing methods may not be suitable for accessing databases by making use of an objects' geometric data because all such methods are based on data structures designed for one-dimensional.

Kamel and Faloutsos found experimentally that secondary memory is up to two orders of magnitude slower than primary memory. This causes most operations to be bound by the input/output (I/O) subsystem's response time. The natural solution is to attempt to parallelize the involved data structures, such that accesses can be serviced by several units: examples include separate disks on a single processor, a multiprocessor machine with several disks etc. Hierarchical (multi-step) access schemes can prove useful in this context. Alternatively, and when dealing with shared-memory multiprocessor systems, the data structures can be shared among a number of processors and storage devices, with a single association structure maintained in shared memory.

Finally, a fourth possible route, makes implicit or explicit use of irregular tessellations of the space of invariants. Beginning with the knowledge of an actual invariant-producing function to be used with a database, expressions are derived for the distribution of bucket occupancy over the space of invariants. The derived distribution is appropriately exploited. During a first stage, the probability density function for the invariants produced by the invariant-producing scheme is determined: this can be done either via a parametric estimation step, or, whenever possible, through the computation of a closed form expression for this density function. Once knowledge of the probability density function is available, well-defined methods from probability theory can be used to redesign the invariant-producing function so that it exhibits the desired properties.

It should be stressed that the concepts discussed herein become issues indeed when large databases are considered. Of course, the semantics of "large" is dependent on the scheme that is used for the database store and retrieve operations. In essence, a database can be considered large when the number of entries in the database generates an occupancy distribution over the buckets of the table which exhibits statistical behavior.

3.0 PROBLEMS WITH THE PRIOR ART

All of the suggested approaches that made use of geometric information (the latter pertaining to the set of recognizable models), to produce the invariants to be used as indices in an indexing-based store-and-retrieve scheme have a number of shortcomings. In particular, the main characteristic in all cases is the non-uniform distribution of preferences for the range of possible index values. As already stated in the previous section, this non-uniformity becomes particularly evident with large databases. Using increasingly larger databases is a trend that characterizes today's database-oriented activities.

The ramifications of this non-uniform preference for certain values of the invariants are numerous and diverse. For example, such a non-uniformity requires the creation and maintenance of tables that will contain a potentially large number of empty or near-empty bins. Given that for a number of important applications (e.g. protein and dna sequence matching, conformationally-flexible substructure matching in databases of three-dimensional molecular information, etc.) the sizes of the respective tables are larger than the maximum file size permitted by a file system, such tables will have to be shared among a number of storage devices. The devices that will be assigned the partition of the table that corresponds to the least-occupied buckets will also share less of the disk I/O burden that a query or a storage operation would incur; a uniformly-occupied hash table would clearly alleviate this situation.

Frequently, and in an effort to improve the database system's response time, the retrieval system's computational burden is shared among a number of processors which also share the respective tables among themselves; the incurred computational burden on a given processor depends on the number of items stored in the buckets of the table that the processor controls. A non-uniform occupancy of the table's buckets will result in excessive workload for some of the processors, while other processors will remain quasi-idle most of the time. This is clearly a situation where load-balancing cannot be achieved in a straightforward manner and additional effort is required.

Another issue has to do with the power to distinguish among the various objects in the database. This discrimination power is implicitly built into the invariant that is used to represent the various objects. If a large number of the buckets of the used table are empty or near-empty, this implies that invariants for the plurality of the objects of the database are now shared by a larger number of objects, and representations for these objects now exist in a smaller number of buckets that are fuller than they should be: the various database objects cannot be distinguished from one another as well as they would have been had the invariant producing functions not preferred some of the buckets over others. A rough analogy to this is the attempt to distinguish among the cars in a parking lot using their color: if no color shades are used, then a sherwood-green and an isle-green car would not be distinguishable. The invariant producing function could have resulted in more discrimination power had color shade been also used.

Finally, if an invariant-producing scheme results in invariants that show no preference for certain values over others, then for a random mix of objects in the database the number of entries in any table bucket is expected to be constant within a tolerance. Any deviations from this "average occupancy" reflect biases in the form of over-represented substructures in the database objects. These substructures could be in the form of feature-point configurations, surface patches, etc. By examining the entries in those buckets that contain more than the expected average of entries, objects can be identified which share the substructures that are over-represented. This allows us to draw general conclusions about the nature of the objects of in the database and either assert or refute claims about the database's composition.

A large number of systems have been built that make use of a specific class of hashing functions. All of the hashing functions in the class make use of geometric characteristics of the objects to be recognized, and are different for the different types of allowed transformations—rigid transformation (=rotation plus translation), similarity transformation (=rotation plus translation plus scaling), affine transformation. This class of hashing functions was proposed for its simplicity, and its property of continuity in the space of invariants. All of the functions in the class have as their domain the space $R^{2n}$, where n is the number of features for which the invariant in generated, and as range the $R^2$ (the Cartesian plane) of invariants; in what follows the domain of the hashing function will be referred to as the "feature domain," whereas the range of the hashing function will be the "space of invariants." Notice that each of the produced invariants can range from −Infinity to +Infinity, a property that can cause problems when implementing systems. Specifically, the table for storing the invariants can only consider a finite extent part of the entire space of invariants, and is thus forced to ignore a potentially large number of otherwise valid table entries just because the respective invariants fall outside the region under consideration. There have been suggestions in the past to "fold" the infinite space of invariants onto the finite-extent region that is being considered by the table, but these approaches suffer from different shortcomings. In the vast majority of the systems, the object features originate in a feature domain that is assumed to be bounded, for example, a square, or a circle. In particular, square feature domains are the overwhelmingly preferred ones. In terms of the employed transformation, the 2D affine transformation has been usually selected because of its generality and the flexibility it exhibits. It is worth mentioning at this point that the 2D affine transformation is the most general transformation of points on the plane. The 2D affine transformation is also known as the 2D linear transformation and the two terms are used interchangeably.

Recently, systems where the object features originate in the three-dimensional space have been attracting a lot of attention. A typical example of such object features would be the atoms comprising a molecule. The molecule under consideration could be a potential drug molecule, a protein with a particular function, etc.

In particular, systems are being developed which exploit databases of three-dimensional molecular information and find applications in the fields of rational drug design and the searching of chemical database to name a few. In the majority of the cases, the systems either use explicitly the rigid transformation or compute functions on molecular properties that depend on the rigidity assumption. As in the two-dimensional case, these systems suffer from the non-uniformity of the distribution of the computed measures.

Since the three-dimensional affine transformation is a general transformation in the three-dimensional space, the described analysis will concentrate on precisely this transformation. The cases of the rigid and similarity transformations are subsumed by the affine and can be handled trivially with the introduction of the appropriate additional constraints. In the following, and unless stated otherwise, the word object will be assumed to mean a three-dimensional object comprising object-feature points with specific three-dimensional coordinates.

Given five feature-points (five-point tuple) in three-dimensional space, all belonging to one of the recognizable models, a tuple of three numbers (3-tuple) that will remain invariant under any affine transformation of the five-point tuple can be produced in the context of the geometric hashing as follows:

$$p_5 - p_1 = u(p_2 - p_1) + v(p_3 - p_1) + w(p_4 - p_1) \qquad 1$$

In this equation, $p_i = \{x_i, y_i, z_i\}$ represents the position vector of the i-th point of the set; u, v and w are numbers that will remain invariant if the five-point tuple is subjected to a three-dimensional affine transformation. Notice that through this equation, the vector connecting the first and fifth point of the tuple is expressed as a linear combination of the vectors connecting points 1 & 2, 1 & 3, and 1 & 4 respectively. This equation in essence represents a remapping function that maps the five-point tuple of the feature domain (in this case $R^{3 \times 4}$) to a 3-tuple in the space of invariants ($=R^3$). FIG. 1 graphically depicts this remapping. In the following, the 3D affine transformation and 3D linear transformation will be used interchangeably.

The 3-tuples that are produced for each five-point tuple that can be formed using features from a recognizable object can be used to derive indices to a table where information about the five-point tuple under consideration and the corresponding object can be stored. The 3-tuples and the respective indices can be used in a lookup-table scheme to initially store and later retrieve information pertaining to a given recognizable object. This way of using the 3-tuples has been used to carry out recognition of three-dimensional objects by computer-based systems among others.

This table can be constructed off-line by examining each of the objects of the database in turn; the table can subsequently be used as a lookup (=hash) table during an on-line stage to retrieve those objects of the database of recognizable objects that have a subset of features in common with a query object. In particular, given a query object, its features are identified by means of standard techniques, and the above equation is used to generate invariant 3-tuples for five-point subsets of the query object's features. Each of the generated invariants is then used to identify (index into) a bucket of the lookup table; each such bucket contains entries referring to objects of the database that contain subsets of features generating the same invariant 3-tuple. Each generated five-point tuple from the query object is then compared against each of the five-points set identified by the respective bucket's entries to hypothesize an affine transformation that will transform one set onto the other. The database object that is supported by the largest number of consistent hypothesized affine transformations is the one that matches the query object best, under an affine transformation regime. One or more other objects may partially match the query object under an affine transformation and these will generate a correspondingly smaller number of consistent hypothesized affine transformations.

The above description is in essence at the core of every store-and-retrieve database system that is built around an indexing scheme. In the case where the indexing scheme makes use of geometric information, it is called "geometric hashing" and detailed descriptions of it exist in the reported bibliography. For more details, the reader can refer to the 1988 paper by Lamdan and Wolfson from the referenced literature.

The above equation however has a certain undesirable property that becomes evident when the database contains a number of objects that is large enough for statistical behavior to be exhibited. In detail, if the points comprising the five-point tuple are drawn uniformly from a convex domain K, then the probability that the produced 3-tuples reside in the 7th octant of the space of invariants (i.e. $u<=0$, $v<=0$, and $w<=0$) is very low, (quasi-) independently of the shape of the convex domain K! In an analogous manner, the produced 3-tuple will reside in each of the remaining seven octants of the space of invariants with probabilities that are quasi-independent of the shape of the convex domain K! This is a little known result and its 2D analog has been proved and published.

The proof for the three-dimensional case which we are considering here is straightforward and relies on a result from geometric probability known as the answer to Sylvester's problem in three dimensions. The definition of Sylvester's problem in three dimensions has as follows: given 5 points independently and uniformly distributed within the volume of a convex region K in three-dimensional space, what is the probability that the fifth point resides within the tetrahedron formed by the first four points? It is assumed that the five-point sets do not contain coplanar quadruples. This problem is the three-dimensional equivalent of the famous Sylvester's *Vierpunkt* problem on the plane. In order to proceed with the proof, a forward reference to FIG. 3A is necessary at this point. Referring to Eqn. 1, it is easy to see that the invariant 3-tuple will reside in the 7th octant of the space of invariants if and only if the point $p_5$ resides in the interior of the infinite trihedral region (Region 2) "rooted" at the vertex corresponding to the point $p_1$ of the tetrahedron which points $p_1$, $p_2$, $p_3$, and $p_4$ define; one such tetrahedron is shown in FIG. 3A. But in this particular arrangement, the five points form a reentrant polyhedron. There are four more placements of point $p_5$ which result in reentrant polyhedron arrangements of the five points: one such placement would have point $p_5$ in the interior of the tetrahedron defined by the first four points of the five-point tuple; the remaining three placements would call for point $p_5$ to be inside each of the three infinite trihedral regions "rooted" at vertices $p_2$, $p_3$ and $p_4$ respectively (Regions 3, 4 and 5 respectively). Since the five points were assumed to be independently and uniformly distributed within the volume of a convex region K in three-dimensional space, and using symmetry arguments we can see that Pr(3-tuple in 7th octant) =⅕ Pr(five-point tuple forms reentrant polyhedron). But this last probability is precisely the answer to Sylvester's problem in three dimensions. For the case where K is a sphere, there exists an explicit value for this probability and is equal to 9/143. Thus it follows that Pr(3-tuple in 7th octant)=9/715~0.01258 Explicit values for five-point tuples in convex regions other than the sphere (e.g. tetrahedra, parallelepipeds etc.) have apparently not been successfully calculated. However, Monte-Carlo simulations can provide numerical approximations and the probability of occupancy of the 7th octant in those other cases has been seen to be very small and in the order of 1%. This last result has severe consequences, as the discussion above has already indicated.

A Monte-Carlo simulation would proceed as follows: a large number of five-point tuples would be produced with the points uniformly distributed over a convex domain and an invariant 3-tuple generated for each five-point tuple according to Eqn. 1; a counter is updated at the location of the bucket corresponding to the invariant. The buckets are defined by appropriately tessellating a finite-extent region of the space of invariants: if a generated invariant 3-tuple falls outside the region under consideration no counter is updated; otherwise, each of the three members u, v and w of the tuple is quantized and assigned to the corresponding bucket. The total number of five-point tuples is also kept track of during the process. Upon completion of the simulation, each of the counters is divided by the total number of the generated five-point tuples and the resulting values form a discretized version of the probability density function for the values u, v and w. Computing the Riemann sum over the finite-extent region delineated by the table gives the total probability of a generated 3-tuple to reside in the region under consideration. The value of the probability density function at a given location is a direct estimate of the preference for producing 3-tuples that fall within the space-of-invariants region that corresponds to the bucket. In what follows, and for clarity purposes the convex domain will be assumed to be a cube; however, the proposed methodology can be applied without modification to any other convex domain K in three dimensions (e.g. spheres, ellipsoids, parallelepipeds, tetrahedra etc.).

Note that there is no need to specify the actual side of the cube, or the radius of the sphere; indeed, the affine transformation incorporates scaling in it and the above results hold independently of the length of the side of the square, or the radius of the sphere. Analogous comments can be made for other convex shapes.

In the light of the discussion above, it is evident that for the case of affine transformations and feature points that are uniformly distributed over any convex domain K, the use of the invariant-producing function that is dictated by the geometric hashing framework is a sub-optimal choice. Furthermore, the probability density function for the invariant values u, v, and w has a shape that makes it not amenable to treatment by standard techniques. Clearly, a new way for producing invariant 3-tuples is needed.

An alternative affine-invariant producing equation was suggested by Ambartzumian: given five feature points (five-point tuple) in three-dimensional space, a tuple of three numbers (3-tuple) that will remain invariant under any affine transformation of the five-point tuple can be produced in the following manner:

(a) $u=V_{2345}/V_{12345}$ $v=V_{1345}/V_{12345}$ $w=V_{1245}/V_{12345}$ if pt 5 interior to tetrahedron 1-2-3-4, and polyhedron 1-2-3-4-5 is reentrant (b) $u=V_{2345}/V_{12345}$ $v=V_{1345}/V_{12345}$ $w=V_{1245}/V_{12345}$ if pt 5 interior to tetrahedron 1-2-3-4, inside infinite quadrihedral region having face 124 on its boundary, and polyhedron 1-2-3-4-5 is not-reentrant (c) $u=V_{2345}/V_{12345}$ $v=V_{1345}/V_{12345}$ $w=V_{1245}/V_{12345}$ if pt 5 interior to tetrahedron 1-2-3-4, inside infinite quadrihedral region having edge 24 on its boundary, and polyhedron 1-2-3-4-5 is not-reentrant
$$2$$

Here, $V_{ijkl}$ represents the volume of the tetrahedron whose vertices are the points $p_i$, $p_j$, $p_k$, and $p_l$ respectively. Analogously, $V_{12345}$ is the volume of the minimal convex hull of the polyhedron that the five feature points $p_1$, $p_2$, $p_3$, $p_4$, and $p_5$ define. The polyhedron 1-2-3-4-5 may be reentrant but with point 5 being in one of the infinite trihedral regions rooted at one of the four vertices (see FIG. 3A) of the tetrahedron 1-2-3-4: in this case a simple relabeling of the five vertices of the polyhedron suffices to reduce this case to that of (a) in Eqn. 2. Similarly, the polyhedron 1-2-3-4-5 may be non-reentrant and point 5 may be inside the infinite quadrihedral region having one of the other three faces (i.e. face 123, 234, or 134) on its boundary; again, relabeling of the four vertices reduces this case to (b) above. Finally, polyhedron 1-2-3-4-5 may be non-reentrant and point 5 may be inside the infinite quadrihedral region having one of the remaining 5 edges (i.e. edge 12, 13, 14, 23, or 34) on its boundary; this time, relabeling of the four vertices reduces this case to (c) above.

It is easy to show that the u, v and w defined by this last equation are invariant with respect to 3D affine transformations of the respective five-point tuple. Furthermore, it is clear that, unlike the 3-tuples produced by the geometric hashing equation, the 3-tuples produced by this scheme assume values that range between 0 and 1. As such, the space of the invariants produced by this latter equation is the square $[0,1] \times [0,1] \times [0,1]$. FIG. 2 graphically depicts this remapping.

FIG. 3A is a prior art drawing showing a tetrahedron 300 formed by points 1-2-3-4 and three infinite trihedral regions rooted at vertices 1, 2, and 4 respectively (Regions 2, 3 and 5 respectively). Each infinite trihedral region is delimited by the planes coinciding with three of the four faces of the tetrahedron 1-2-3-4. In addition to the three trihedral regions that are shown, there is one more such region and is rooted at vertex 3 of the tetrahedron not shown in the Figure.

FIG. 3B is a prior art drawing showing a tetrahedron 300 formed by points 1-2-3-4 and an infinite quadrihedral region with the face 124 on its boundary. The infinite trihedral region rooted at vertex 1 (Region 2) is also shown: the two regions have the line defined by points 1 and 3 as their intersection. The infinite quadrihedral region (Region 6) is delimited by the planes defined by the triplets of points 1-2-4, 1-2-3, 1-3-4 and 2-3-4 respectively. There are four more such quadrihedral regions that correspond to the other four faces of the tetrahedron 1-2-3-4 (not shown in the Figure). Also shown in this Figure (although not highlighted) are the infinite trihedral regions rooted at vertices 1, 2 and 4 (Regions 2, 3 and 5 respectively); the purpose of including these regions in the Figure is to show their position relative to the quadrihedral region that has the face 124 on its boundary.

FIG. 3C is a prior art drawing showing a tetrahedron 300 formed by points 1-2-3-4 and three infinite quadrihedral regions with the edges 24, 12, and 14 respectively on their boundary (Regions 11, 13 and 10). The infinite quadrihedral regions are delimited by the planes coinciding with the four faces of the tetrahedron 1-2-3-4. There are three more such quadrihedral regions that correspond to the other three edges of the tetrahedron 1-2-3-4. Also shown in this Figure (although not highlighted) are: (a) the infinite trihedral regions rooted at vertices 1, 2 and 4, and (b) the infinite quadrihedral region with the face 124 on its boundary; the purpose of including these regions in the Figure is to show their position relative to the quadrihedral regions with the edges 24, 12, and 14 respectively on their boundary.

Recapitulating, and as per the suggestion by Ambartzumian, five points of the feature domain can be remapped to a point of (a three-dimensional) invariant space by means of ratios of volumes. The members of the affine-invariant 3-tuple assume values that can range from 0 to 1. I.e., all of the five-point tuples are mapped to a point inside a unit cube of the space of invariants. Without loss of generality, the feature domain is chosen to be the unit cube.

Let us assume that we are presented with the five points of a five-point tuple. From our discussion so far, it should be clear that the first four points of the five-point tuple (which, without loss of generality, are assumed to be non-coplanar) divide the space in which all five points lie into fifteen distinct regions; the fifth point of the five-point tuple can reside in any of these fifteen regions. Indeed, the fifth point could reside in:

a. the interior of the tetrahedron 1-2-3-4; or, b. one of the four infinite trihedral regions rooted at vertices 1, 2, 3 and 4 respectively; or, c. one of the four infinite quadrihedral regions having face 124, 234, 134 and 123 as a boundary, respectively; or, d. one of the six infinite quadrihedral regions having edge 14, 24, 34, 12, 23, and 13 respectively.

These fifteen regions can be numbered in an arbitrary manner. In this discussion, we will use the numbering scheme implied by the list above:

Region 1: the interior of the tetrahedron 1-2-3-4

Region 2: the infinite trihedral region rooted at vertex 1

Region 3: the infinite trihedral region rooted at vertex 2

Region 4: the infinite trihedral region rooted at vertex 3

Region 5: the infinite trihedral region rooted at vertex 4

Region 6: the infinite quadrihedral region with face 124 on its boundary

Region 7: the infinite quadrihedral region with face 234 on its boundary

Region 8: the infinite quadrihedral region with face 134 on its boundary

Region 9: the infinite quadrihedral region with face 123 on its boundary

Region 10: the infinite quadrihedral region with edge 14 on its boundary

Region 11: the infinite quadrihedral region with edge 24 on its boundary

11

Region 12: the infinite quadrihedral region with edge 34 on its boundary

Region 13: the infinite quadrihedral region with edge 12 on its boundary

Region 14: the infinite quadrihedral region with edge 23 on its boundary

Region 15: the infinite quadrihedral region with edge 13 on its boundary

Of course, any other scheme for numbering the fifteen regions could have been employed instead.

FIG. 3D is a prior art drawing that shows all of the regions described in FIGS. 3A through 3C. Also shown are the numbers that the shown regions will assume using the numbering scheme described above.

The fifteen regions in which the first four points of the five-point tuple subdivide the space are distinguished by several properties. In particular, and for the numbering scheme used in this discussion, if the fifth point of the five-point tuple lies in regions 1 through 5, then the formed polyhedron is reentrant (and thus a four-point subset of the five-point tuple suffices to define the convex hull of the set); the five-point tuple is then said to be in a reentrant-polyhedron (=RP) arrangement. On the other hand, if the fifth point lies in regions 6 through 15, then the formed polyhedron is non-reentrant; all five points of the five-point tuple participate in the definition of the convex hull of the set. The five-point tuple is then said to be in a non-reentrant-polyhedron (=NRP) arrangement.

Another property pertaining to the fifteen defined regions has to do with values of u, u and w produced by the respective arrangements of the five points. In particular, if the five-point tuple is in an RP arrangement it can be shown easily that the produced u, u and w satisfy the following inequalities:

$$u>=0, v>=0, w>=0, u+v+w<=1 \qquad 3$$

The last inequality implies that all of the produced 3-tuples will be confined to the pyramid formed by the points (0,0,0), (1,0,0), (0,1,0) and (0,0,1) of the space of invariants. In an analogous manner, if the five-point tuple is in a NRP arrangement, it can be shown that the produced u, v and w satisfy the following inequalities:

$$u>=0, v>=0, w>=0, u+v<=1, w<=1 \qquad 4$$

This time, all of the produced 3-tuples can lie anywhere inside the prism with vertices (0,0,0), (1,0,0), (0,1,0), (0,0,1), (1,0,1) and (0,1,1) of the space of invariants.

FIGS. 4A and 4B are a prior art representation of where in the space of invariants, the 3-tuple (u,v,w) produced by a fifth point randomly selected in regions 1 through 5 will map. As stated, the 3-tuple will be confined to the interior of the pyramid shown here.

FIGS. 5A and 5B are a prior art representation of where in the space of invariants, the 3-tuple (u,v,w) produced by a fifth point randomly selected in regions 6 through 9 will map. As stated, the 3-tuple will be confined to the interior of the prism shown here.

FIGS. 6A and 6B are a prior art representation of where in the space of invariants, the 3-tuple (u,v,w) produced by a fifth point randomly selected in regions 10 through 15 will map. As stated, the 3-tuple will be confined to the interior of the prism shown here.

4.0 OBJECTS OF THE INVENTION

An object of this invention is a system and method for the production and use of a uniform distribution of the invariants produced by the invariant-generating mechanism.

12

An object of this invention is an improved storage/retrieval system and method that searches a database of objects (e.g. 3D molecular structures, 3D surface patches etc.) by accessing a uniformly distributed database of object descriptors.

An object of this invention is a system and method for the production and use of a uniform distribution of the invariants with a convex feature domain.

An object of this invention is a system and method for the production and use of a uniform distribution of the invariants with convex feature domains of varying shapes, the feature domains including domains in the shape of tetrahedron, cube, parallelepiped or (convex) polyhedron in general, sphere, ellipsoid.

An object of this invention is a use of the uniform distribution of the invariants to qualitatively assess the nature of the objects in a database.

An object of this invention is a use of the uniform distribution of the invariants to implement a predicate that answers the question of whether a specific structure or set of features is present in a database of one or more objects.

An object of this invention is a use of the implemented predicate to answer the question of whether two sets of objects, each containing one or more objects, share groups of features. An object of this invention is a use of the implemented predicate to answer the question of whether a given ligand (e.g. drug molecule) could dock on a given receptor (e.g. enzyme).

An object of this invention is a use of a uniform distribution of invariants over a feature domain to balance computational load on distributed computer systems.

An object of this invention is a use of a uniform distribution of invariants over a feature domain to balance storage requirements on distributed computer systems.

5.0 SUMMARY OF THE INVENTION

This invention is a method and system for producing and using affine invariants with a uniform distribution over the range of their values, the affine invariants that represent groups of features of three-dimensional objects. Each three-dimensional object is defined by a set of object points (i.e. features) selected from an object feature domain. Features include points in three-dimensional space, vertices or other points of interest on polyhedral contours, atoms of a three-dimensional molecule, points of interest on a three-dimensional surface, etc. The objects are further capable of being transformed by one or more affine (=linear) transformations that include translation, rotation, scaling, and/or shear to produce other views of the object. These produced invariants and associations can be used to store representations of one or more objects in a database; given a test object, new associations between invariants and test object features are made and used to retrieve and compare the test object to one or more of the three-dimensional objects stored in the database. The invention enables the database of invariants to be shared equally among one or more computers or processors.

The affine mappings transform any one of the objects (first object) into another three-dimensional object (transformed object) that is related to the first object but may appear different. For example, a cubic object can be transformed by shear to appear as a parallelepiped. Every point contained in the object is transformed by the transformation and a given first subset of points in the set of object points will correspond to a first set of invariant values (invariants) that remain constant under any transformation. Note that a second subset of points in the set of object points will correspond to a second set of invariants.

A distribution of invariants is produced by selecting a plurality of subsets of five features (a five-point-tuple) from the object feature domain, four of the points being non-coplanar and dividing the object feature domain into fifteen regions, while the fifth point is located in one of the fifteen defined regions. If the fifth point lies in one of five of the fifteen regions, the five-point tuple forms a reentrant polyhedron and the five-point tuple is said to be in a reentrant polyhedron (RP) arrangement. On the other hand, if the fifth point lies in one of the remaining ten regions, the five-point tuple forms a non-reentrant polyhedron and the five-point tuple is said to be in a non-reentrant polyhedron (NRP) arrangement.

The invention exploits a discovery, unrecognized by the prior art. The starting idea is to distinguish among all possible five-point tuple arrangements. In particular, there can be five types of distinct RP arrangements depending on which of the five RP-forming regions (these are the regions 1 through 5 described previously) the fifth point of the five-point tuple finds itself in. Similarly, there can be ten types of distinct NRP arrangements depending on which of the three NRP-forming regions (these are regions 6 through 15 above) the fifth point of the five-point tuple finds itself in. The discovery is that:

1. for all five RP arrangements, the distributions of invariants are identical;
2. for all ten NRP arrangements, the distributions of invariants are identical;
3. for all five RP arrangements, the distribution of invariants is uniform (within a tolerance) within a pyramidal domain in invariant space and independently of the shape of convex feature domain from which the five-point tuples are drawn uniformly; and
4. for all ten NRP arrangements, the distribution of invariants exhibit a plane symmetry, independently of the shape of convex feature domain from which the five-point tuples are drawn uniformly, and, at the very least, can be approximated.

To exploit this discovery, the invention selects one or more objects, represented by five-point tuples, from the set of objects.

A transformer represents each of the five-point tuples by a 3-tuple that is an invariant under any of the possible affine transformations.

A tagger identifies each of the five-point tuples as:
a. having a specific polyhedral arrangement (either NRP or RP) and
b. having its fifth point in one of the fifteen regions that the other four points define.

An equalizer remaps the 3-tuples (=points in the three-dimensional space of invariants) by redistributing all of the 3-tuples to create a new distribution of 3-tuples that is uniform over the region of possible values. To do this, various techniques are applied to the region of invariants:
a. repositioning 3-tuples corresponding to five-point tuples in RP arrangements based on the point position, and
b. repositioning 3-tuples corresponding to five-point tuples in NRP arrangements based on the point position. There are two embodiments of the equalizer: the redistribution and the repositioning equalizer. The redistribution equalizer is used to determine and produce a mechanism exhibiting a set of desired properties, whereas the repositioning equalizer employs the mechanism to carry out necessary steps during a use of the method.

A stacker combines the results of the equalizer that correspond to the remapped regions to create a complete uniform distribution (within a tolerance) for all the affine invariants that the transformer produces.

The resulting system and method for producing a uniform distribution can be useful in storage and subsequent fast retrieval of objects from a database, load balancing the load induced on each of one or more processors that have the task of operating on a table of invariants representing parts of stored objects, qualitative assessment of the composition of the database etc.

6.0 BRIEF DESCRIPTION OF THE DRAWINGS

FIG. 1, comprising FIGS. 1A and 1B, is a drawing of prior art affine invariant mapping from the object feature domain (FIG. 1A) to the space of invariants (FIG. 1B).

FIG. 3C is a prior art representation of three infinite quadrihedral regions having edges 14, 12 and 24 respectively on their boundary.

Figure 6B:
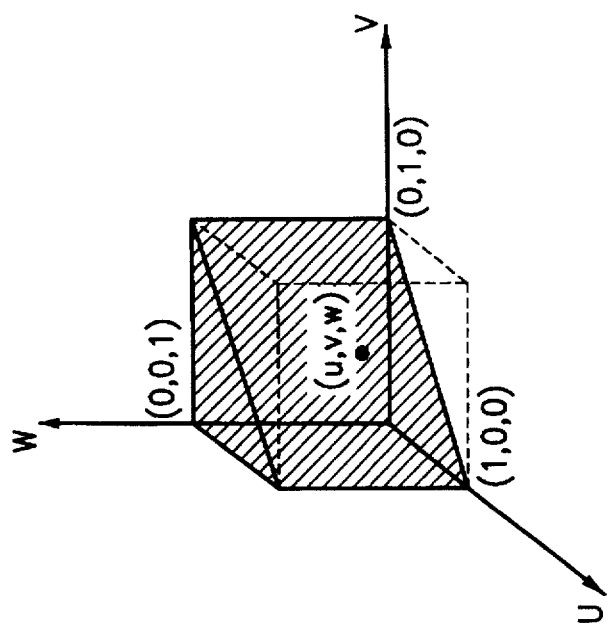
Figure 6A:
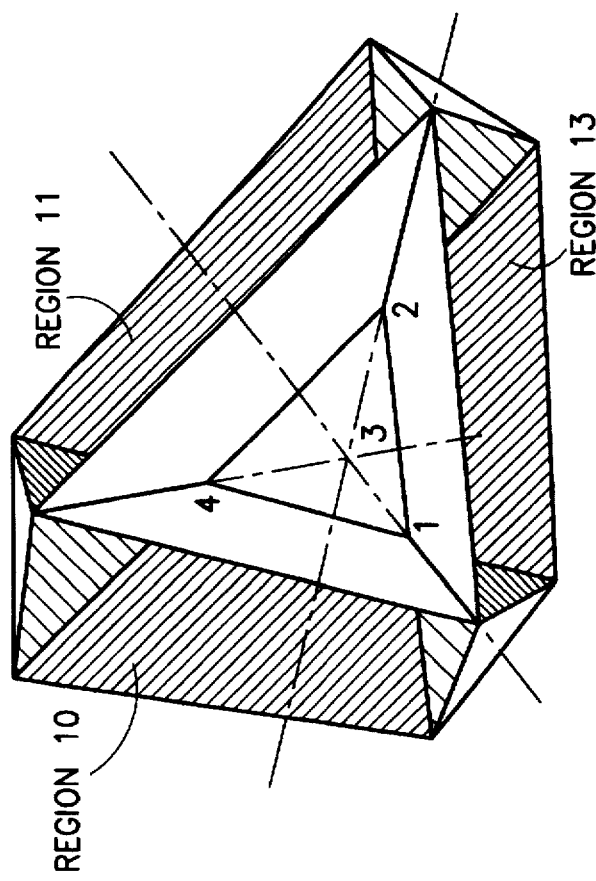

FIG. 6A and 6B are a prior art representation of where, in the space of invariants, the invariants produced by a randomly selected fifth point map for each of the 6 regions 10 trough 15.

FIGS. 7A through 7D show the distribution of the invariant values for a very large number of five-point tuples randomly and uniformly selected over a convex domain, e.g. a unit cube.

Figure 1B:
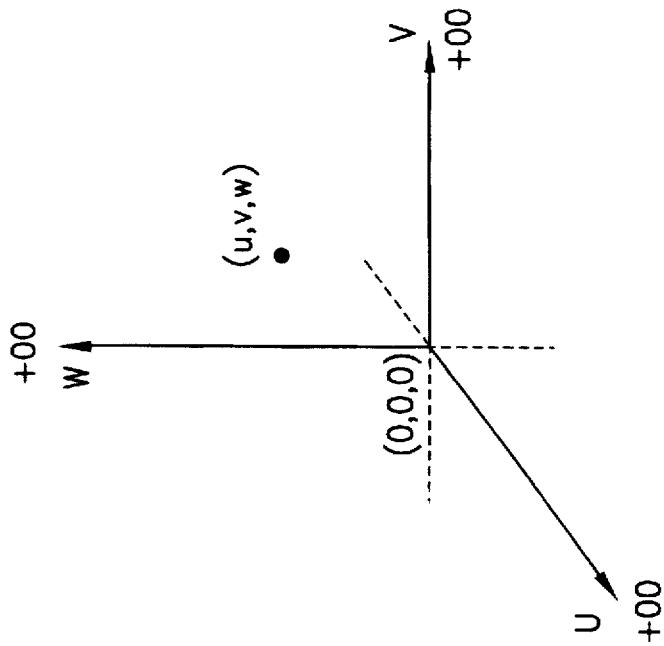
Figure 1A:
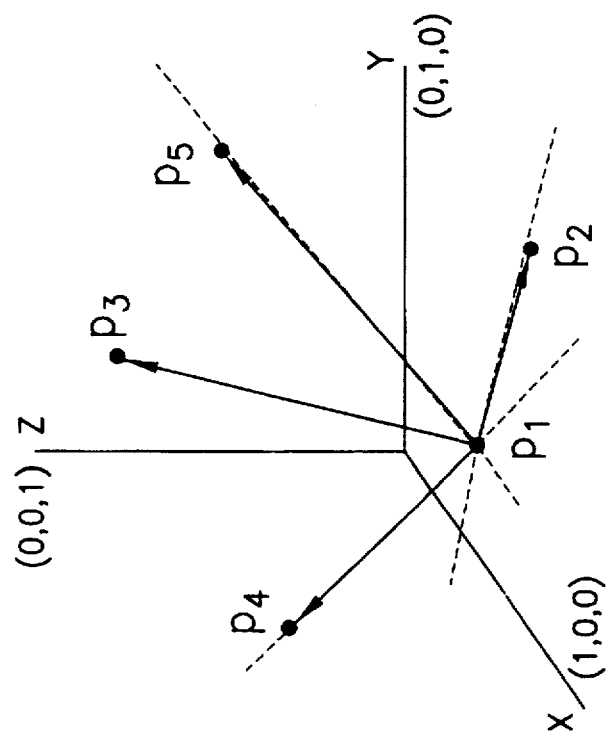
Figure 2B:
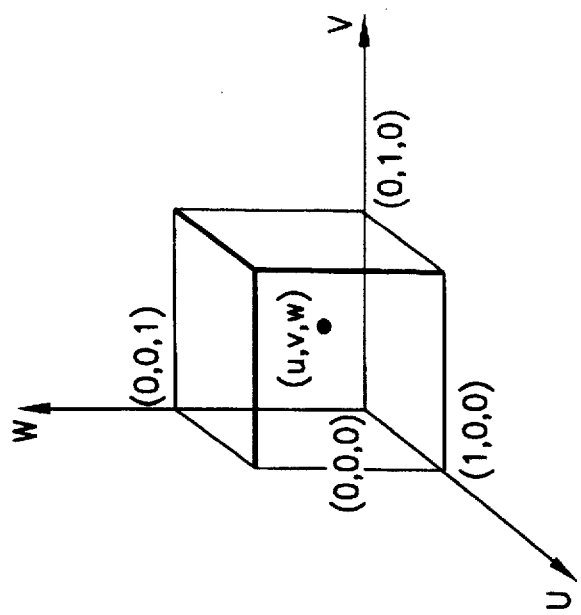
FIG. 2B is a prior art representation of the mapping of the invariant values u, v, w in the space of invariants.
Figure 2A:
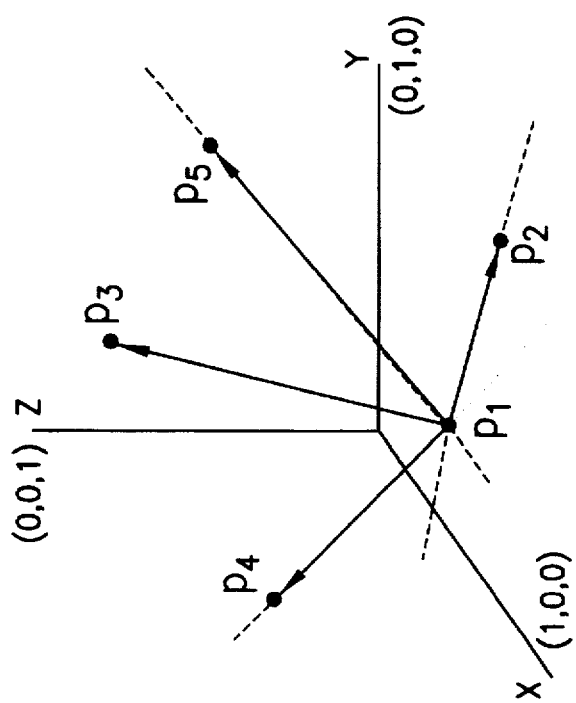
FIG. 2A is a prior art representation of four points defining a skewed coordinate frame, the four points being drawn randomly and uniformly over a convex domain.
Figure 3A:
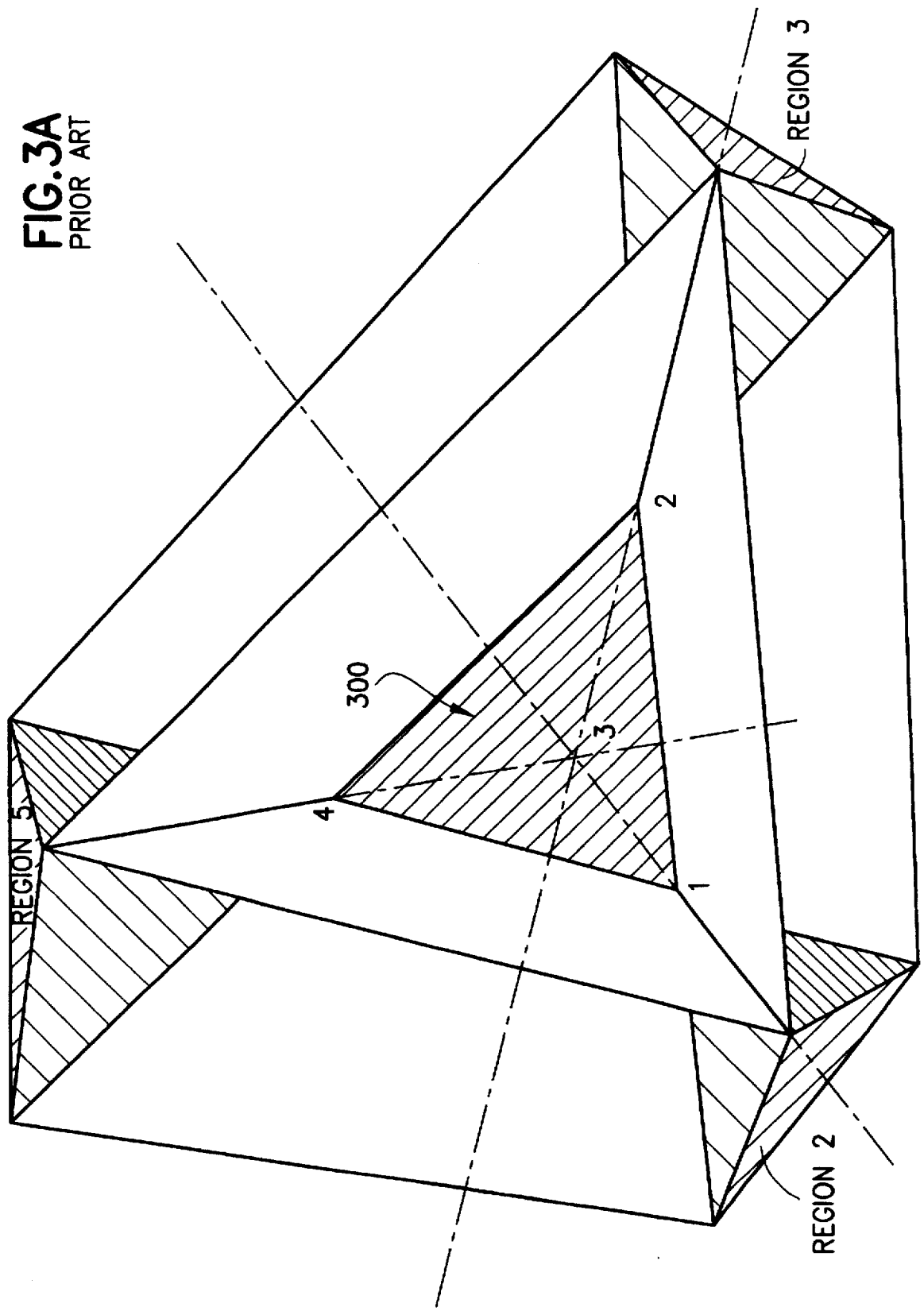
FIG. 3A is a prior art representation of three infinite trihedral regions rooted at vertices 1, 2, and 4 respectively.
Figure 3B:
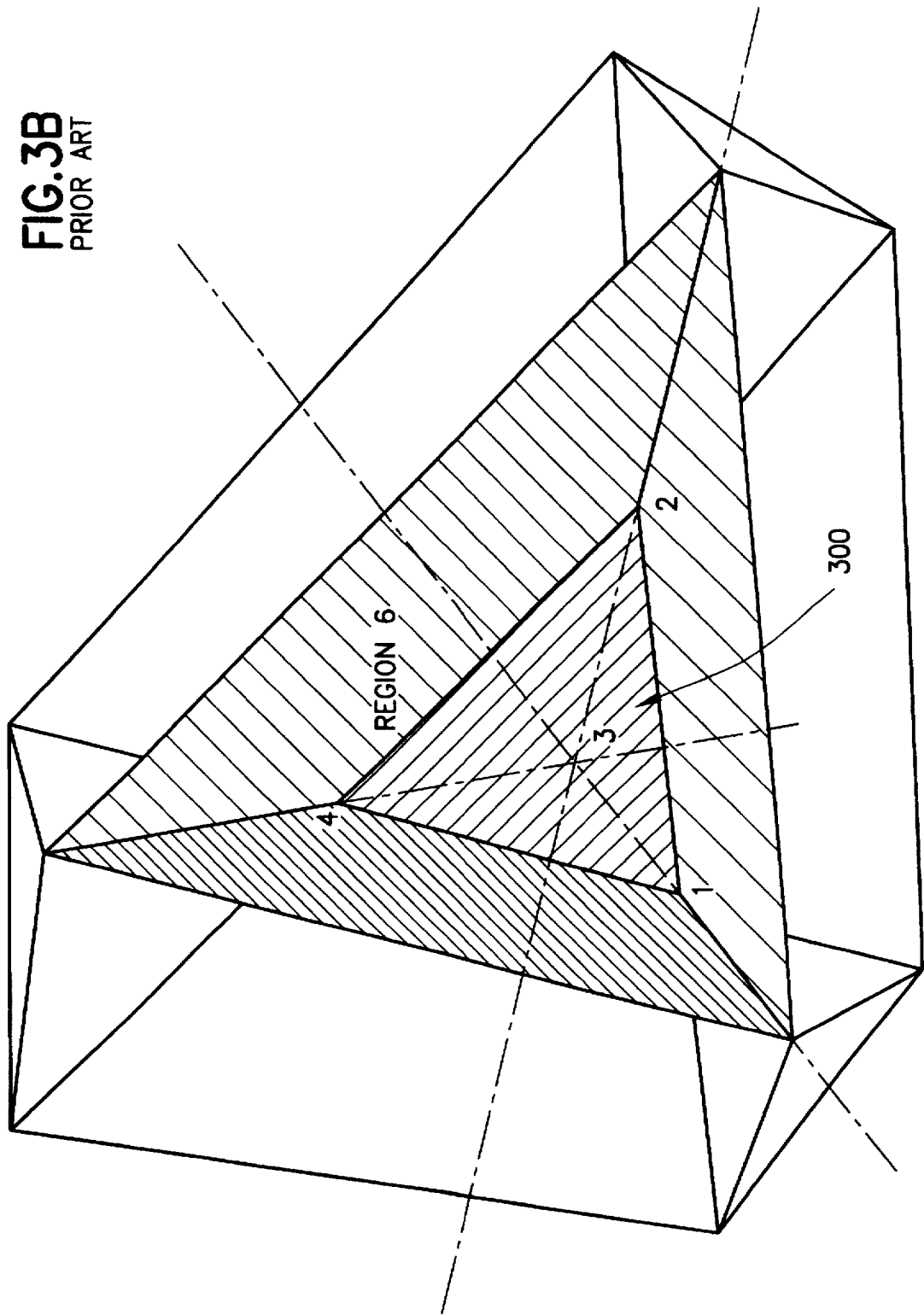
FIG. 3B is a prior art representation of an infinite quadrihedral region having face 124 on its boundary.
Figure 3D:
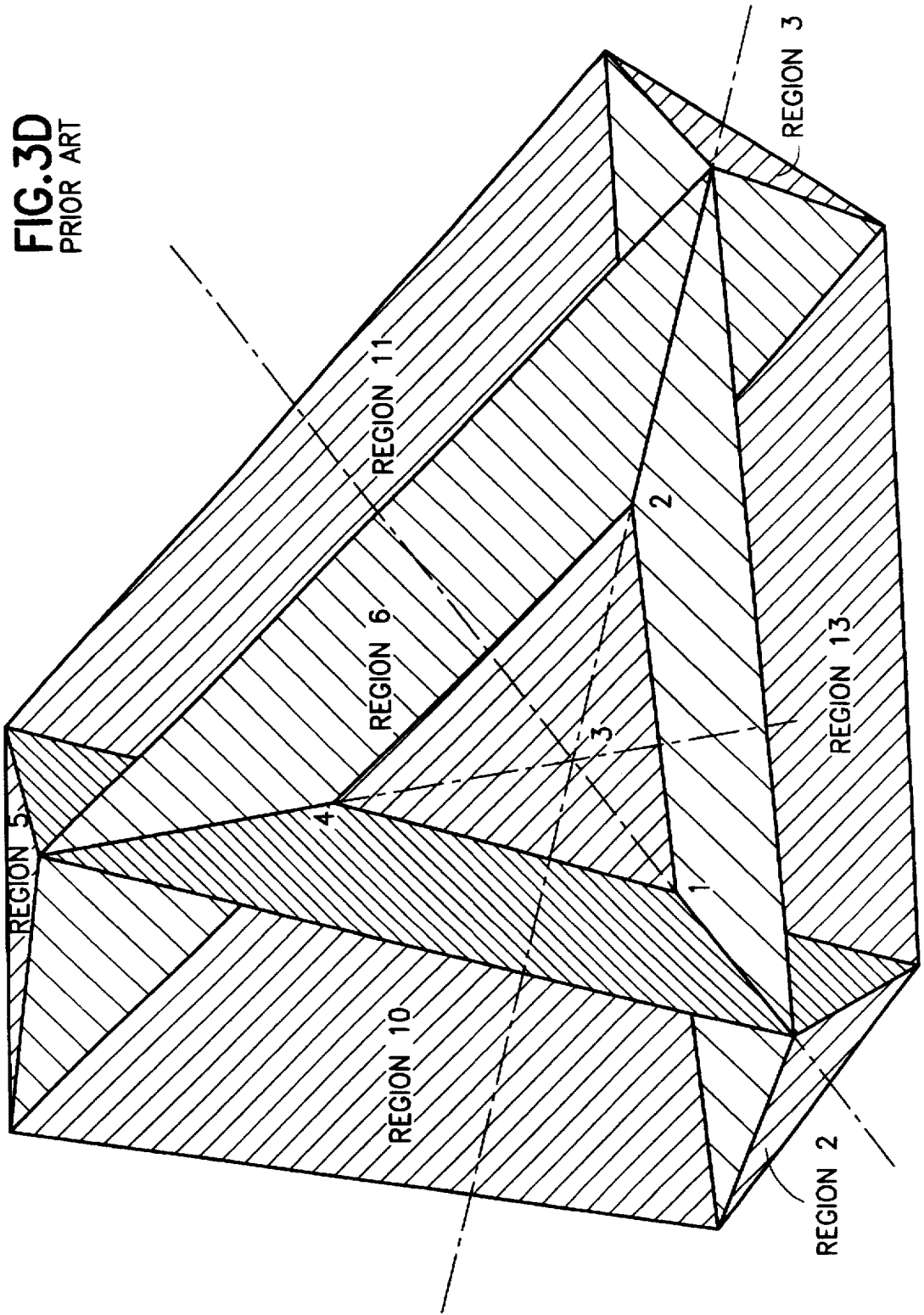
FIG. 3D is a prior art drawing that shows simultaneously all of the regions described in FIGS. 3A through 3C.
Figure 5B:
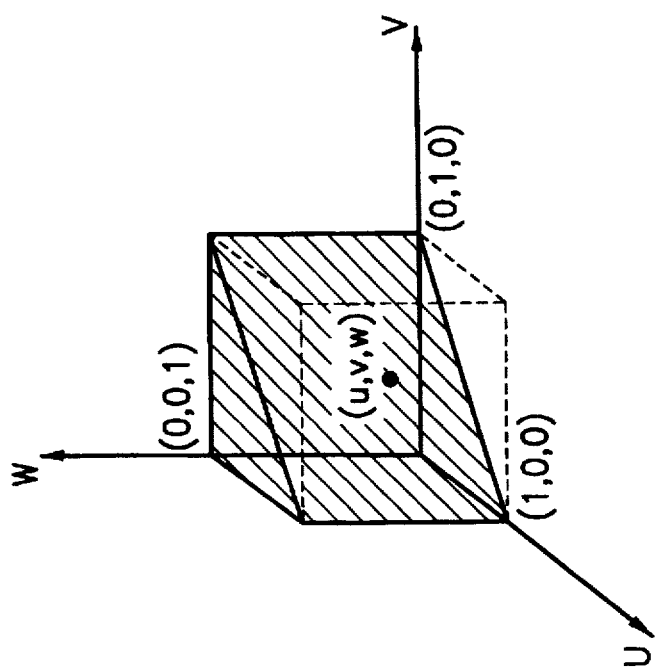
FIG. 5A and 5B are a prior art representation of where, in the space of invariants, the invariants produced by a randomly selected fifth point map for each of the five regions 6 trough 9.
Figure 5A:
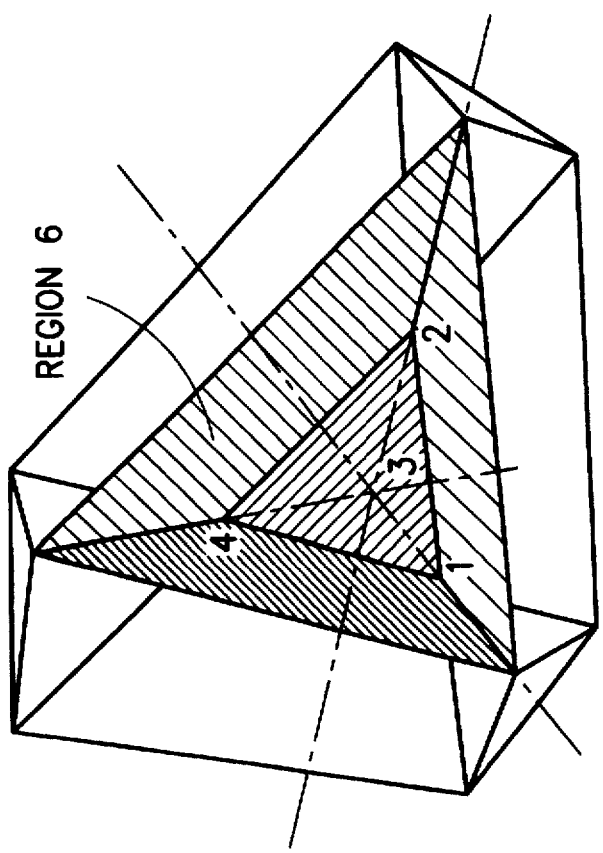

FIGS. 8A1 through 8A5 show the distribution of the invariant values for a very large number of five-point tuples randomly and uniformly selected over a convex domain, e.g. a unit cube, for classes 1 through 5 of five-point tuples.

Figure 9:
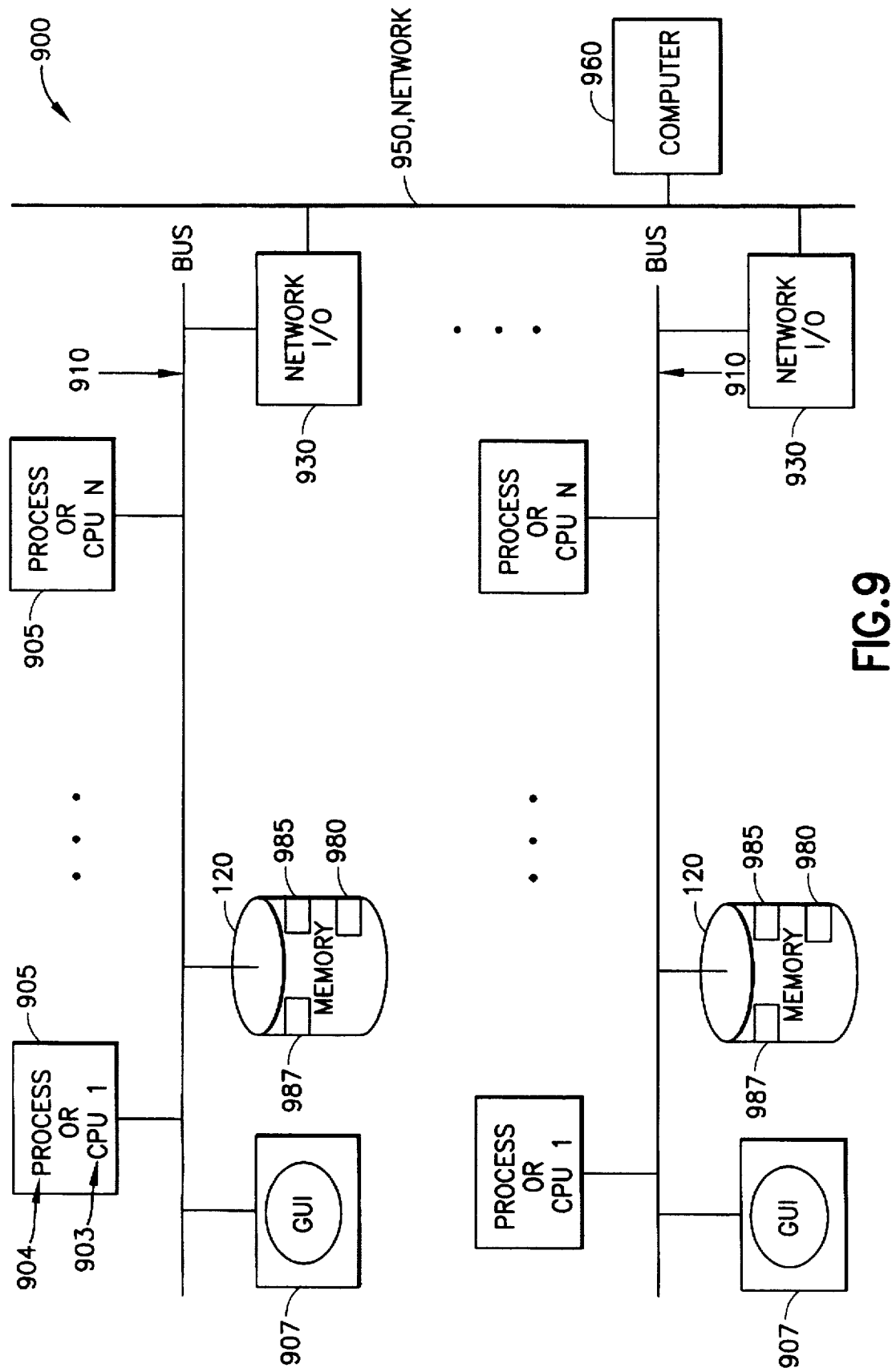

FIGS. 8A6 through 8A9 show the distribution of the invariant values for a very large number of five-point tuples randomly and uniformly selected over a convex domain, e.g. a unit cube, for classes 6 through 9 of five-point tuples.

FIGS. 8A10 through 8A15 show the distribution of the invariant values for a very large number of five-point tuples randomly and uniformly selected over a convex domain, e.g. a unit cube, for classes 10 through 15 of five-point tuples.

FIG. 9 is a block diagram of one preferred embodiment of a computer system that is used by the present invention.

Figure 10B:
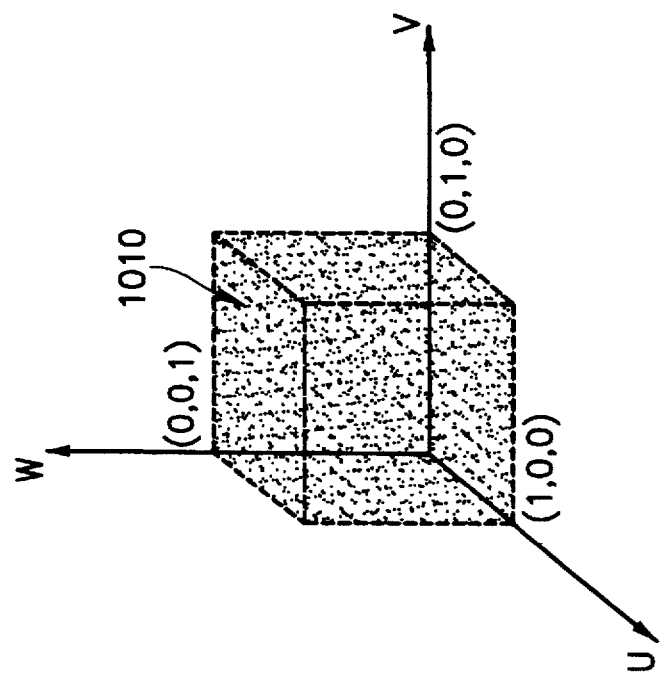
Figure 10A:
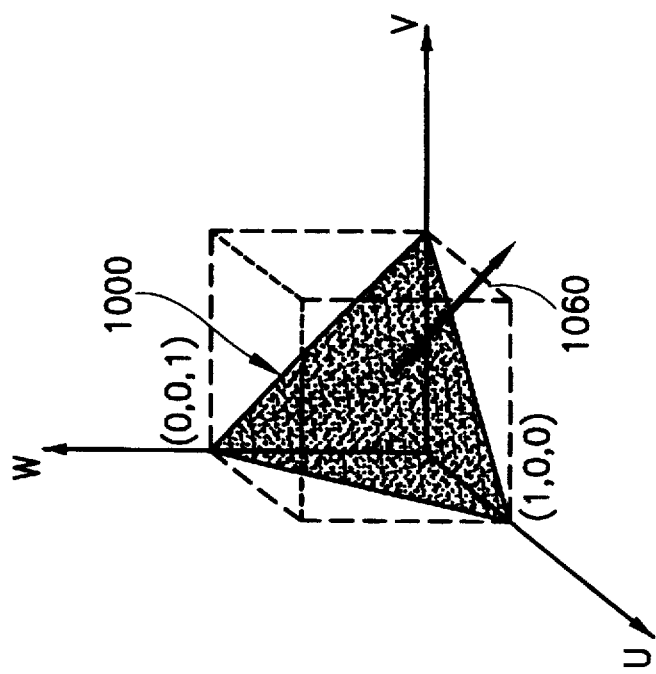

FIGS. 10A and 10B show the shape of the region occupied by the invariants produced for a very large number of five-point tuples, in any one of the only five possible RP arrangements, before and after all such invariants have been redistributed so that they now occupy the unit cube uniformly, and obtained by appropriately "stretching" the original distribution.

Figure 10C:
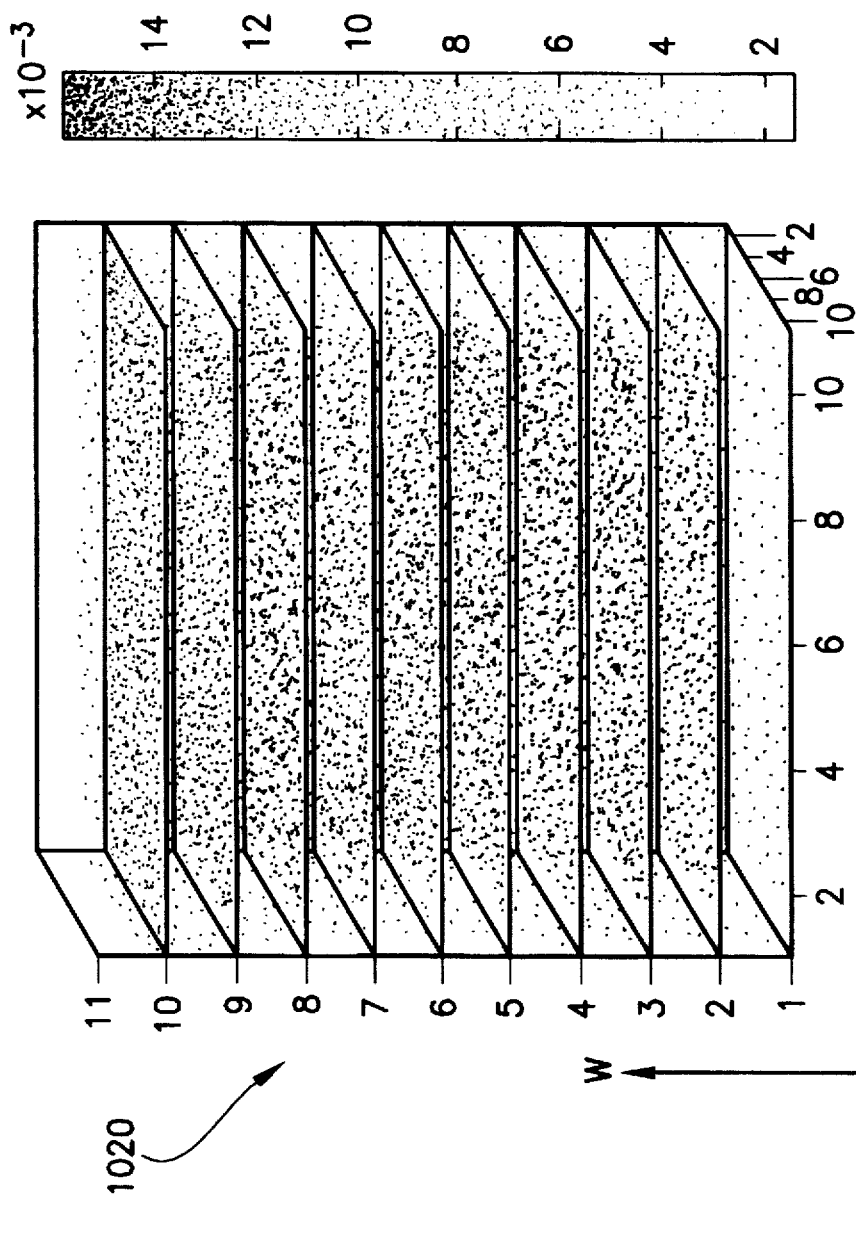

FIG. 10C shows the distribution of the invariant values for a very large number of five-point tuples randomly and uniformly selected over a convex domain, e.g. a unit cube.

Figure 11B:
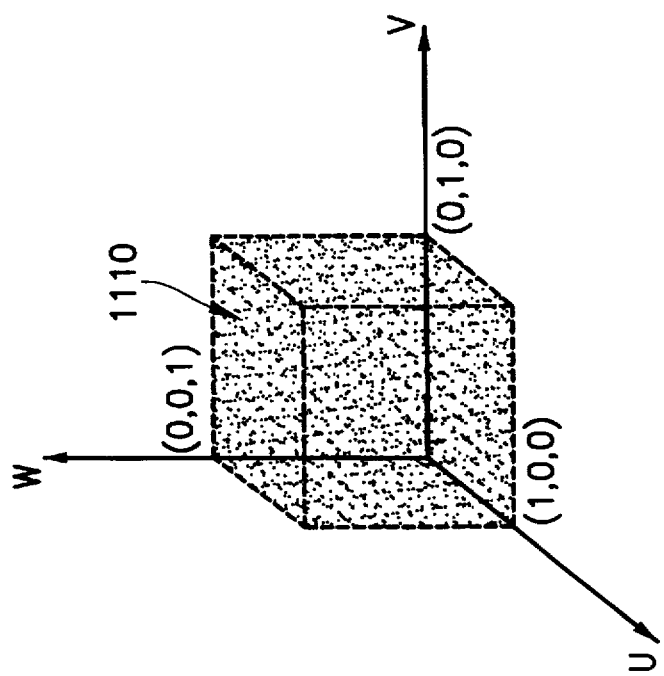
Figure 11A:
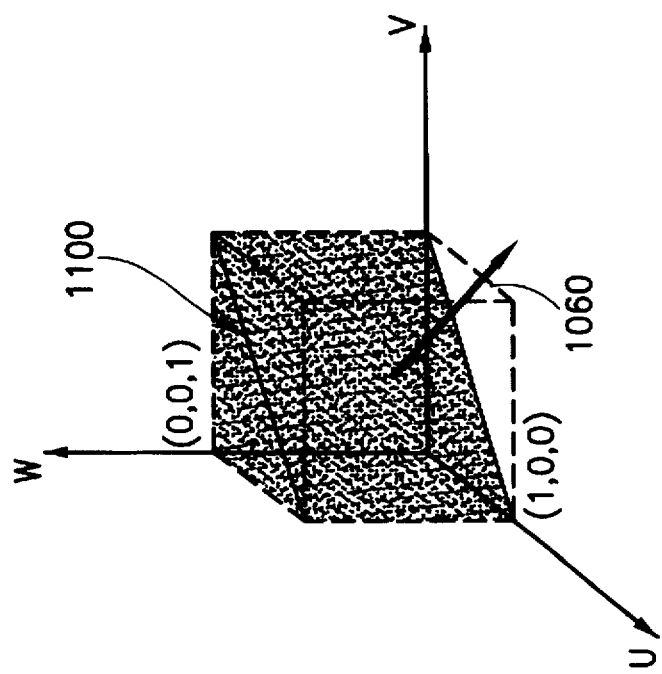

FIGS. 11A and 11B show the shape of the region occupied by the invariants produced for a very large number of five-point tuples, in any one of the only ten possible NRP arrangements, before and after all such invariants have been redistributed so that they now occupy the unit cube, and obtained by appropriately "stretching" the original distribution.

Figure 11C:
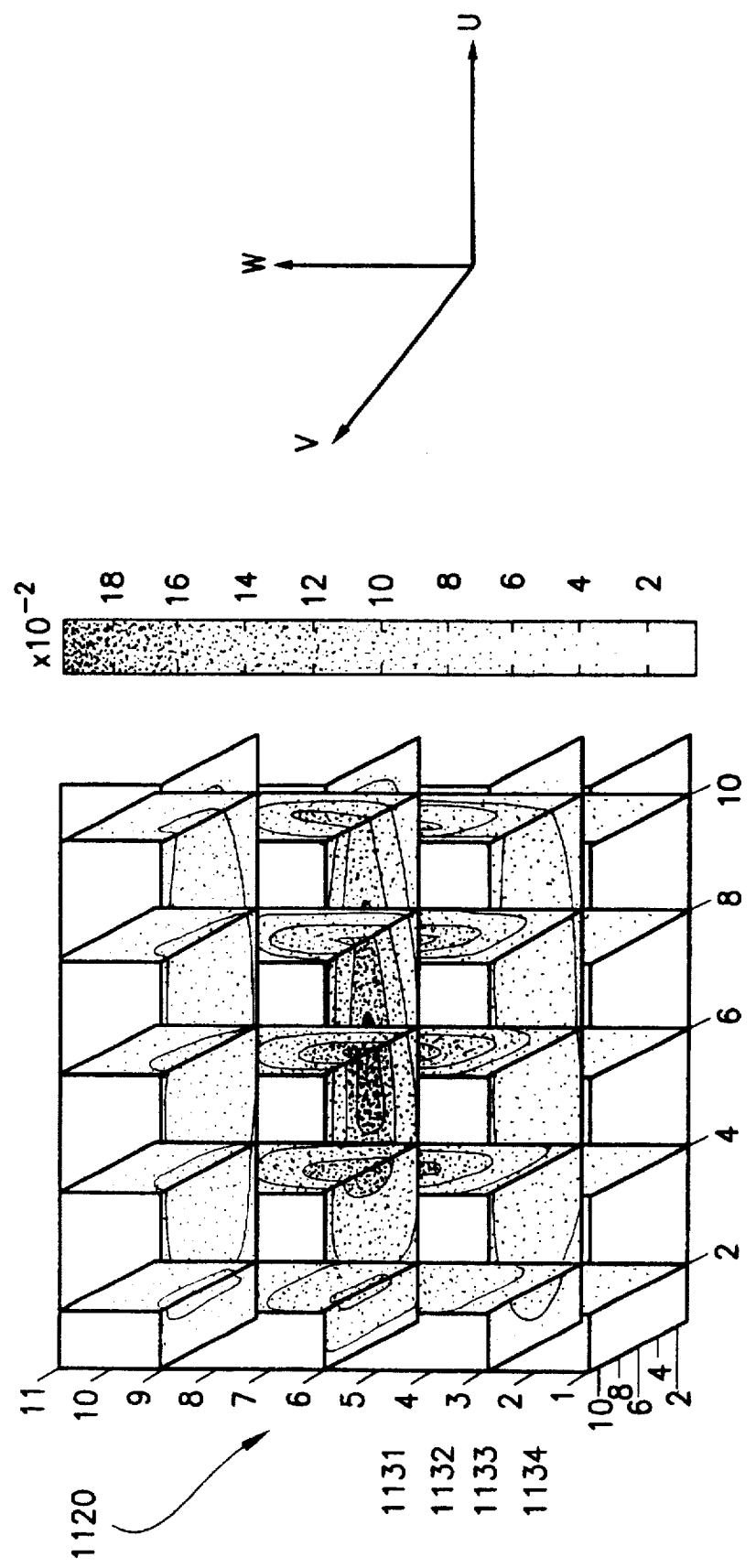

FIG. 11C shows the distribution of the invariant values for a very large number of five-point tuples randomly and uniformly selected over a convex domain, e.g. a unit cube.

Figure 12:
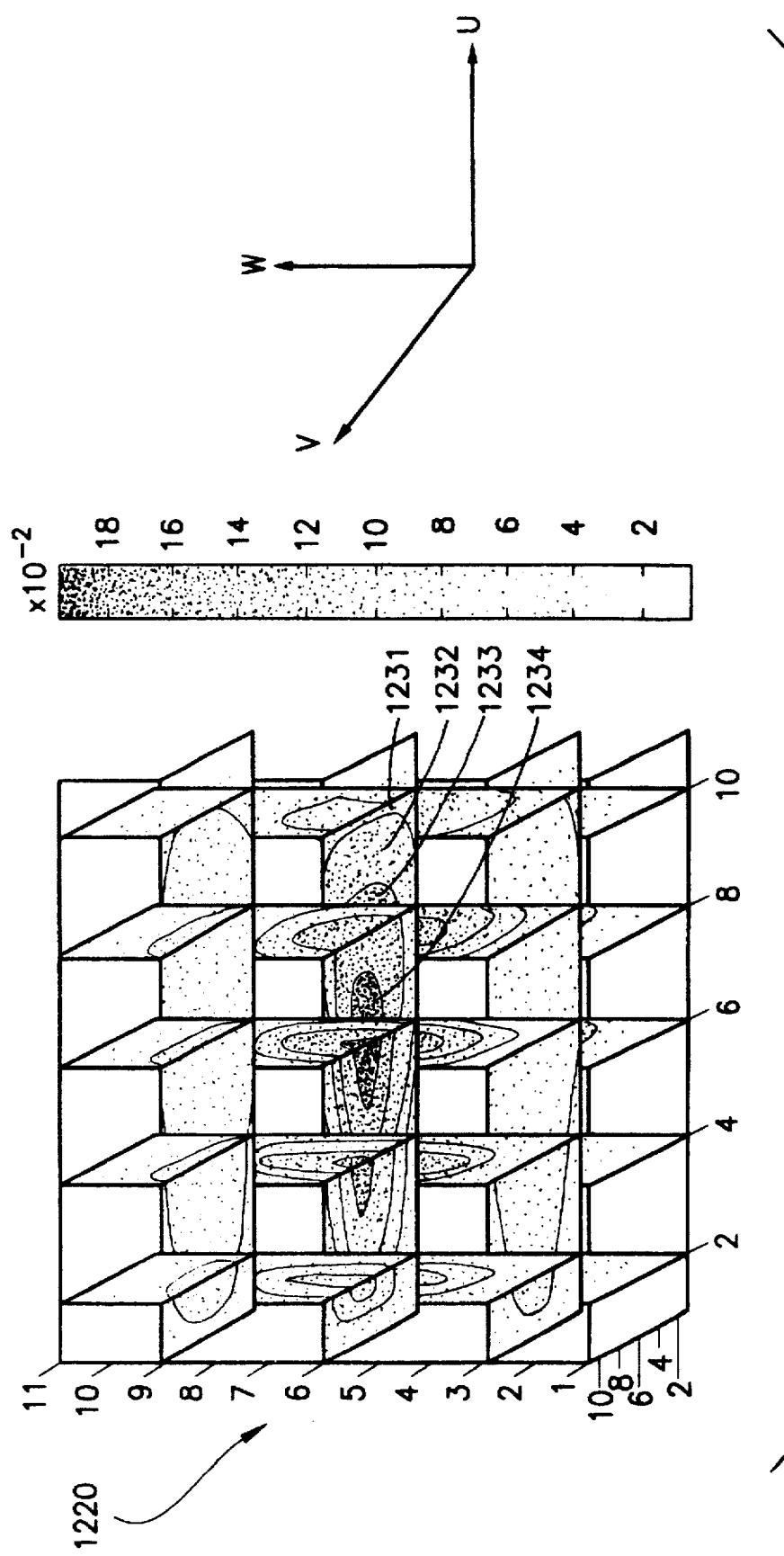

FIG. 12 shows the distribution of the invariant values of FIG. 11C, after all such invariants have been appropriately "reflected."

Figure 13A:
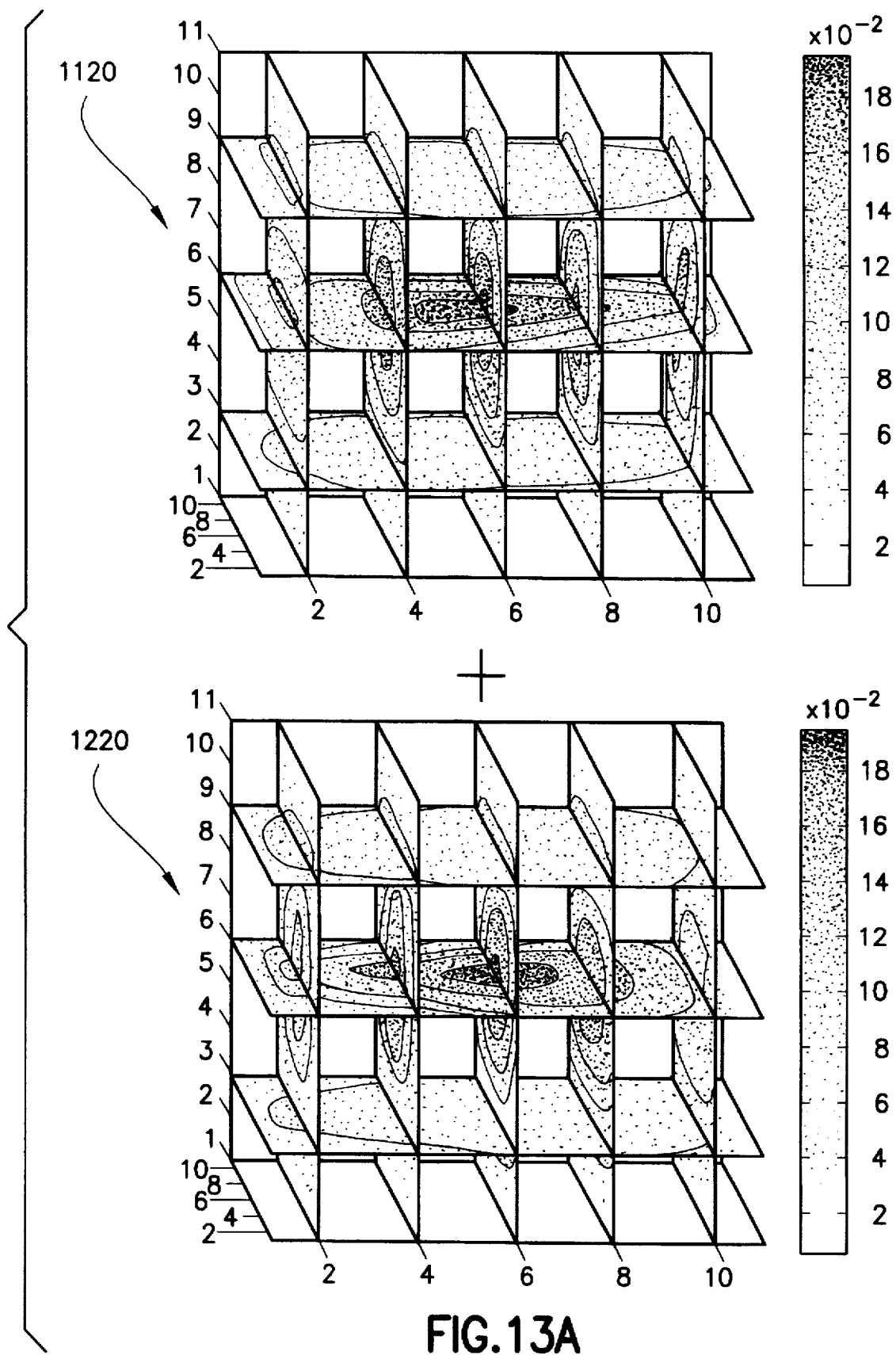
Figure 13B:
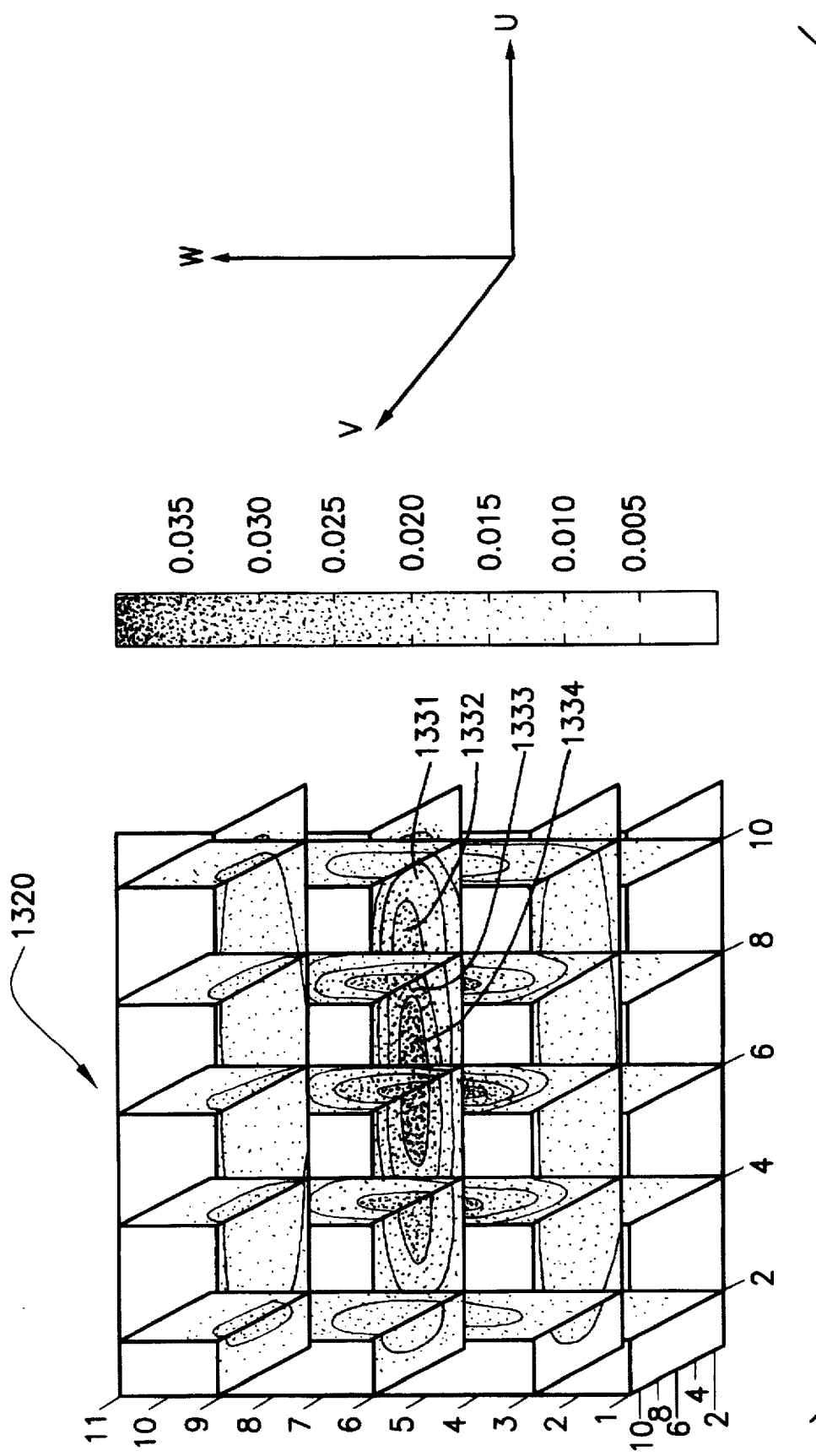

FIGS. 13A and 13B show the stacking of invariants corresponding to one region such as those depicted in FIG. 11C and to one region such as those depicted in FIG. 12C together with the distribution of invariants that is produced by such a stacking.

Figure 14:
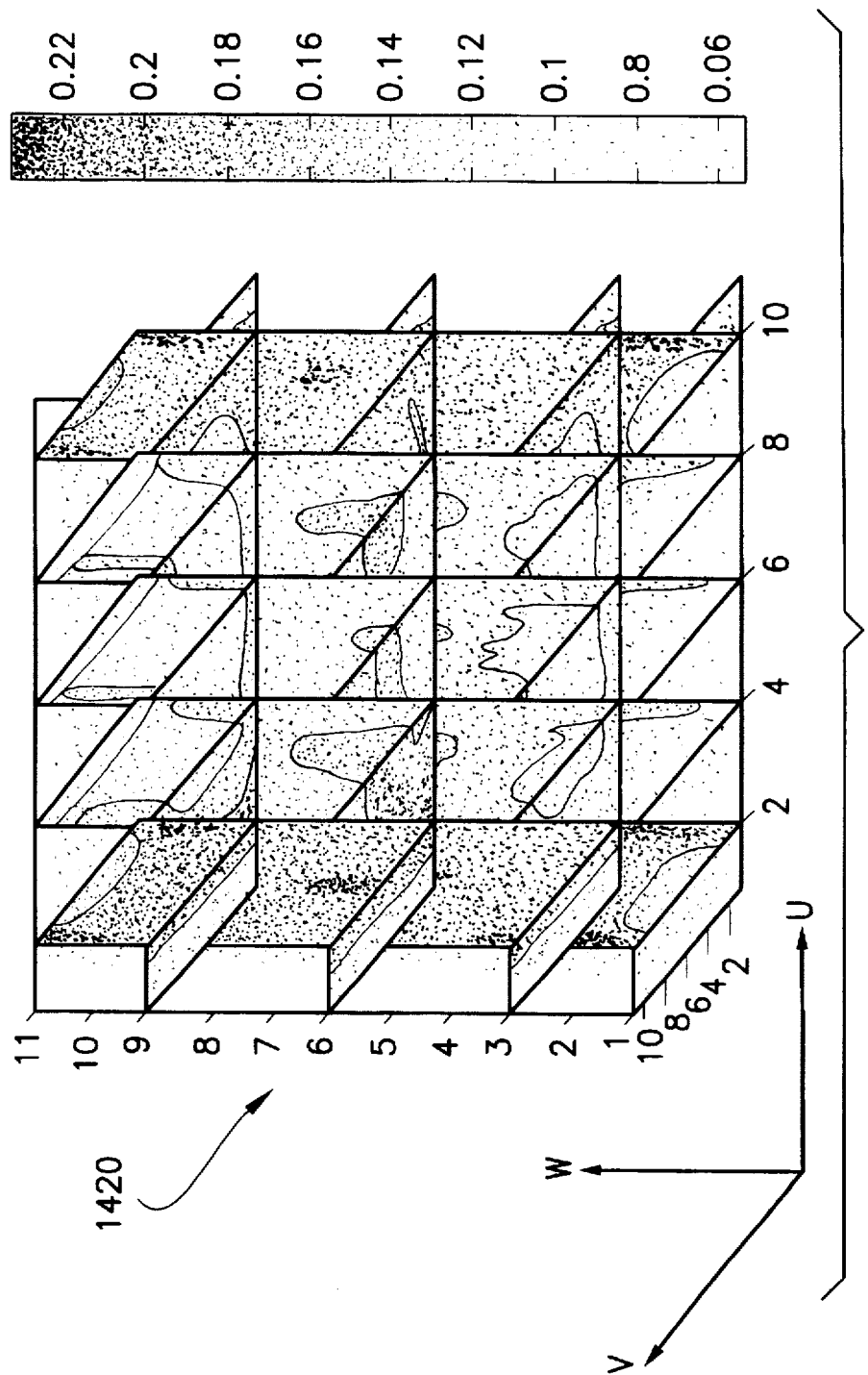

FIG. 14 shows the distribution of invariants after the result of the stacking of FIG. 13B has been flattened so that it occupies the unit cube with uniform density (within tolerance); the distribution is shown for a very large number of five-point tuples randomly and uniformly selected over a convex domain, e.g. a unit cube.

FIGS. 15A through 15E show the stacking of invariants produced by five-point tuples in each of the fifteen possible arrangements after they have been re-transformed (stretched, reflected, flattened) so that they are uniformly (within tolerance) distributed over the unit cube.

Figure 15A:
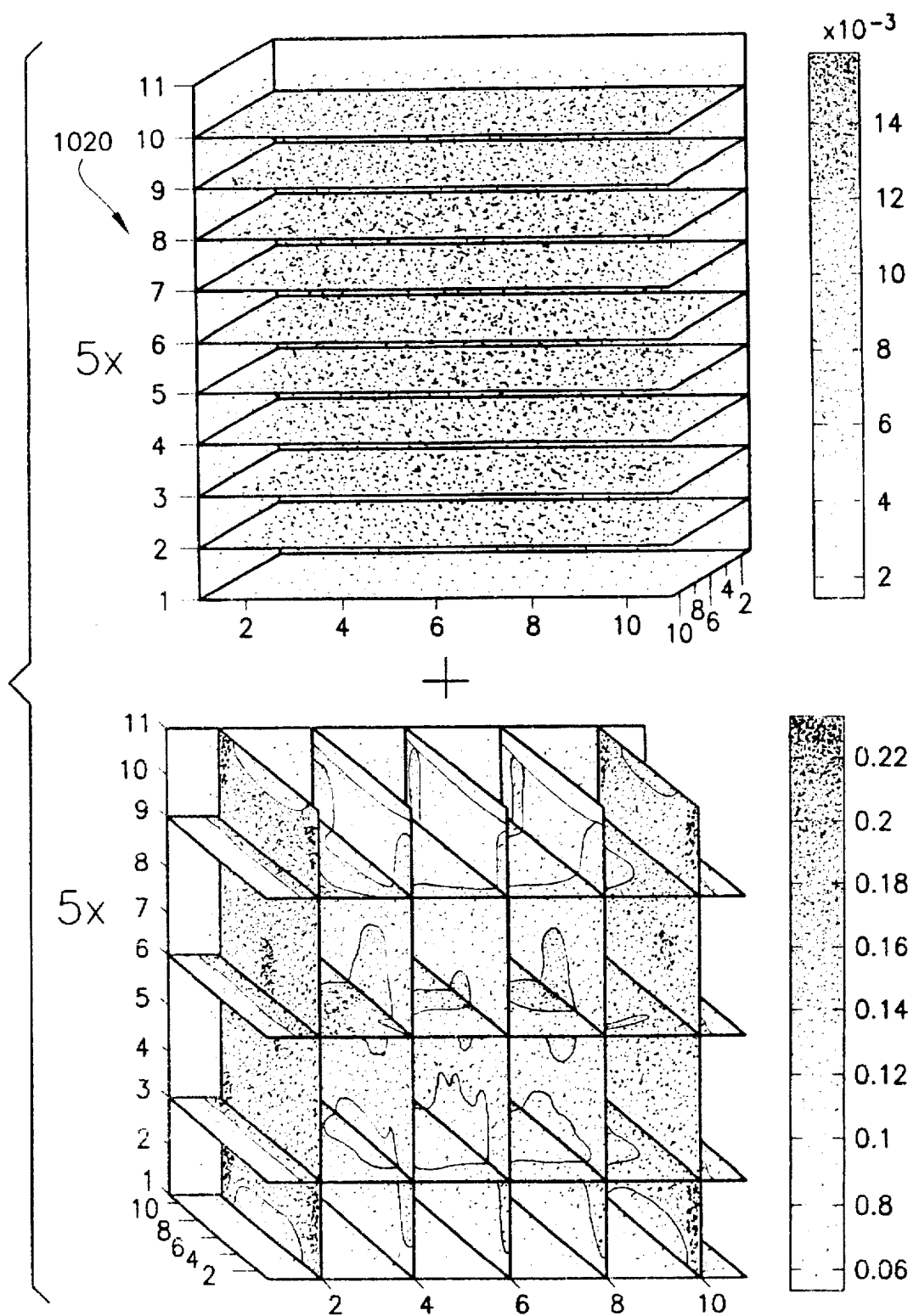
Figure 15B:
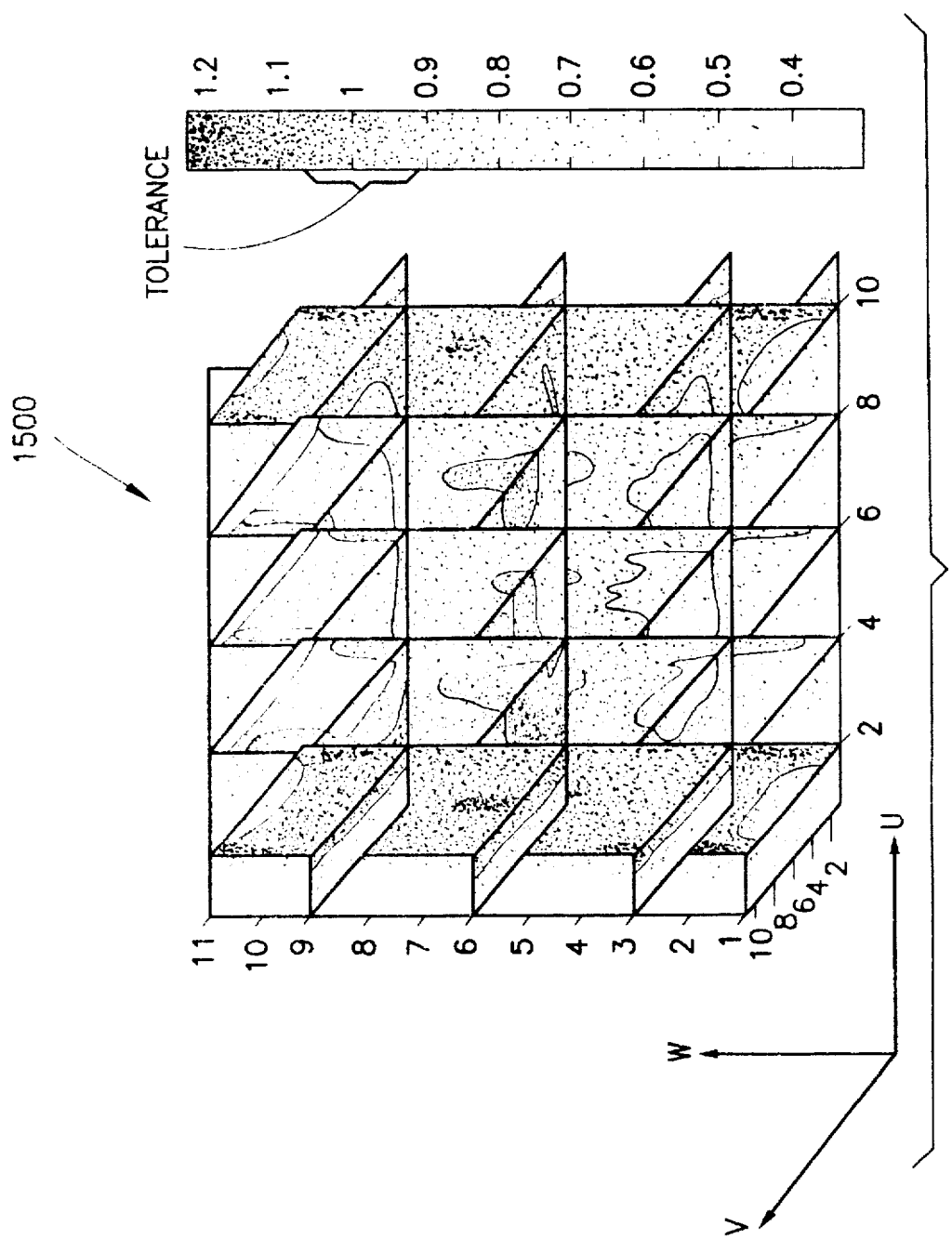
Figure 15C:
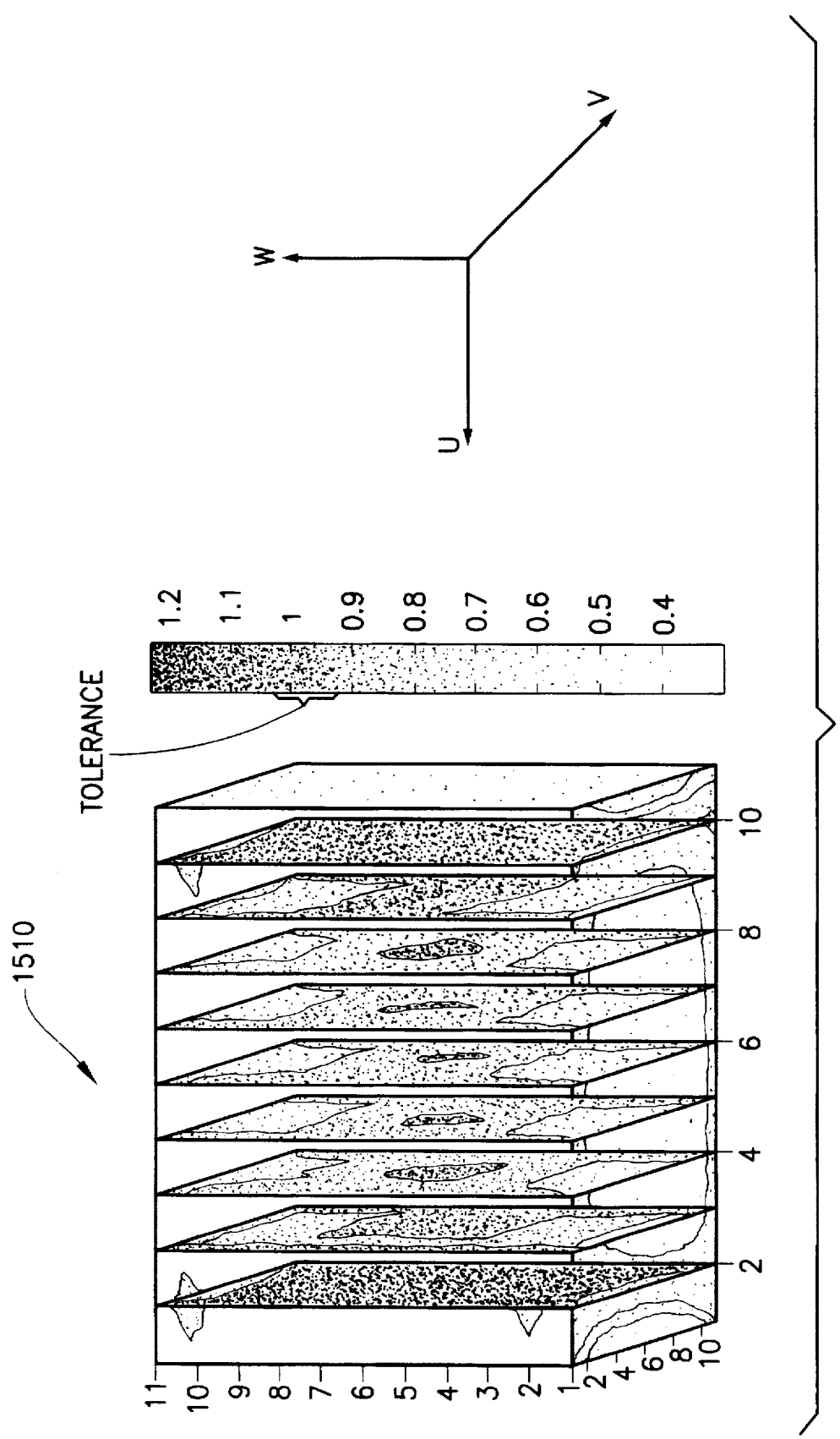
Figure 15D:
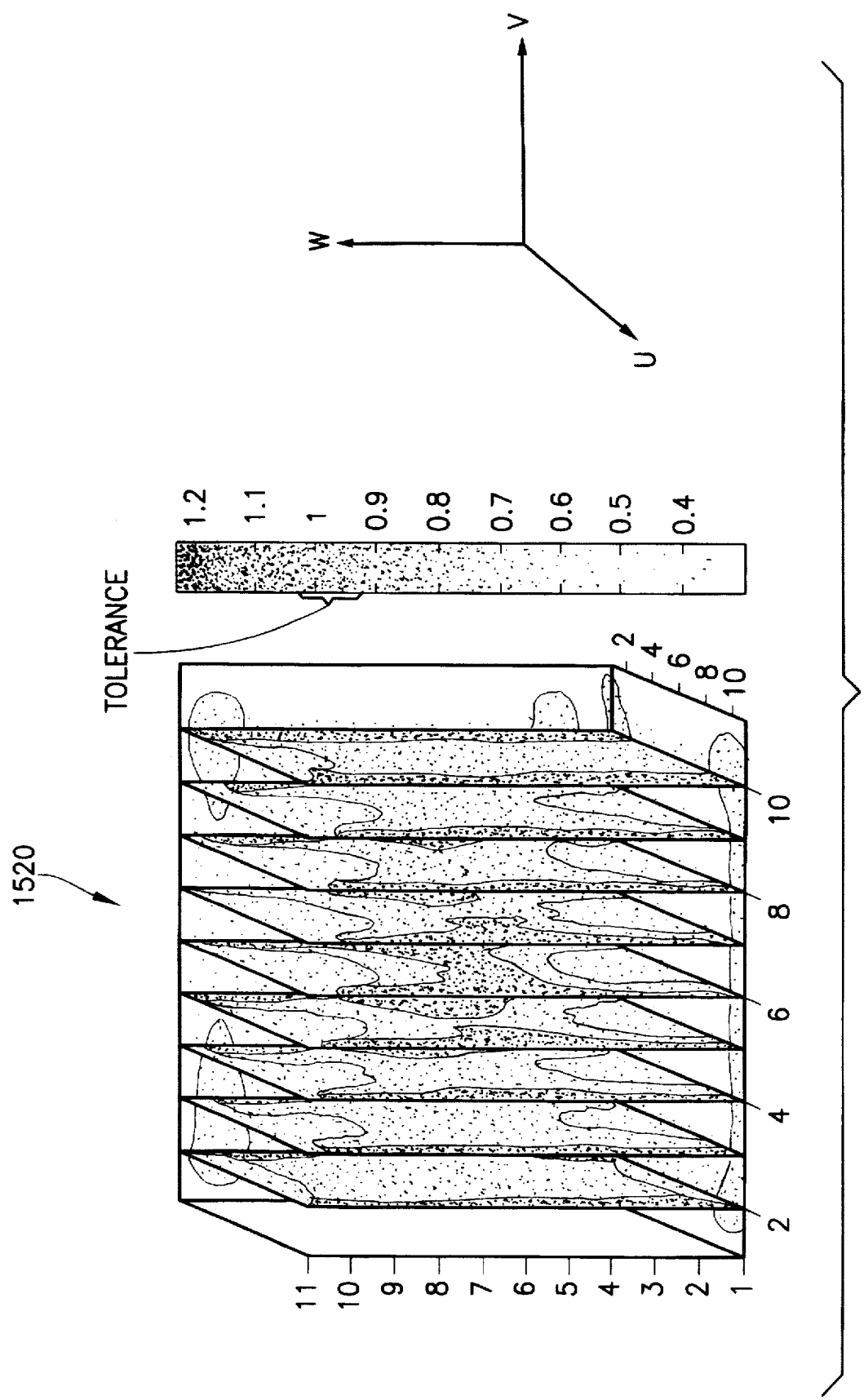
Figure 15E:
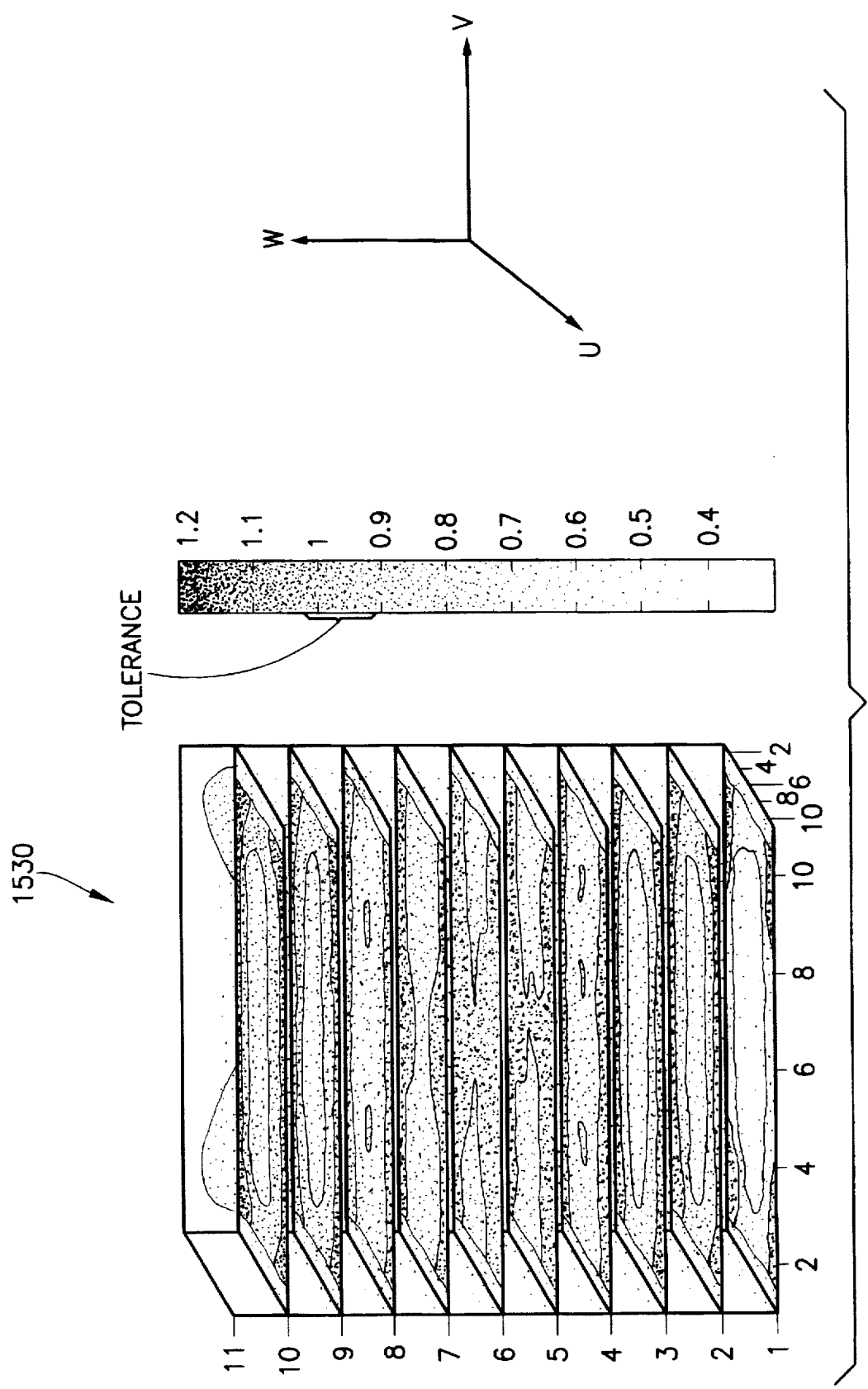
Figure 16A:
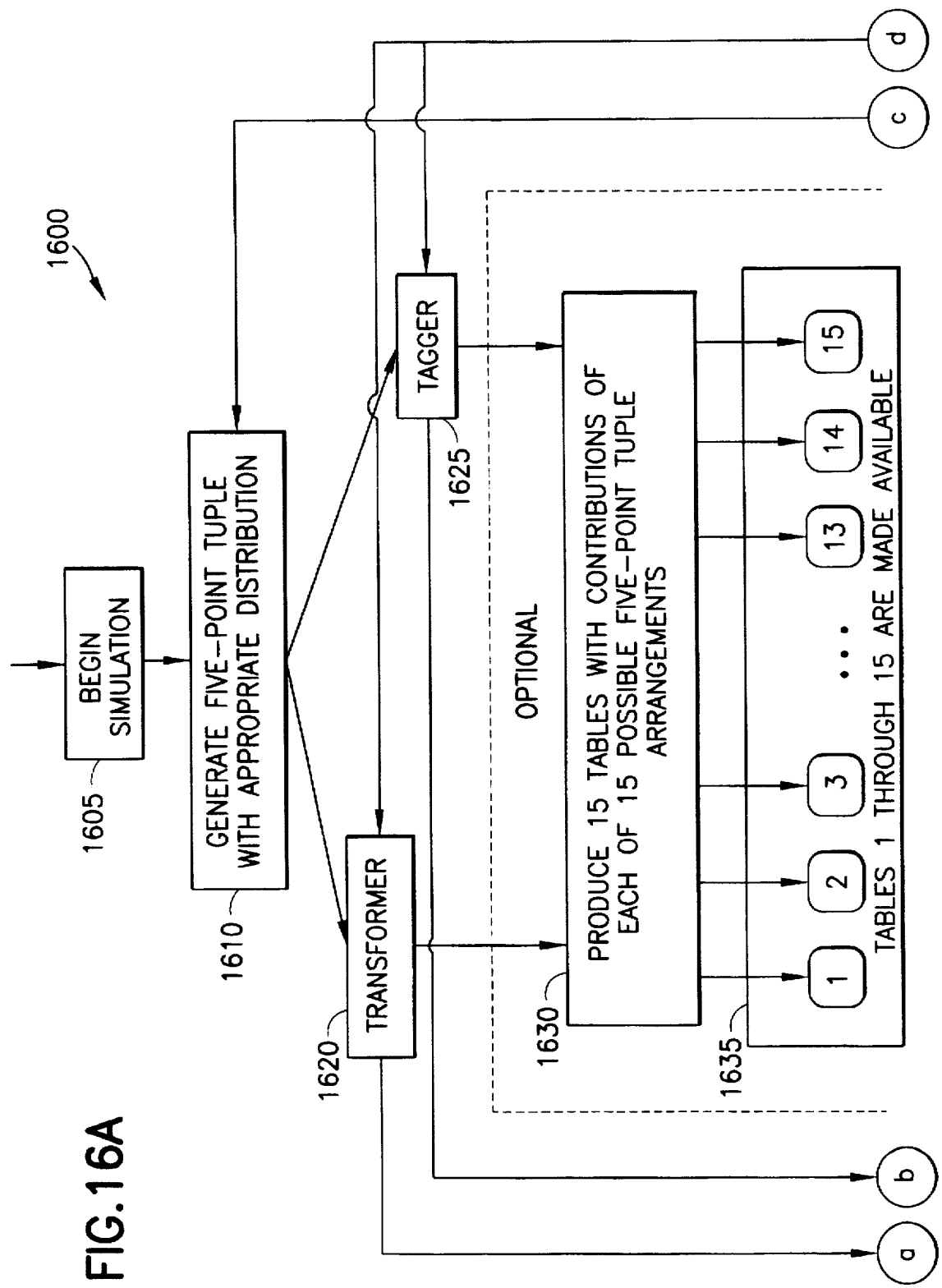
Figure 16B:
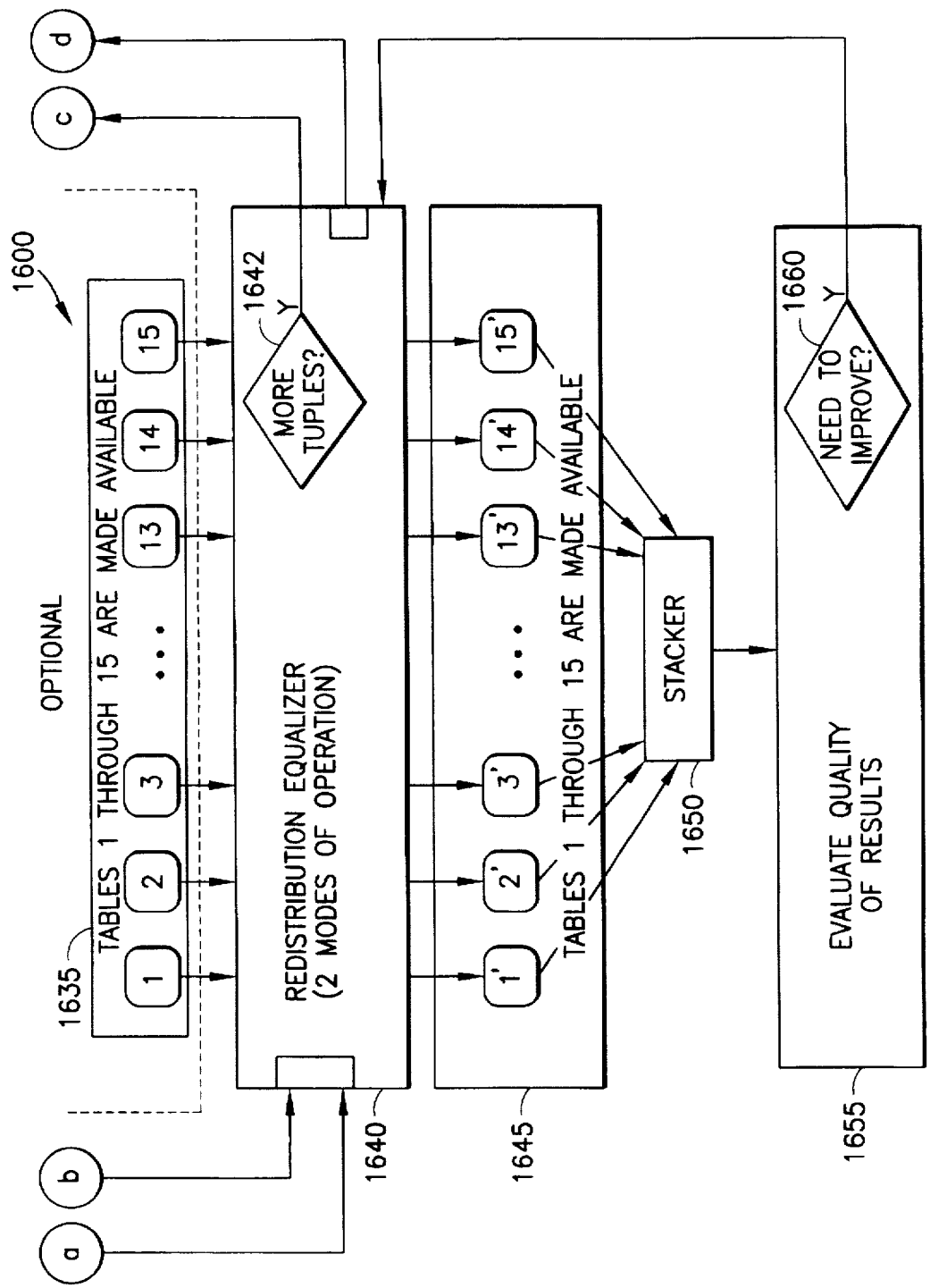

FIGS. 16A and 16B are a flowchart showing the steps performed to create the result shown in FIGS. 10 through 15.

FIG. 17A is a flowchart showing the steps performed by a "stretch pyramid" process.

FIG. 17B is a flowchart showing the steps performed by a "stretch prism" process.

Figure 18:
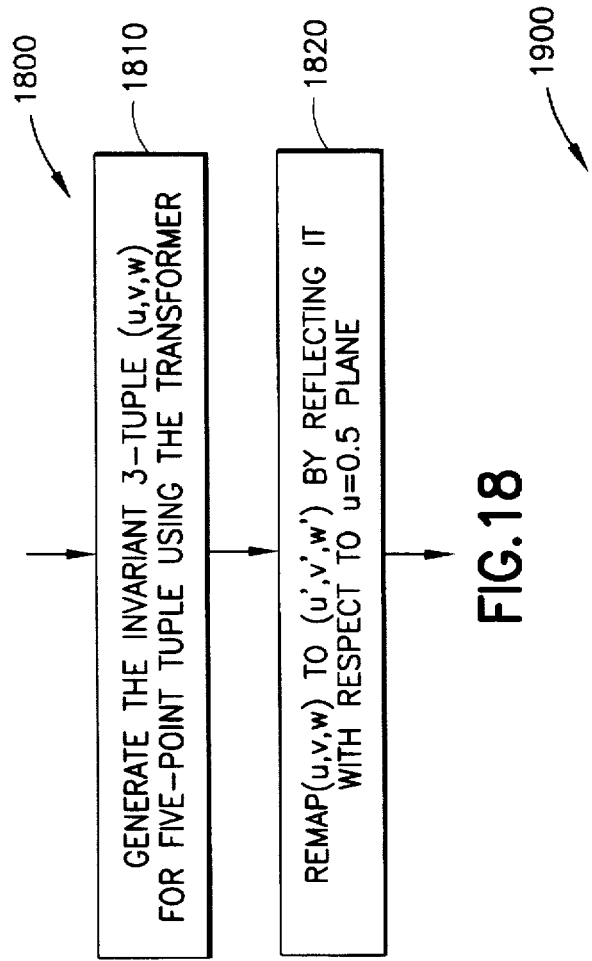

FIG. 18 is a flowchart showing the steps performed by a "reflect" process.

Figure 19:
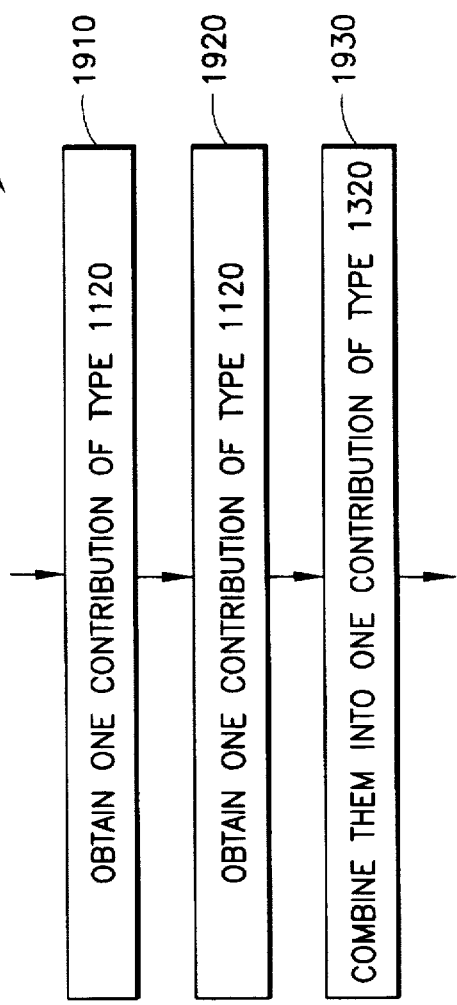

FIG. 19 is a flowchart showing the steps performed by a "stack" process.

FIG. 20 is a flowchart showing the steps performed by a "approximate" process.

FIG. 21 is a flowchart showing the steps performed by a "flatten" process.

Figure 22A:
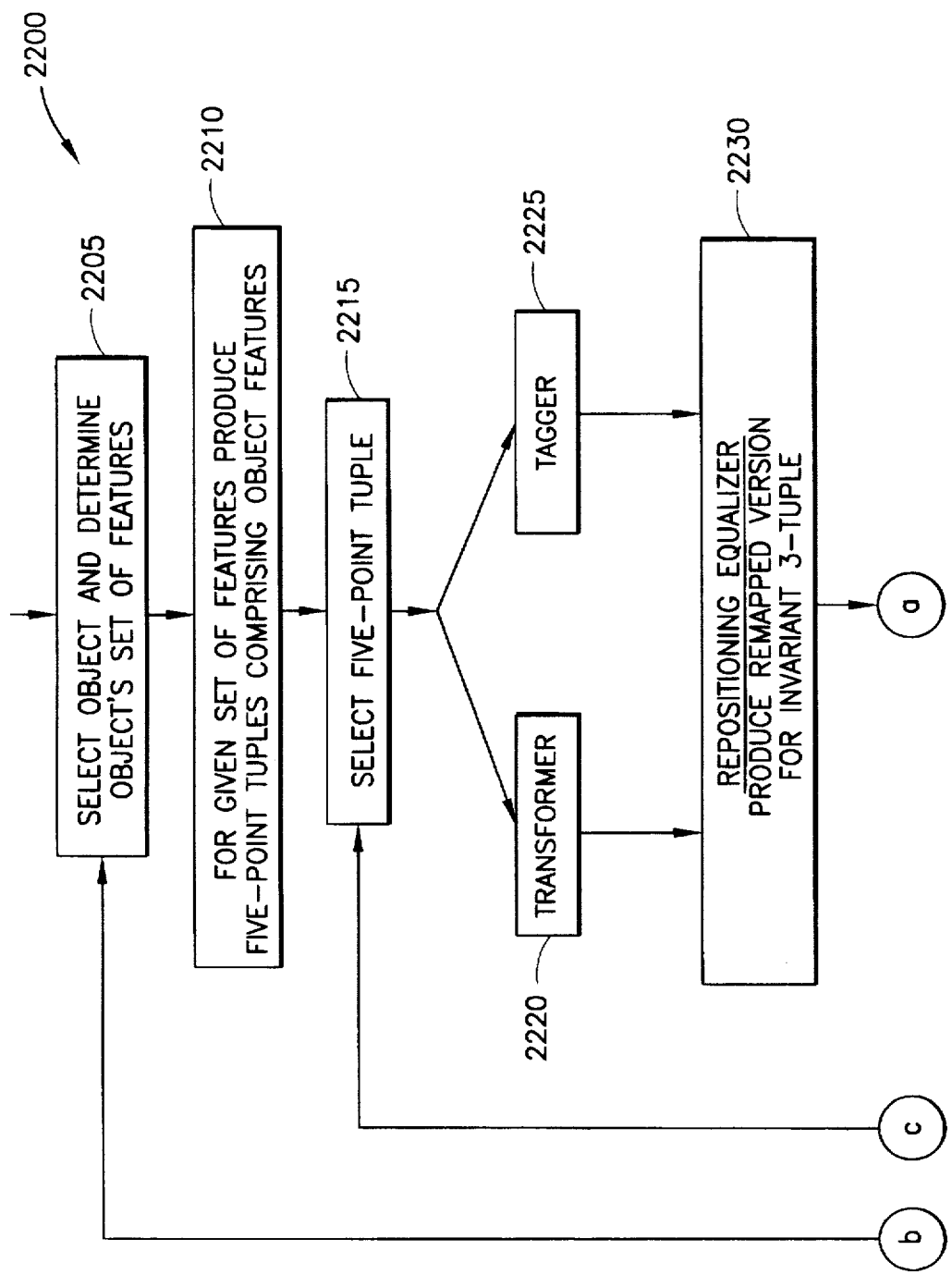

FIGS. 22A and 22B are a flowchart showing a method of use of the present invention on single or multiple processor computer systems.

Figure 23:
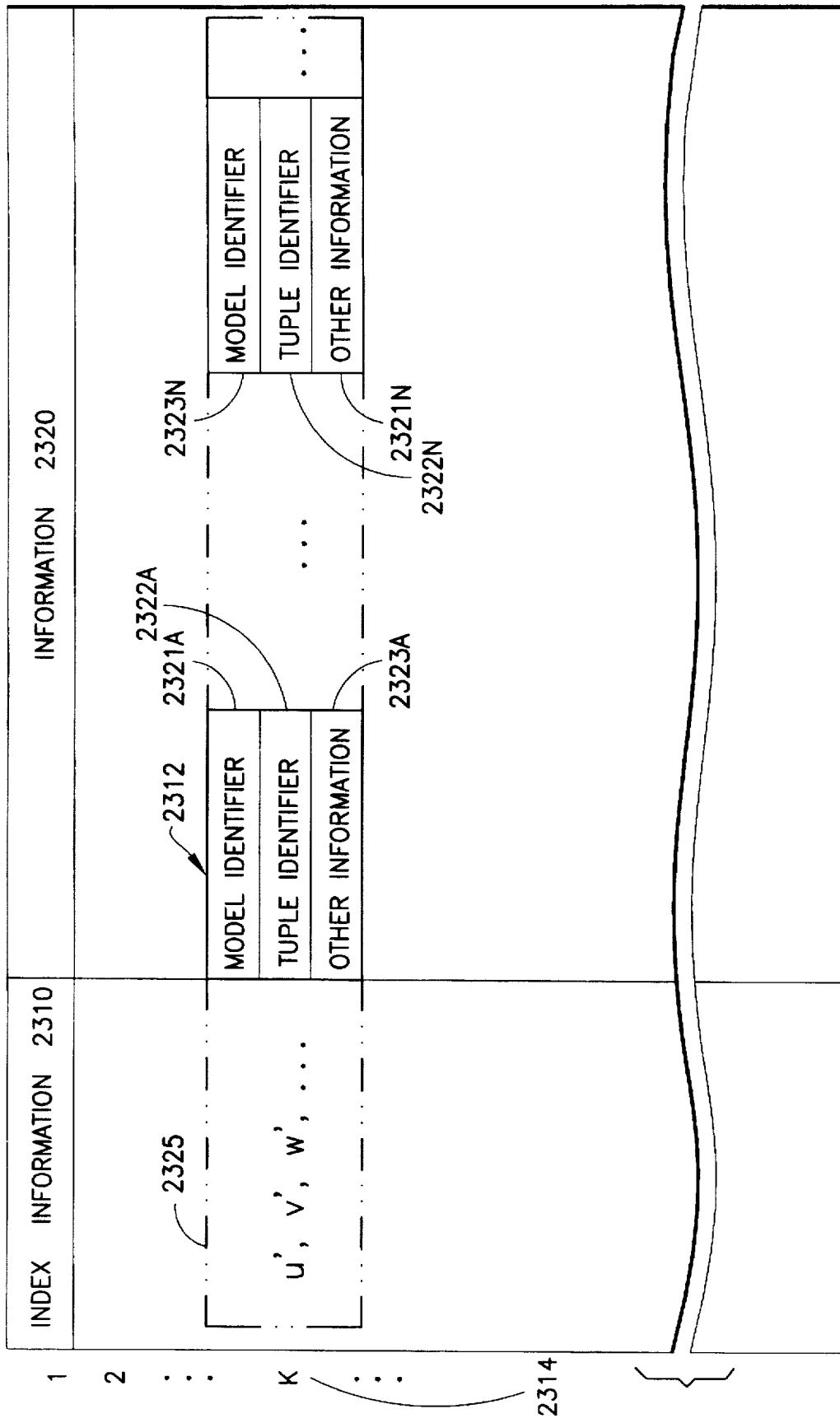

FIG. 23 is a depiction of a table indexed by the invariants generated by the present invention and used by the method in FIG. 22.

FIG. 24 is a depiction of a table, indexed by the invariants generated by the present invention and used by the method in FIG. 22, that shows the occupancy distribution across the table's bins before the application of the method described in this invention.

FIG. 25 is a depiction of a table, indexed by the invariants generated by the present invention and used by the method in FIG. 22, that shows the occupancy distribution across the table's bins after the application of the method described in this invention.

Figure 26:
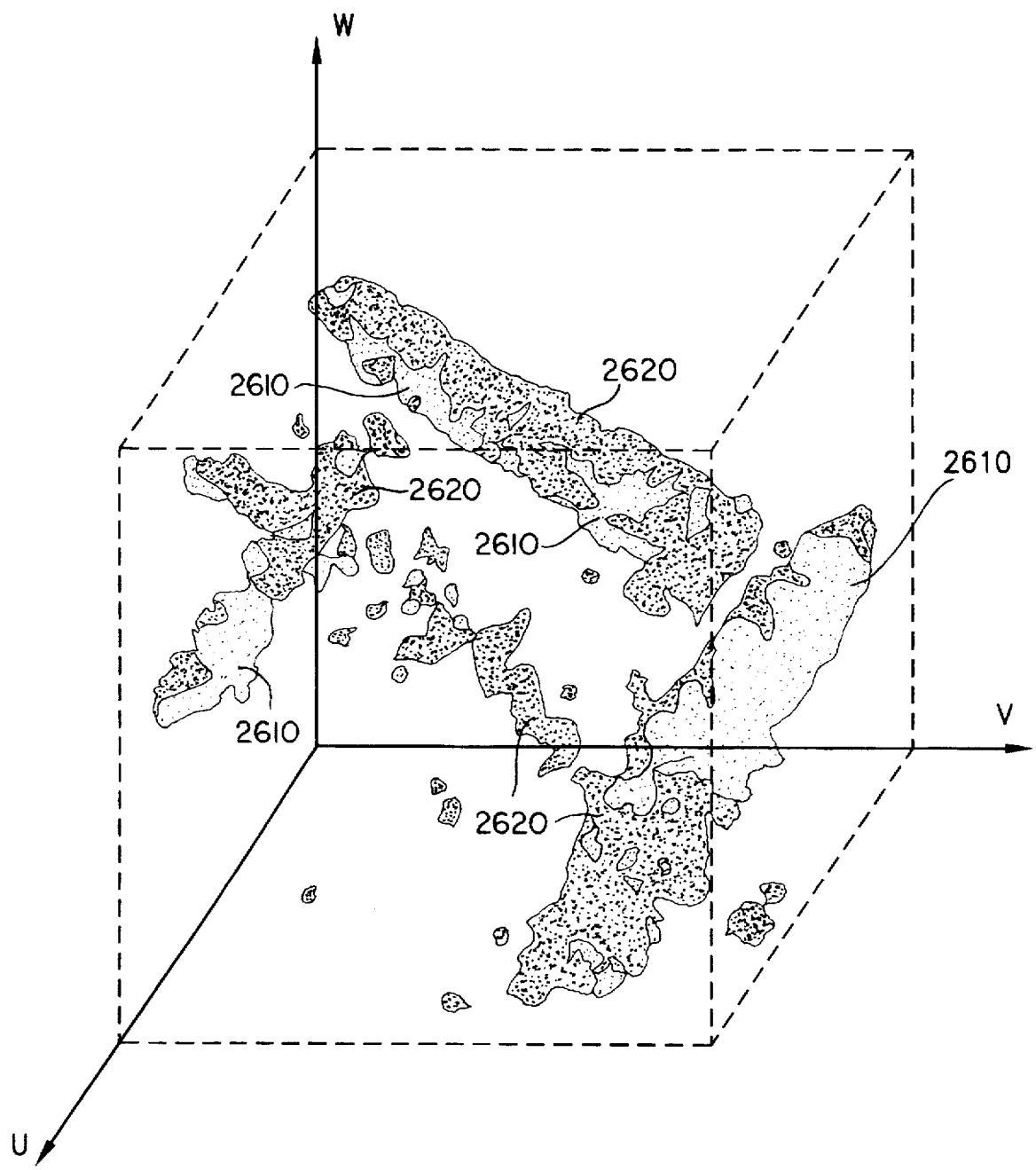

FIG. 26 shows a distribution of invariants that correspond to surface patches of the receptor site of HIV's reverse transcriptase and of the ligand nevirapine (an anti-HIV drug).

7.0 DETAILED DESCRIPTION OF THE INVENTION

Before proceeding, it is worth stressing that, as stated already, the objective of this discussion is to produce a method and a system that will allow the efficient handling of large databases of models. These models could represent actual physical objects such as airplanes, cars, fingerprints etc. Alternatively, they could be more abstract in the sense that they could be for example measurements of three physical variables (e.g. pressure, humidity and temperature) and as such could be represented as a collection of points in three-dimensional space. All such cases suffer from a recurrent problem, that of the non-uniform distribution of the indices (representing these physical objects) over the space of invariants (and thus over the hash table). Any system that would need to carry out store and retrieve operations on large databases would need to address the problem of non-uniformity since the latter directly affects computational and search load sharing, disk storage usage, ability to discriminate among models, etc. The method and system proposed herein alleviate such problems by directly attacking the problem at its root: that of making a non-uniform distribution of the indices/invariants more uniform.

Although Ambartzumian did identify the existence of the fifteen distinct regions in which the fist five points of the tuple divide the space, he did not recognize or disclose the components to the probability density for the distribution of produced values in the space of invariants. Through a Monte-Carlo simulation, five-point tuples are drawn uniformly from a convex domain (a cube) and invariants are produced using Ambartzumian's invariant producing equations. Counters are maintained for buckets corresponding to a tessellation of the space of invariants. Note that since the values of the produced invariants are in the interval $[0,1] \times [0,1] \times [0,1]$ the table can "cover" all of this (finite-extent) region. At the end of the simulation, a discretized version of the probability density function is produced.

It should be pointed out here that the probability density function corresponding to the distribution of the produced invariant values u, v, and w is a three-dimensional function and it would be best shown as a density plot of the occupancy inside the cube $[0,1] \times [0,1] \times [0,1]$. However, such plots are hard to produce and visualize. In this analysis, an alternative has been followed: what is shown is appropriately chosen "slices" of the density within the cube of invariants and for various combinations of one or more of u, v, or w. This means of visualizing the results is "rich" enough to capture all important information, whereas the combinations of u, v, and w are selected in such a way so that the maximum amount of information is conveyed.

Figure 7A:
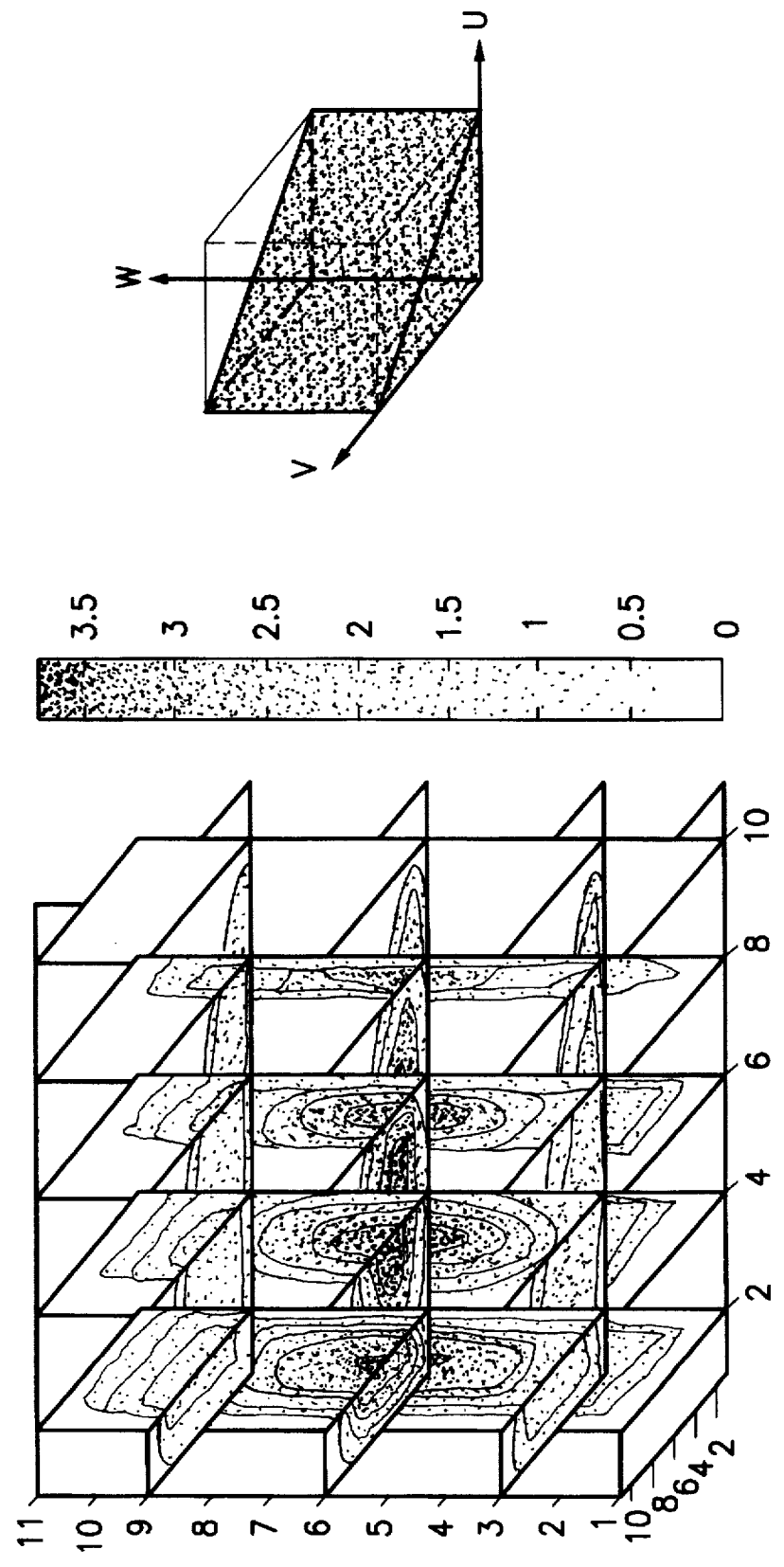

FIG. 7A shows the distribution of the invariant values for a very large number of five-point tuples randomly and uniformly selected over a convex domain, e.g. a unit cube. The occupancy density values are shown grayscale-coded for the slices of the cube of invariants at u=0.1, 0.3, 0.5, 0.7, 0.9 and w=0, 0.2, 0.5, 0.8. Also shown with FIG. 7A is a graphical depiction of a tetrahedron (prism 1100) that shows which volume of the cube |0.1|×|0.1|×|0.1| is occupied by the invariants that five-point tuples in the first five classes will generate: this prism will be described in more detail in FIG. 11. Notice that the correspondence between the axis labels and the values of u/v/w has as follows:

| Axis Label | 1 | 2 | 3 | 4 | 5 | 6 | 7 | 8 | 9 | 10 | 11 |
|---|---|---|---|---|---|---|---|---|---|---|---|
| U/V/W Value | 0 | 0.1 | 0.2 | 0.3 | 0.4 | 0.5 | 0.6 | 0.7 | 0.8 | 0.9 | 1 |

Figure 7B:
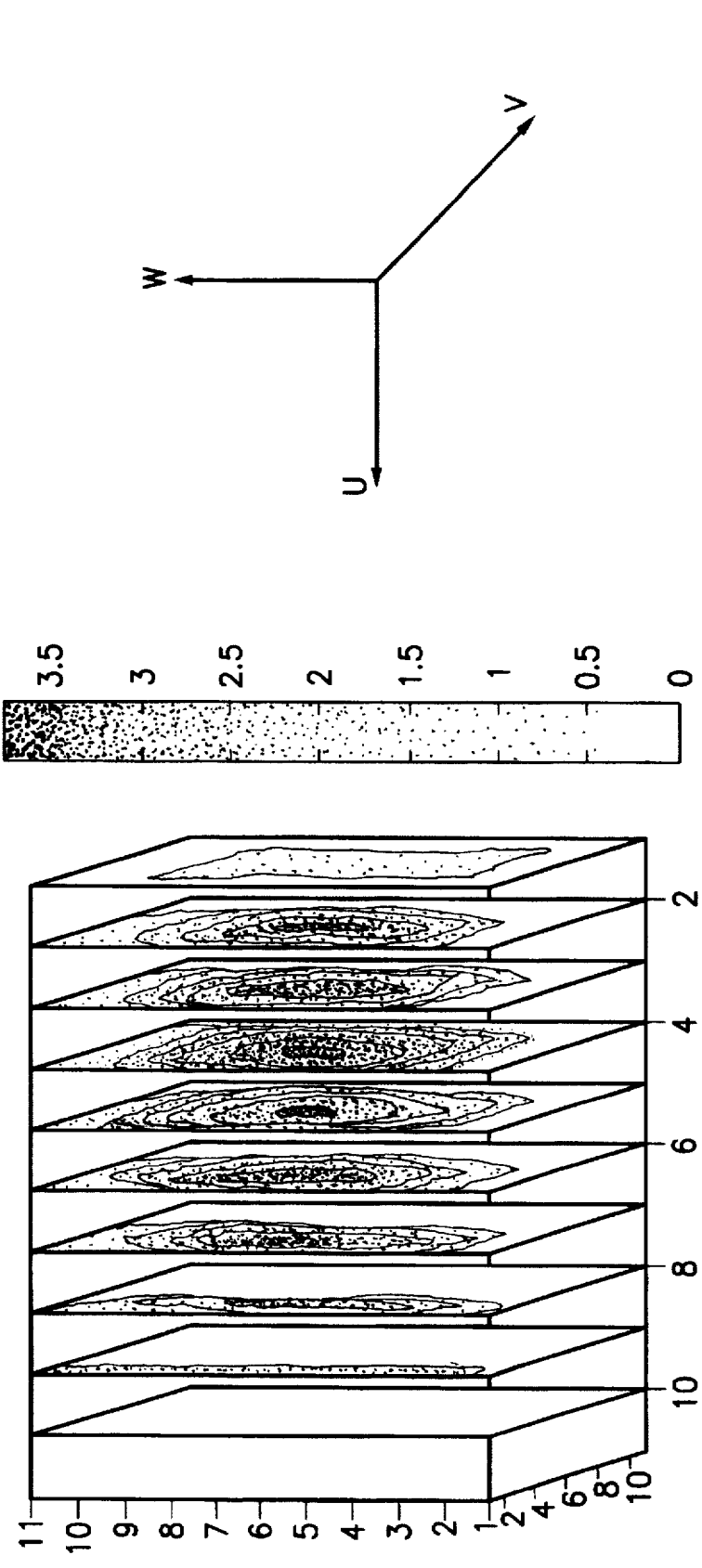
Figure 7C:
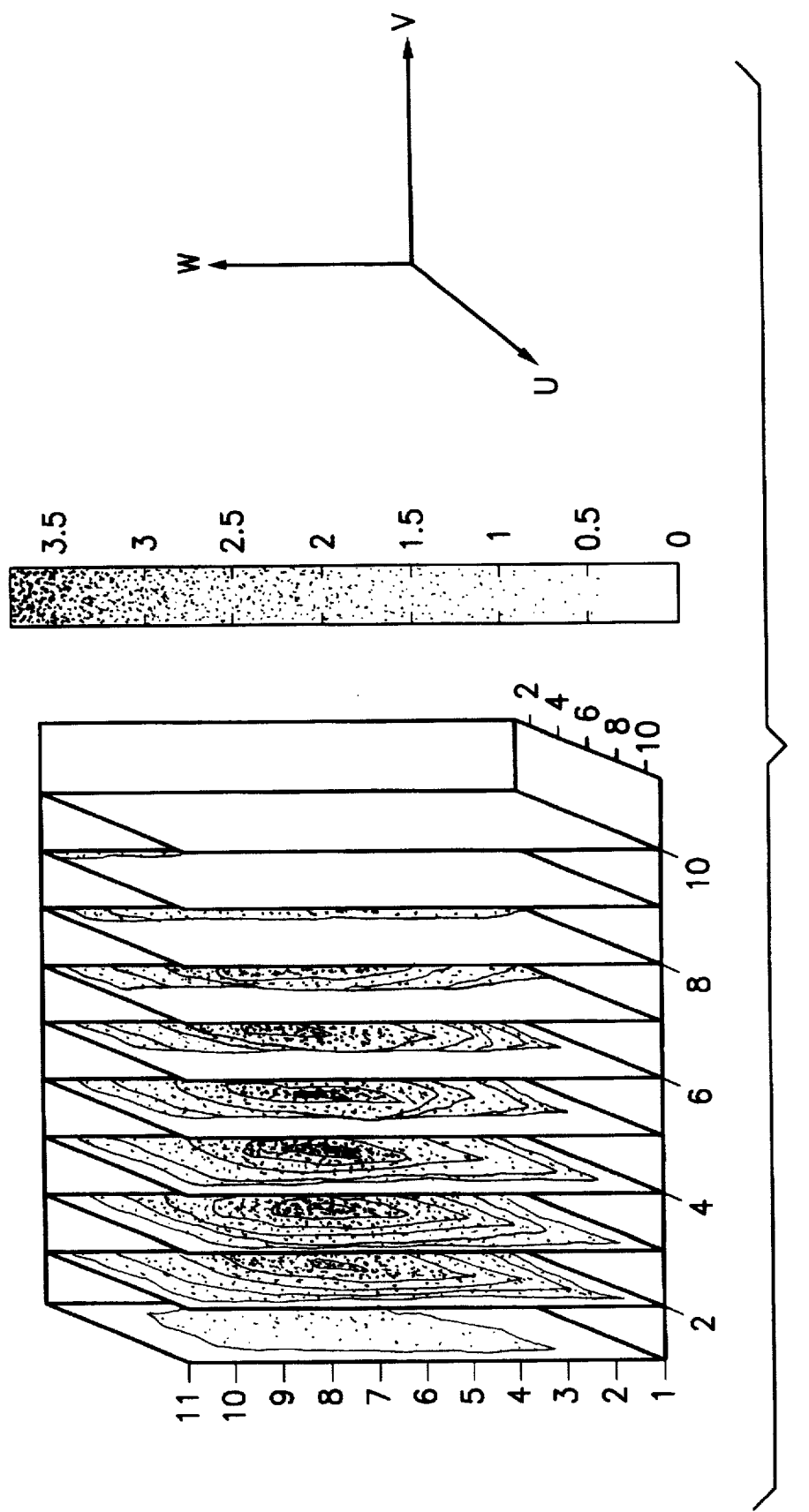
Figure 7D:
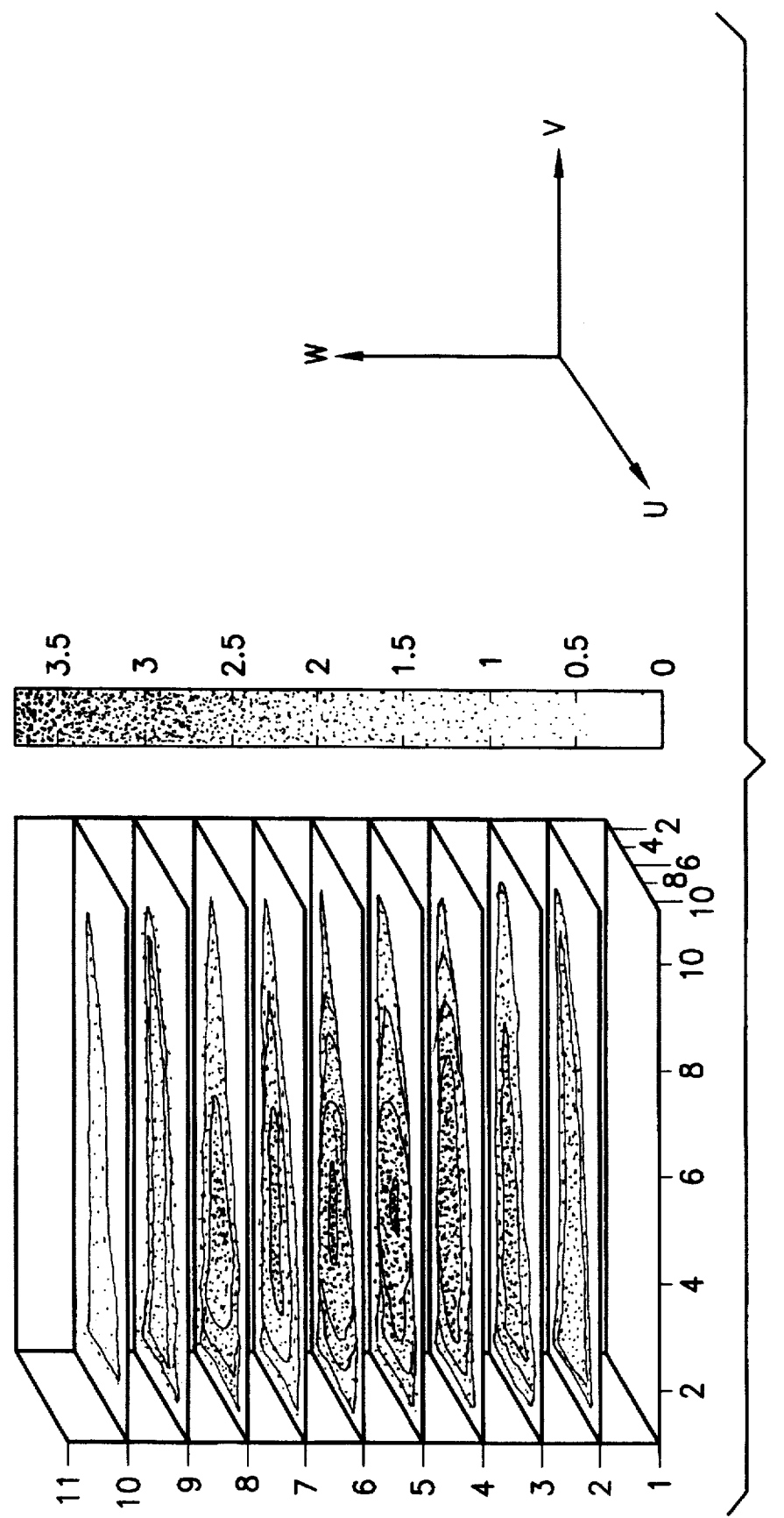

FIG. 7B shows the grayscale-coded occupancy density values for a finer slicing along the axis of u of the cube of invariants; the shown slices correspond to the values of u=0, 0.1, 0.2, 0.3, 0.4, 0.5, 0.6, 0.7, 0.8, and 0.9. In a similar manner, FIG. 7C shows the grayscale-coded occupancy density values for a finer slicing along the axis of v of the cube of invariants; the shown slices correspond to the values of v=0, 0.1, 0.2, 0.3, 0.4, 0.5, 0.6, 0.7, 0.8, and 0.9. Finally, FIG. 7D shows the grayscale-coded occupancy density values for a finer slicing along the axis of w of the cube of invariants; the shown slices correspond to the values of w=0, 0.1, 0.2, 0.3, 0.4, 0.5, 0.6, 0.7, 0.8, and 0.9.

Although the displayed results were obtained from five-point tuples that have been drawn uniformly from a cubic domain, all of the observations made here hold true for all convex domains one can have in the three-dimensional space, and which include parallelepiped, sphere, ellipsoid, etc. Part of the discovery is that there is certain preference for some values of u, v and w over others. In particular, values of u, v and w that fall below the plane P defined by the points (1,0,0)/(0,1,0)/(0,0,1) are more preferable to values that fall above it. This is demonstrated by the fact that the grayscale-coded occupancy density shown in FIGS. 7A through 7D assumes larger values in the region that is below this plane P. Furthermore, values of u, v and w that are close to the point (0.5, 0.5, 0.5) are more preferable to values further away. At first, the situation does not seem to be any better than the situation one faces in the context of the geometric hashing case.

However, there is a novel and powerful way to tackle the problem at hand. This is another discovery that has not been disclosed or suggested by the prior art. In particular, the discovery is that independent of the shape of the convex domain K, one can concentrate on the exactly 15 individual component/contributions to the probability density function from five-point tuples where the fifth point falls in a given-number region. In what follows, we will be using the terms component and contribution interchangeably.

To exploit this, the contributions to the probability density function of the invariants from each five-point tuple are tagged, separated, and tracked according to which of the fifteen regions of space (the regions being determined by the first four points of the tuple) the fifth point lies in. All of the five-point tuples with their fifth point in region i, where i=1,2, . . . 15, belong to the i-th class of tuples and produce the i-th contribution to the final probability density function for u and v. In one embodiment, in order to produce a uniform distribution of features, a Monte-Carlo simulation is used. In other embodiments, actual model data whose features are uniformly distributed in the feature domain are used. In either case, fifteen tables (or fifteen parts of one table) instead of one are maintained, one for each of the fifteen classes of contributing five-point tuples. Each one of the fifteen tables "covers" all of the finite extent region under consideration (this is the cube |0.1|×|0.1|×|0.1|) and counters are maintained that correspond to a tessellation of this region of the space of invariants. In this modified version of the Monte-Carlo simulation and for a given table, a counter associated with a bucket of the table keeps track of the contribution to the probability density function from the region corresponding to the bucket's extent as this pertains to the class of five-point tuples that the table keeps track of. Upon termination of the Monte-Carlo simulation, the probability density function can be produced as the cumulative result of the contributions from these fifteen tables. To produce this cumulative result, the fifteen tables must be superimposed: for a given bucket, the values of the respective fifteen counters from each of the fifteen tables are added up; the resulting values provide a discretized version of the probability density function.

FIGS. 8A1 through 8A5 show the grayscale-coded occupancy density values for a finer slicing along the axis of w of the cube of invariants, and for a very large number of five-point tuples randomly and uniformly selected over a convex domain, for each of the first five classes for which points are tagged; the shown slices correspond to the values of w=0, 0.1, 0.2, 0.3, 0.4, 0.5, 0.6, 0.7, 0.8, and 0.9. Also shown with FIGS. 8A1 through 8A5 is a graphical depiction of a tetrahedron (pyramid 1000) that shows which volume of the cube [0.1]×[0.1]×[0.1] is occupied by the invariants that five-point tuples in the first five classes will generate: this tetrahedron will be described in more detail in FIG. 10. FIGS. 8A6 through 8A9 show similar grayscale-coded occupancy density values for a finer slicing along the axis of w of the cube of invariants, and for five-point tuples tagged as belonging to classes 6 through 9; the shown slices correspond to the values of w=0, 0.1, 0.2, 0.3, 0.4, 0.5, 0.6, 0.7, 0.8, and 0.9. Finally, FIGS. 8A10 through 8A15 show similar grayscale-coded occupancy density values for a finer slicing along the axis of w of the cube of invariants, for five-point tuples tagged as belonging to classes 10 through 15; the shown slices correspond to the values of w=0, 0.1, 0.2, 0.3, 0.4, 0.5, 0.6, 0.7, 0.8, and 0.9. Also shown with FIGS. 8A6 through 8A9 is a graphical depiction of a prism (1100) showing which volume of the cube [0.1]×[0.1]×[0.1] is occupied by the invariants that five-point tuples in the last ten classes will generate: this prism will be described in more detail in FIG. 11.

A number of very interesting observations can be made based on these simulation results. In particular, a. for all five RP arrangements, the distributions of invariants are identical;

b. for all ten NRP arrangements, the distributions of invariants are identical;

c. for all five RP arrangements, the distribution of invariants is uniform (within a tolerance) within a pyramidal domain in invariant space and independently of the shape of convex feature domain from which the five-point tuples are drawn uniformly; and d. for all ten NRP arrangements, the distribution of invariants exhibit a plane symmetry, independently of the shave of convex feature domain from which the five-point tuples are drawn uniformly, and, at the very least, can be approximated.

FIG. 9 is a block diagram of one preferred embodiment of a computer system 900 that is used by the present invention. The system 900 has one or more computers and/or processes. An example of a computer 905 is a central processing unit (CPU) 903 like an IBM RS 6000 connected to a bus 910 that is further connected to one or more memories 120, a graphical user interface (GUI) 907, and optionally a network input/output (I/O) device 930. One or more processors 905 can be connected to the bus 910, as in an IBM SPI 970. Alternatively, one or more of the CPUs 903 could be executing one or more programs (or processes) 904 that the CPUs 903 execute. The network I/0 930 is connected to a network 950 that is capable of connecting to one or more other computers 960 that would also have a network I/0 930, a CPU 903 one or more memories 120, and a GUI 907. Computers (905,960) like this, and particularly parallel systems (900), are well known in the computer arts. One or more of the computers in the system 900 will store the data structures 980 and execute the algorithms 985 that are described below.

FIGS. 10A and 10B show the shape of the region occupied by the invariants produced for a very large number of five-point tuples, in any one of the only five possible RP arrangements, before and after all such invariants have been redistributed so that they now occupy the unit cube uniformly, and obtained by appropriately "stretching" the original distribution. Since the redistribution in essence will spread the mass of the pyramidal volume 1000 depicted in FIG. 10A over a volume 1010 that is 6 times as big as the previous one, the resulting expected new density, $D_{new}$, is going to be ⅙-th its original value, Dong. This stretching operation is in essence a remapping of the invariant values in a manner that is dependent on the original position of the invariant (u,v,w). The actual steps involved in this stretching process are described below.

Figure 4B:
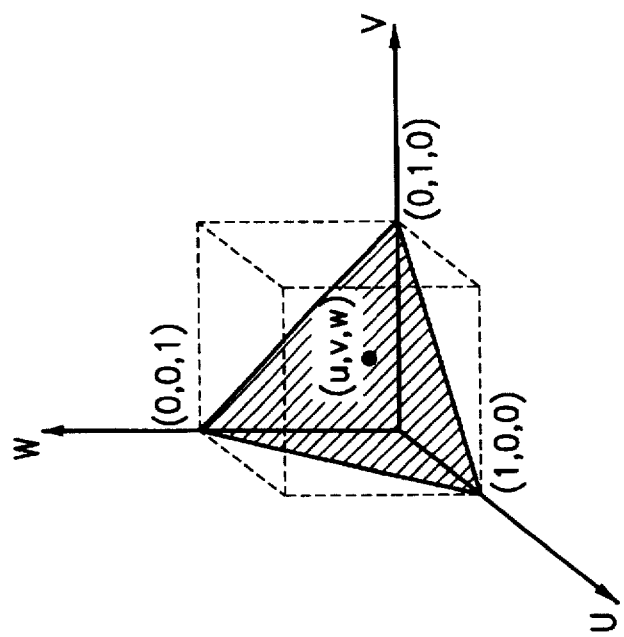
FIGS. 4A and 4B are a prior art representation of where, in the space of invariants, the invariants produced by a randomly selected fifth point map for each of the five regions 1 trough 5.
Figure 4A:
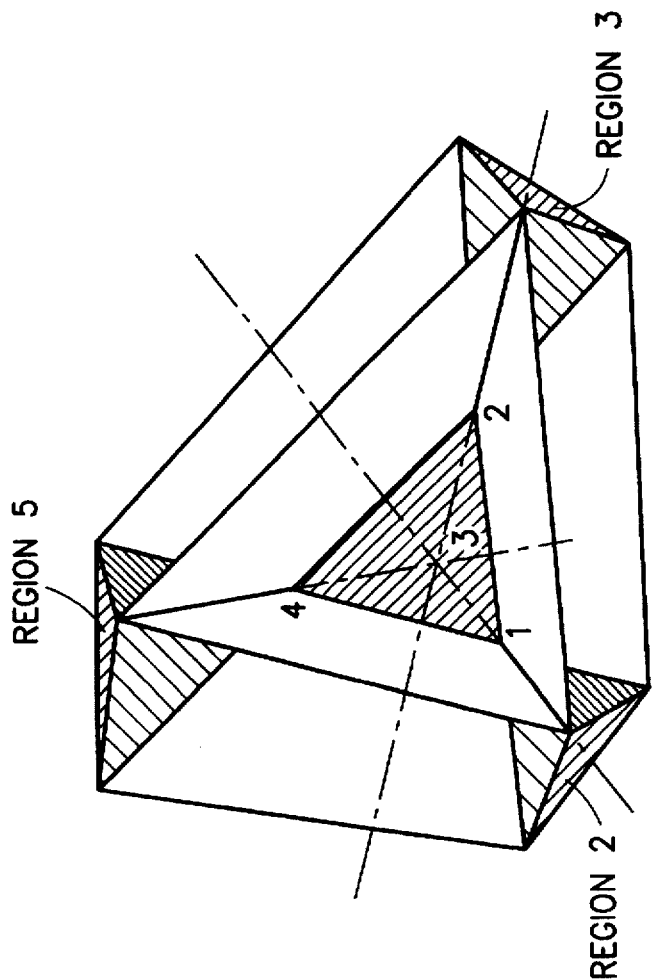

As already described, when the five-point tuples are in any one of the four possible RP arrangements, the values generated by the invariant-producing function will satisfy the first set of inequalities stated in the description of FIG. 4. Note that this set of inequalities will hold true independent of the shape of the convex domain the four point of the five-point tuple are drawn from! The only thing that is going to be different in each case is the actual density within the resulting component cube. Indeed, it can be shown easily that the density values for the component cube must satisfy the following equation:

$$D_{new} = Pr(\text{five-point tuple forms reentrant polyhedron})/5 = D_{orig}/6$$

The explanation is as follows: any five-point tuple that is drawn uniformly from the convex domain under consideration can belong to one of fifteen classes, based on which of regions the fifth point lies in (see also discussion above). By symmetry arguments, the invariant values generated by five-point tuples belonging to the i-th class (i=1,2,3,4, or 5) will contribute to the total probability density function exactly ⅕ of the total contribution that arises from five-point tuples in RP arrangements; but, this latter total contribution is equal to the probability that a five-point tuple drawn randomly and uniformly from the convex domain under consideration forms a reentrant polyhedron. Each component contribution is in turn equal to the total "mass" (this is the total occupancy) of the volume of the contributing block 1000. Finally, notice that the value of Pr(five-point tuple forms reentrant polyhedron) is given by the answer to Sylvester's problem in three dimensions, a well-known problem from geometric probability, and depends on the shape of the convex domain that the five-point tuple is drawn from. Given that the value of $D_{orig}$ depends on the shape of the domain, it is clear that all of the following discussion is applicable to any shape convex domain.

FIG. 10C shows the grayscale-coded occupancy density values resulting from the mentioned stretching and for a slicing along the axis of w of the cube of invariants (1020); five-point tuples tagged as belonging to classes 1 through 5 were used to derive this result; the shown slices correspond to the values of w=0, 0.1, 0.2, 0.3, 0.4, 0.5, 0.6, 0.7, 0.8, and 0.9.

FIGS. 11A and 11B show the shape of the region occupied by the invariants produced for a very large number of five-point tuples, in any one of the ten possible NRP arrangements (classes 6 through 15), after all such invariants have been redistributed so that they now occupy the unit cube (1110) instead of the prism shown (1100), and obtained by appropriately "stretching" the original distribution. This stretching operation is in essence a remapping of the invariant values in a manner that is dependent on the original position of the invariant (u,v,w). The actual steps involved in this stretching process are described below.

FIG. 11C shows the grayscale-coded occupancy density values resulting from the mentioned stretching and for a slicing along the axes v and w of the cube of invariants (1130); five-point tuples tagged as belonging to exactly one of the classes 6 through 15 were used to derive this result; the shown slices correspond to the values of v=0.1, 0.3, 0.5, 0.7, 0.9 and of w=0.2, 0.5, 0.8. Notice the distinguishing "bullet" or "almond" shape that the shown density exhibits in the interior of the cube: the tip of the bullet/almond is toward the increasing values of u and there is also an evident symmetry of revolution around the horizontal axis passing through the point (0, 0.5, 0.5). It is worth mentioning that the density of occupancy increases as one moves toward the center of the bullet/almond shape. Also note the shown contours 1131, 1132, 1133 and 1134 of increasing density values.

FIG. 12 shows the grayscale-coded occupancy density values (1220) resulting from reflecting the result shown in FIG. 11C. In particular, the five-point tuples tagged as belonging to exactly one of the classes 6 through 15 were first stretched as described in FIGS. 11A and 11B and then reflected with respect to the plane defined by the equation u=0.5. The shown slices correspond to the values of v=0.1, 0.3, 0.5, 0.7, 0.9 and of w=0.2, 0.5, 0.8. The distinguishing "bullet" or "almond" shape of FIG. 11C has also been reflected: the tip of the bullet/almond is now toward the decreasing values of u and the symmetry of revolution has been preserved. As before (FIG. 11C), the density of occupancy increases as one moves toward the center of the bullet/almond shape. Also note the shown contours 1231, 1232, 1233 and 1234 of increasing density values. FIG. 13 shows the grayscale-coded occupancy density values (1320) resulting from the stacking of exactly one cube 1120 and exactly one cube 1220, and for a slicing along the axes v and w of the cube of invariants. Five-point tuples tagged as belonging to exactly two of the classes 6 through 15 were used to derive this result. The shown slices correspond to the values of v=0.1, 0.3, 0.5, 0.7, 0.9 and of w=0.2, 0.5, 0.8. In order to produce the result 1320 shown in FIG. 13, we need to combine one result (cube 1120) such as the one shown in FIG. 11C which corresponds to five-point tuples in class i, with one result (cube 1220) such as the one shown in FIG. 12 which corresponds to five-point tuples in class j (with i j) after the produced invariants for the latter have been appropriately reflected with respect to the plane u=0.5. Note that there is a total of 10 classes corresponding to five-point tuples in NRP arrangements and thus an even number of contributions 1120 such as those shown in FIG. 11C: half of these contributions can be appropriately reflected and produce contributions 1220 such as the one shown in FIG. 12. Consequently, we can combine five contributions of type 1120 with five contributions of type 1220 to produce five contributions of type 1320. As is evident from FIG. 13, the resulting occupancy density is highly non-uniform: there is a high concentration of the produced invariants near the center of the cube of invariants; the occupancy density decreases in a clearly nonlinear manner as one moves away from the center of the cube. Notice the distinguishing "oval-like" shape, hereafter called oval, that the shown density exhibits in the interior of the cube. The symmetry of revolution evident in FIGS. 11C and 12 has also been preserved. Also note the shown contours 1331, 1332, 1333 and 1334 of increasing density values. Once these five contributions of type 1320 are available, one can proceed with the next stage, that of "flattening" of the occupancy density so that the resulting occupancy is uniform within tolerance over the entire volume of the cube.

FIG. 14 shows the grayscale-coded result 1420 of "flattening" the occupancy distribution shown in FIG. 13. The "flattening" in essence spreads the produced invariants (the oval shape 1320 of FIG. 13) so that they are now uniformly (within a tolerance) distributed over the volume of the cube of invariants. This "flattening" operation is a remapping of the invariant values produced by five-point tuples in the classes 6 through 15 to new points (u',v',w'), in a manner that is dependent on the original position of the invariant (u,v,w). The invariants produced by five-point tuples in precisely half of the classes 6 through 15 will be reflected with respect to the plane u=0.5 prior to applying the flattening operation.

The ideal situation is when a closed-form expression can be derived for the occupancy density shown in FIG. 11 by means of the expression of the invariant-producing function and the knowledge of the distribution of the points forming a five-point tuple. In this particular situation, there is a total of 15 independent random variables, 3 variables for each of the 5 points: the 3 variables are the x, y and z coordinates of a point. Knowledge of the distribution of points $p_i=\{x_i,y_i,z_i\}$, $i=1,2,3,4,5$ over the convex domain K would allow the derivation of the joint probability density function $f(u,v,w)$ for the random variables u, v and w. Knowledge of the invariant producing function in turn allows the derivation of the Jacobian J of the transformation that maps the five points of the feature domain to the single point of the space of invariants. The culmination of these steps is the derivation of the joint probability density function $f(u,v,w)$ for the affine invariants u, v and w through computation of the integral $$\int R^{12} f(x_5(u,v,w),y_5(u,v,w),z_5(u,v,w))f(x_1,y_1,z_1)f(x_2,y_2,z_2)f(x_3,y_3,z_3)f(x_4,y_4,z_4)|J|^{-1}dx_1\,dx_2\,dx_3\,dx_4\,dy_1\,dy_2\,dy_3\,dy_4\,dz_1\,dz_2\,dz_3\,dz_4 \quad 6$$

In this formula, |.| denotes the absolute value of its argument. The theory supporting all of this analysis can be found in any of the standard probability literature.

Unfortunately, evaluation of this last integral is notoriously difficult, especially as the number of involved independent variables increases. Not surprisingly, derivation of the joint probability density function $f(u,v,w)$ for our problem using this expression has proven intractable.

But although derivation from first principles of the expression for the probability density function $f(u,v,w)$ has not been possible, an alternative route has been exploited. The idea here is to guess the functional form of $f(u,v,w)$, express it in a parametric manner and attempt to compute the best values of the parameters leading to a best fit to the available data. In essence, this approach bypasses the evaluation of the integral and attempts to directly estimate its value, which in this case is a functional expression in terms of the variables u, v and w. Given the approximate expression for $f(u,v,w)$ a remapping function $h=(h_1(u,v,w),h_2(u,v,w),h_3(u,v,w))$ is produced that remaps each point (u,v,w) to a new point (u',v',w'). The net effect of applying the remapping on the values produced by the invariant-producing function is the flattened distribution 1420 (FIG. 14). The "approximate" and "flatten" steps are discussed in more detail below.

Let us pause for a moment and examine what has been achieved by the operations depicted in FIGS. 10, 11, 12, 13 and 14. In each of these cases, the contribution to the total probability density function from invariant values was produced by five-point tuples that belonged to one of the fifteen classes, 1 through 15. The contributions generated by a given class of five-point tuples corresponded to invariant values that extended over a region of the space of invariants. For simplicity, the region corresponding to class i will be referred to as the "range of class i." In all cases, and independent of the shape of the convex domain K from where the five point tuples were drawn, the ranges of a given class exhibited one of the following two properties:

a. the class showed no preference for certain invariant values in its range over others and the range of the class did not coincide with the cube $[0,1]\times[0,1]\times[0,1]$—this is the case of classes 1 through 5; and, b. the class showed preference for certain invariant values in its range over others and the range of the class did not coincide with the cube $[0,1]\times[0,1]\times[0,1]$—this is the case of classes 6 through 15.

If the contribution from a given class exhibited property (a) above, then the invariant values were operated upon with a remapping operation in a manner that guaranteed that the new range of the class following the remapping coincided with the cube $[0,1]\times[0,1]\times[0,1]$ while the lack of preference for certain values (of the class' new range) over others was preserved. Classes 1 through 5 were in this category and the necessary remapping was in the form of stretching. FIGS. 10A, 10B and 10C depict this operation.

On the other hand, if the contribution from a given class exhibited property (b) above, then the invariant values were operated upon with an appropriate combination of stretching, reflection, stacking and remapping operations that changed the range of the class to be the cube $[0,1]\times[0,1]\times[0,1]$ and also achieved lack of preference (within a tolerance), i.e. uniform distribution within a tolerance, for certain values over others across the entire new range of the class. Classes 6 through 15 fell in this category. FIGS. 11, 12, 13 and 14 depicted these operations.

In both of these cases, the output of the tagger stage 1625 (FIG. 16A) is used to identify the class of a given five-point tuple as one of fifteen possible values, 1 through 15; it is based on this output that the appropriate set of operations is selected.

All of these remapping operations are equivalent to applying a new function g( ) to values produced by the original invariant producing function h( ) described by Eqn. 2. The new function g has as many branches as the number of classes and the result of its application is a new invariant-generating function h* equal to the synthesis of g and h, i.e., h*=g(h( )). The function g operates on the original function h in a class-dependent manner, and this necessitates the existence of the fifteen branches for g. Let us denote the i-th branch of g by $g_i$. Then we can write h* as:

$$
\begin{aligned}
h^*(\ ) = \ & g_1(h(x_1,x_2,\ldots,x_5,y_1,y_2,\ldots,y_5,z_1,z_2,\ldots,z_5,)) && \text{if five-point tuple is in class 1} \\
& g_2(h(x_1,x_2,\ldots,x_5,y_1,y_2,\ldots,y_5,z_1,z_2,\ldots,z_5,)) && \text{if five-point tuple is in class 2} \\
& g_3(h(x_1,x_2,\ldots,x_5,y_1,y_2,\ldots,y_5,z_1,z_2,\ldots,z_5,)) && \text{if five-point tuple is in class 3} \\
& g_4(h(x_1,x_2,\ldots,x_5,y_1,y_2,\ldots,y_5,z_1,z_2,\ldots,z_5,)) && \text{if five-point tuple is in class 4} \\
& g_5(h(x_1,x_2,\ldots,x_5,y_1,y_2,\ldots,y_5,z_1,z_2,\ldots,z_5,)) && \text{if five-point tuple is in class 5} \\
& g_6(h(x_1,x_2,\ldots,x_5,y_1,y_2,\ldots,y_5,z_1,z_2,\ldots,z_5,)) && \text{if five-point tuple is in class 6} \\
& g_7(h(x_1,x_2,\ldots,x_5,y_1,y_2,\ldots,y_5,z_1,z_2,\ldots,z_5,)) && \text{if five-point tuple is in class 7} \\
& g_8(h(x_1,x_2,\ldots,x_5,y_1,y_2,\ldots,y_5,z_1,z_2,\ldots,z_5,)) && \text{if five-point tuple is in class 8} \\
& g_9(h(x_1,x_2,\ldots,x_5,y_1,y_2,\ldots,y_5,z_1,z_2,\ldots,z_5,)) && \text{if five-point tuple is in class 9} \\
& g_{10}(h(x_1,x_2,\ldots,x_5,y_1,y_2,\ldots,y_5,z_1,z_2,\ldots,z_5,)) && \text{if five-point tuple is in class 10} \\
& g_{11}(h(x_1,x_2,\ldots,x_5,y_1,y_2,\ldots,y_5,z_1,z_2,\ldots,z_5,)) && \text{if five-point tuple is in class 11} \\
& g_{12}(h(x_1,x_2,\ldots,x_5,y_1,y_2,\ldots,y_5,z_1,z_2,\ldots,z_5,)) && \text{if five-point tuple is in class 12} \\
& g_{13}(h(x_1,x_2,\ldots,x_5,y_1,y_2,\ldots,y_5,z_1,z_2,\ldots,z_5,)) && \text{if five-point tuple is in class 13} \\
& g_{14}(h(x_1,x_2,\ldots,x_5,y_1,y_2,\ldots,y_5,z_1,z_2,\ldots,z_5,)) && \text{if five-point tuple is in class 14} \\
& g_{15}(h(x_1,x_2,\ldots,x_5,y_1,y_2,\ldots,y_5,z_1,z_2,\ldots,z_5,)) && \text{if five-point tuple is in class 15}
\end{aligned}
$$

In the above expression each of the fifteen branches can be determined and/or approximated as discussed below.

The invention operates to separate the total probability density function into fifteen contributions by tagging each five-point tuple with a class identifying number (a number between 1 and 15 inclusive—see also FIG. 5) and a polyhedral arrangement type (RP or NRP), and acting on each contribution in a particular way to create a uniform distribution, within tolerance, of the produced invariant values over $[0,1]\times[0,1]\times[0,1]$ for each of the respective contributions. Then, the uniformly distributed contributions are combined by a stacker component 1650 (see FIG. 16B) to produce a cumulative contribution that is uniform over $[0,1]\times[0,1]\times[0,1]$ within tolerance.

Using a Monte-Carlo simulation for the function h* that corresponds to a square feature domain, and using the mechanism described above, a discretized version of the remapped distribution function for h* can be produced.

FIGS. 15A and 15B show the result from the stacking of the fifteen components that correspond to the fifteen branches of h*, i.e. the processes by which the respective regions are flattened, and contribute to the probability density function, after the above mentioned operations of stretching, reflecting, stacking and flattening have been carried out in an appropriate manner. All of the drawings of FIG. 15 have been obtained for a large number of five-point tuples that have been drawn randomly and uniformly from a square domain; the operations dictated by h* have been applied during the synthesis. Again, it should be stressed that each one of these operations carries out a remapping of the invariant values with the actual remapping operation being specific to the class i. A superposition of the contributing components after they have undergone the remapping is the probability density function f(u',v',w') for the remapped u', v' and w', i.e. the probability density function for the above-designed and described, invariant-producing function h*. The shown stacking combines the 5 contributions of type 1020 corresponding to classes 1 through 5, and the 5 contributions of type 1420 corresponding to classes 6 through 15. The reason there is only 5 contributions of type 1420 is due to the fact that each contribution 1420 is the result of flattening one contribution of type 1320, the latter being obtained by combining two appropriately transformed contributions from classes 6 through 15: one of the combined contributions is of type 1120 and the other of type 1220. Notice also that the originally existing non-uniform occupancy that exhibited itself in the shape of the distinguishing "bullet" or "almond" has now been replaced by a uniform (within tolerance) occupancy across the entire cube.

A few more things should be pointed out regarding the identity and nature of the contributing components from classes 6 through 15. As already stated, the contribution of type 1320 can be produced by combining one contribution of type 1120 and one of type 1220. Since the contributions from classes 6 through 15 have been observed to be identical, any 5 of them could be reflected with respect to the plane u=0.5 and then combined in a pair-wise manner with the remaining 5 contributions to produce 5 contributions of type 1320 (and eventually 5 contributions of type 1420). For example, one could reflect the contributions from the odd-numbered classes and leave those from the even-numbered classes unaltered. Alternatively, one could reflect the contributions from the classes 6 through 10 and leave those from classes 11 through 15 unaltered. Other combinations are clearly possible.

FIGS. 15C, 15D and 15E show the grayscale-coded result of the final occupancy distribution at selected discrete planar slices. The set of operations that have been applied to the various components making up the distribution of FIG. 7 has effectively spread the produced invariants so that they are now uniformly (within a tolerance) distributed over the volume of the cube of invariants; this result has been produced by remapping every original invariant to a new invariant (u',v', w') in a manner that is dependent on the original position of the invariant (u,v,w). FIG. 15C shows the grayscale-coded occupancy density values (1510) for a finer slicing along the axis of u of the cube of invariants; the shown slices correspond to the values of u=0, 0.1, 0.2, 0.3, 0.4, 0.5, 0.6, 0.7, 0.8, and 0.9. Similarly, FIG. 15D shows the grayscale-coded occupancy density values (1520) for a finer slicing along the axis of v of the cube of invariants; the shown slices correspond to the values of v=0, 0.1, 0.2, 0.3, 0.4, 0.5, 0.6, 0.7, 0.8, and 0.9. Finally, FIG. 15E shows the grayscale-coded occupancy density values (1530) for a finer slicing along the axis of w of the cube of invariants; the shown slices correspond to the values of w=0, 0.1, 0.2, 0.3, 0.4, 0.5, 0.6, 0.7, 0.8, and 0.9. It can be seen that the final result has the promised properties: indeed, as indicated by the very low variation in the gray-scale coded density values the cube is uniformly occupied (within tolerance) with a density that is very close to 1 which is the theoretically expected value. Now, recall that the only place where exact formulas could not be derived was in the case of the contributions corresponding to the classes 6 through 15. Indeed, instead of evaluating the integral 6, an approximation of its value was derived with the help of nonlinear minimization techniques. Any observed deviation from the perfect lack of preference (i.e. uniformity of occupancy) would be the direct result of the not-perfect approximation of the integral's value. In order to appreciate the quality of the approximation and of the resulting invariant generating function h* the following should be pointed out: the total mass of the original volume (shown in FIG. 7) should remain unchanged after all the described operations have been carried out. In our discussion, this total mass has been implicitly assumed to be equal to 1 (this has no effect on the discussion or the generality of the described method). Since the total volume of the cube of invariants is equal to 1 it follows that in the ideal situation (i.e. where the integral of Eqn. 6 can actually be computed) the occupancy density within this cube should also be equal to 1 in order for the total mass to remain unchanged. Note, that according to the grayscale-coding indicated by the grayscale-bar in FIGS. 15B through 15E the occupancy density produced by our method is indeed, with very small fluctuations, i.e. tolerance, close to 1. It is clear that with the employment of more sophisticated approximation techniques an increasingly better fit can be achieved, thus resulting in even smaller deviation from the perfect lack of preference of some values over others.

FIG. 16, comprising FIGS. 16A and 16B, is a flowchart of a Monte-Carlo process 1600 and shows the steps performed to accumulate the necessary knowledge, build the appropriate mechanism and then use it to produce the result shown in FIG. 15. In essence, FIG. 16 recapitulates and discusses in greater detail the various steps taken and described so far. The process begins with identifying the shape of the domain where the five-point tuples will be drawn randomly from, i.e. a cube, an ellipsoid etc. A five-point tuple is drawn randomly and uniformly from the convex domain K in step 1610. The prior-art transformer proceeds to apply a first mapping 1620 of the five-point tuple to a point in the space of invariants via application of Eqns. 2, whereas the novel tagger identifies 1625 the five-point tuple as belonging to one of the fifteen classes and one of the two types of polyhedral arrangement (either NRP or RP).

So, in essence the transformer implements Eqns. 2, whereas the novel tagger uses the coordinates of the five-point tuple members (this is the input to the transformer) to determine which one of the fifteen classes the tuple belongs to, and also the polyhedral arrangement (either NRP or RP) of the tuple's members.

The outputs of both the transformer and the tagger are in turn the input for the step 1630 which keeps track of only those invariants produced by five-point tuples belonging to one, some or all classes and/or polyhedral arrangements. The invariants are kept track of by means of tables (one, some, or all fifteen) that correspond to a tessellation of the finite-extent region [0,1]×[0,1]×[0,1] of the space of invariants. The i-th such table corresponds to a discretized contribution to the probability density function of u, v and w from five-point tuples belonging in the i-th class. At any given point in time during the Monte-Carlo simulation, the tables that are being kept track of are made available at step 1635. Steps 1630 and 1635 are optional in the sense that they are enabled or disabled based on which mode the redistribution equalizer 1640 operates in (see below for a description of the two modes of operation).

Once the tables are complete, they are made available at step 1635 and are in turn input into the equalizer process at step 1640. These tables can be seen in FIG. 9 (item 987) and schematically in FIGS. 23, 24 and 25. FIG. 24 graphically indicates the non-uniformity of the preference for certain values of the members u, v and w of the invariant 3-tuple.

The novel equalizer is a redistribution equalizer 1640 and can function in one of two modes: a knowledge accumulation mode and a redistribution mode.

The equalizer begins functioning in its knowledge accumulation mode 1640 and incorporates a process whose purpose is to use the knowledge obtained by the occupancy patterns of the various tables at its input (these patterns which are part of the mentioned discoveries are depicted in FIGS. 8A1 through 8A15) in order to derive necessary remappings (the $g_i(.)$'s) that when applied to the invariants generated by the prior art transformer (step 1620) will effectively redistribute the fifteen contributing components so that they have the desired properties. The equalizer will operate on the various tables once it has determined that statistical behavior has established itself; if not, more five-point tuples need to be drawn from the convex domain K and the process branches back to the step 1610. A number of criteria can be applied to determine whether statistical behavior has been achieved.

Parenthetically, it should be stressed here that for the equalizer to operate in its knowledge accumulation mode an appropriate set of input data is required. By appropriate here is meant that the features of the objects comprising the database that is used for the training of the system should be uniformly distributed over the entire feature domain. Clearly this set of data can be generated synthetically. Alternatively, it can be a subset of an actual database of objects. The only requirement in the latter case is again that the objects' features are uniformly distributed over the entire feature domain. Once the system has been trained and built (using either synthetic or real data) it can then be employed as the core of a store/retrieve engine for database access.

Returning now to the process being described: when statistical behavior has been established by known tests, the equalizer operates on the individual tables differently. First, each table is examined to determine the corresponding occupancy pattern. For the problem at hand, there are two possible patterns: type 1000 (see FIG. 10), or type 1100 (see FIG. 11). As has already been mentioned above, the shape of the domain K will impact on the quantitative descriptions of each pattern (e.g. occupancy density) but their qualitative characteristics (e.g. pyramidal or prism shape) will remain the same.

If a table's occupancy pattern resembles 1000 (=component produced by five-point tuples in RP arrangement and in one of the classes 1 through 5), the equalizing process will apply a "stretch" operation 1060.

If a table's occupancy pattern resembles 1100 (=component produced by five-point tuples in RP arrangement and in one of the classes 6 through 15), the equalizing process will determine and then apply an appropriate combination of "stretch," "reflect," "stack" and "flatten"operations. The determination of the appropriate expression for the flattening step will take place during the execution of the "approximate" process. The "approximate" operation has already been mentioned above, and a more detailed description appears below.

All the choices that are built into the equalization process, regarding the type of operations applied to the various components, will in turn determine and define how to operate on a given component.

After the necessary decisions have been made in terms of which operations to apply to which components, the redistribution equalizer 1640 enters a new mode that of redistribution. While operating in the redistribution mode the equalizer proceeds and applies the remapping choices to the invariant values produced by five-point tuples. More five-point tuples are generated at step 1610, steps 1630 and 1635 are bypassed, and the equalizer signals the transformer 1620 and tagger 1625 to route their output directly into the redistribution equalizer stage 1640. For every invariant (i.e. output of the transformer) that is presented at its input during this mode, the equalizer 1640 uses the output of the tagger 1625 to determine which of the fifteen possible remapping operations to apply to the invariant 3-tuple, then applies it. If the five-point tuple belongs in class i then the result of the corresponding remapping is accumulated by the table i'. A lot of five-point tuples are produced having the appropriate distribution over the convex domain K until statistical behavior has established itself. At that point the equalizer makes available all fifteen tables i' for the stacker process to proceed (step 1645). These tables can be seen in FIG. 9 (item 987) and schematically in FIG. 25. The latter Figure graphically indicates the achieved uniformity, within tolerance, of the preference for certain values of the members u, v and w of the invariant 3-tuple.

In essence, the redistribution equalizer effects the remapping of the 3-tuple corresponding to each of the fifteen regions by redistributing all of the 3-tuples to produce a new distribution of 3-tuples that is uniform over the range of invariants. This redistributing is determined by the region arrangement and the polyhedral arrangement of the respective five-point-tuple and causes a frequency of occurrence of each of the 3-tuples that is the same within a tolerance.

The stacker uses 1645 the fifteen redistributed tables i' produced by the equalizer operating in redistribution mode and combines them to produce the net effect (shown in FIGS. 15A through 15E) of applying the remapping choices $g_i$ to the output of the transformer—step 1650. The output of the stacker is a discretized version of the probability density function for the mechanism that the equalizer implements. The output of the stacker is evaluated at step 1655 to determine whether the quality of the produced results is within the acceptance bounds, i.e. the tolerance. This evaluation step is necessary because it may happen that the redistribution equalizer cannot evaluate the integral of Eqn. 6 and an approximation operation is necessary. This approximation may take place in an iterative manner where intermediate approximation results for some of the contributions (for example: components 1420 of classes 6 through 15) are examined by combining them with the remaining contributions (components 1020) during the stacker step 1650. Or, a battery of approximation methods may be attempted in turn until a satisfactory approximation is produced. If the result of the stacking 1650 is not within acceptable tolerance, then step 1660 branches back to the equalizer and notifies the latter accordingly. The equalizer reenters the knowledge accumulation mode and the process 1600 continues by branching back to step 1610. If the result of the stacking is satisfactory the process 1600 terminates.

In our discussion, we have mentioned two distinct "stretch" processes: one is applied to invariants forming the region 1000 (pyramid) of FIG. 10, and the second applied to invariants forming the region 1100 (prism) of FIG. 11.

FIG. 17A is a flowchart showing the steps performed by a "stretch pyramid" process 1700. Referring back to FIG. 10A, the pattern of occupancy 1000 can be thought of as the joint probability density function of the random variables U, V and W. This probability density function is uniform over the pyramidal domain defined by the points (0,0,0), (1,0,0), (0,1,0) and (0,0,1) of the space of invariants. What is sought is a remapping function g such that $$g: U, V, W \rightarrow U', V', W' \qquad 8$$

and the joint probability density function of U', V' and W' is uniform over the cube $[0,1] \times [0,1] \times [0,1]$ of the space of invariants. In essence, for a generated (1710) 3-tuple (u,v,w) in the appropriate tuple class (classes 1 through 5) this function remaps (1720) the invariant produced by prior-art transformer 1620 to a 3-tuple (u',v',w'). One such remapping function is:

$$u' = v/(u+v)$$

$$v' = (w^2 + 2w(u+v))/((u+v+w)^2$$

$$w' = (u+v+w)^3 \qquad 9$$

Other remapping functions are also possible.

FIG. 17B is a flowchart showing the steps performed by a "stretch prism" process 1750. Referring back to FIG. 11A, the pattern of occupancy 1100 can be thought of as the joint probability density function of the random variables U, V and W. This probability density function occupies the prism shown in FIG. 11A. What is sought is a remapping function g such that $$g: U, V, W \Rightarrow U', V', W' \qquad 10$$

and the shape of the region occupied by U', V' and W' is the cube $[0,1] \times [0,1] \times [0,1]$ of the space of invariants. In essence, for a generated (1760) 3-tuple (u,v,w) in the appropriate class (classes 6 through 15) this function remaps (1770) the invariant produced by prior-art transformer 1620 to a 3-tuple (u',v',w'). One such remapping function is:

$$u' = (u+v)^2$$

$$v' = v/(u+v)$$

$$w' = w \qquad 11$$

Other remapping functions are also possible.

FIG. 18 is a flowchart showing the steps performed by a "reflect" process 1800. As has already been discussed above, some of the contributions 1120 must be reflected around the plane u=0.5 (1810). In essence, the corresponding function remaps (1820) an invariant 3-tuple (u,v,w) produced by prior-art transformer 1620 to a 3-tuple (u',v',w') in such a manner that:

$$u' = 1-u$$

$$v' = v$$

$$w' = w \qquad 12$$

FIG. 19 is a flowchart showing the steps performed by a "stack" process 1900. As has already been discussed one contribution of type 1120 is obtained (1910) together one contribution of type 1220—1220=reflected 1120—(1920) and combined (1930) to produce one contribution of type 1320 prior to applying the approximate process to the latter. The stacking amounts to combining (adding) the contributions from the two components in a pair-wise fashion.

It should be pointed out that the remapping operations carried out by the "stretch," "reflect," and "stack" processes are independent of the shape of the convex domain K!

FIG. 20 is a flowchart showing the steps performed by an "approximate" process 2000. This process is carried out by the equalizer (in its knowledge accumulation mode) and it includes the determination of the expression for the contribution to the probability density function from invariant values that are produced by classes 6 through 15.

The need for the approximate process was introduced earlier, during the discussion of FIG. 13. As was stated, one option for deriving the necessary flattening equations is the evaluation of the integral 6; unfortunately, this has not proven tractable to this day. As an alternative approach, the value of the integral could be approximated by making use of simulation data (Monte-Carlo simulation) that produce contributions such as the ones shown in FIGS. 8A1 through 8A15. Thus, the "approximate" process comprises a necessary step that allows the "flatten" process to be carried out.

The approximation process 2000 begins by accessing 2010 the available numerical data that represent a discrete version of the function to be approximated; these data are typically the product of a Monte-Carlo simulation process. The approximate process proceeds with the guessing 2020 of the finctional form of f(u,v,w) that is expected to best approximate the data. By "data" here we mean the result of stacking one contribution 1120 with one contribution 1220 (=reflected 1120) to produce the input array for the approximate process. There is no available "recipe" that prescribes a specific way to proceed with this guessing. The objective of this step is to determine a suitable functional expression that can be used to describe the available data. The method by which one can arrive at such a determination is data dependent and most of the time it is based on the empirical evaluation of the data. For all practical purposes, this step is an art form in itself. Occasionally, a number of different functional forms with varying degrees of quality of fit may have to be tried before a best such form can be selected.

Once a best functional form is chosen, it is typically in a parametric form, i.e. the coefficients of the various components of the expression are in terms of constants (parameters) whose values are not known and have to be computed (2030). Again, most of the time the situation is such that the expression for f(u,v) incorporates the unknown parameters in a nonlinear manner. For example, the expression $f(u,v)=(a(u-b)^2+c(v-d)^2)^3$ is nonlinear in all of the parameters a, b, c, d, and e. In situations like this, the values of the parameters can typically be computed via a nonlinear minimization approach.

Nonlinear minimizations techniques (2040) suffer from their own set of shortcomings. Examples of these shortcomings include:

a. getting trapped in local minima; the minimization procedure will end up missing better solutions that may exist.

b. lack of convergence; the procedure may find itself in a multidimensional valley and end-up oscillating between the ridges of the valley.

c. sensitivity to the starting values; the parameters of the expression have to be given initial values for the minimization procedure to begin. Different starting sets of values are likely to lead to different solutions with varying degrees of quality, and some times they may not lead to convergence.

A non-limiting example of a functional form for approximating the occupancy density 1320, shown in FIG. 13, is $$a_1u^4+a_2v^4+a_3w^4+a_4u^2+a_5v^2+a_6w^2+a_7u^2v^2+a_8u^2w^2+a_9v^2w^2+a_{10} \quad 13$$

where $a_1$ through $a_{10}$ are unknown parameters. Through use of the Levenberg-Marquardt or other appropriate method, the values $a_1$ through $a_{10}$ can be (and have been) determined for the specific domain. The resulting expression approximates, within tolerance, the value of the integral 6. Note that the inventor has discovered that this particular expression may be used to approximate the data for the contributions 1320 from five-point tuples in classes 6 through 15, when the five-point tuples are drawn uniformly from any convex domain K including cube, sphere, ellipsoid etc. What is different in each case is the values assumed by $a_1$ through $a_{10}$. The values of these unknowns can be determined (using for example the Levenberg-Marquardt method), and depend on the shape of the domain K. With the values of the various parameters available, the next task is to identify which function will redistribute these values in such a manner that the newly-positioned invariants exhibit no preference for some values of the space of invariant over others. Using standard probability theory methods, one can see that one possible function is:

$$u'=(0.00625+0.2\ (u-0.5)^5)a_1+(0.41666+0.33333(u-0.5)^3)(a_4+\\ 0.08333(a_7+a_8))+(0.00625+0.01250\ (u-0.5))(150.60800+a_2+\\ a_3+6.66666(a_5+a_6)+0.55555\ a_9)$$

$$v'=(0.00625+0.2(v-0.5)^5)a_2+(0.41666+0.33333(v-0.5)^3)(a_5+\\ 0.08333(a_7+a_9))+(0.00625+0.01250(v-0.5))(150.60800+a_1+a_3+\\ 6.66666(a_4+a_6)+0.55555\ a_8) \qquad 14$$

$$w'=(0.00625+0.2\ (w-0.5)^5)a_3+(0.41666+0.33333(w-0.5)^3)(a_6+\\ 0.08333(a_8+a_9))+(0.00625+0.01250(w-0.5))(150.60800+a_1+a_2+\\ 6.66666\ (a_4+a_5)+0.55555\ a_7) \qquad 14$$

where u, v and w are the members of the invariant 3-tuple computed using the equations 2.

FIG. 21 is a flowchart showing the steps performed by a "flatten" process 2100. Having carried out the "approximate" process, the "flattening" comprises applying the remapping (2120) expressions 14. Alternatively, notice, that if the value of the integral 6 is available in a closed-form expression, the actual remapping expressions to be used during this step will be different, but easily determinable by standard techniques.

At this point, the determination of the necessary invariant-producing expressions has been concluded for five-point tuples in any of the fifteen possible classes (see Eqn. 7). But having done so, it is now possible to produce and associate an invariant 3-tuple with each five-point tuple that would be given to us; furthermore, the method of producing such an association would guarantee that statistically the invariant 3-tuples produced for five-point tuples drawn randomly and uniformly from a given, fixed convex domain K would be distributed uniformly over the cube $[0,1]\times[0,1]\times[0,1]$, within tolerance.

In FIG. 22, the method of producing such an association is depicted. Non-limiting examples of use would include databases of three-dimensional structures, three-dimensional surfaces, three-dimensional contours (polygonal or other) etc. Process 2200 begins with the selection of one object from the pool of the objects to be stored in the database at step 2205; the features of the selected object are also determined during this step. The features of the various objects are assumed to be distributed uniformly over a convex domain K. Once the shape of the domain is decided/determined, the appropriate instance of the "stretch," "reflect," "stack," and "flatten" processes is used in the steps that follow.

It should be pointed out that we have used the word "object" to refer to one of the recognizable physical items. As already mentioned, these items can be actual physical entities, for example three-dimensional surfaces, and the definition of an object feature is directly related to the type of the object. For example if the recognizable items are molecular structures, then a typical (but non-limiting) choice for features would be the set of atomic sites comprising the molecule.

During step 2210, one or more five-point tuples are formed using features that are taken from the set of identified features for the object under consideration. Notice that depending on the situation, one, some, or all possible five-point tuples may be formed during the selection stage. A given feature may appear in more than one five-point tuples, or it may not. Also, it may be necessary to impose order in the features of a five-point tuple: for example, it may be that tuples $(f_i, f_j, f_k, f_l, f_m)$ and $(f_j, f_i, f_k, f_l, f_m)$—where $f_i$, $f_j$, $f_k$, $f_l$, and $f_m$ denote features of the object under consideration—should be considered distinct.

A five-point tuple is subsequently selected during the step 2215 and is then used as an input for both the transformer and the tagger processes. The prior art transformer process applies the Eqns. 2 to produce an invariant 3-tuple (unmapped tuple) in step 2220. The novel tagger identifies the selected five-point tuple as belonging to one of the fifteen classes i and one of the two possible arrangements (RP or NRP). The unmapped 3-tuple and the output of the tagger are then used by the repositioning equalizer during step 2230, the equalizer producing a remapped version (u',v',w') of (u,v,w). The equalizer makes use of the appropriate instances of the "stretch," "reflect," "stack," and "flatten" processes for the shape of the domain K under consideration. In one preferred embodiment a Monte-Carlo process 1600 has already been employed for the given domain's shape and all necessary remapping branches of Eqn. 7 have been determined.

The new invariant 3-tuple is subsequently associated during step 2235 with the five-point tuple that was selected in 2215; possibly other information pertaining to one or more members of the five-point tuple, or the object may be associated with the new invariant 3-tuple. Optionally, a table 2300 may be accessed using the associations produced during step 2235. The associations may also be made available to other processes 2242.

During step 2245, the process checks whether there is more five-point tuples that have not been considered; if this is the case, the process branches back to step 2215. Otherwise, during step 2250 the process checks whether there is more objects that have not been considered; if this is the case the process branches back to step 2205, otherwise the process terminates at step 2255.

FIG. 23 is a block diagram of a table indexed by the invariants generated by the present invention (see FIG. 22) and used by the process 2200. The table is a data structure 2300 that associates an index 2314 corresponding to a 3-tuple—typically (u',v',w')—with information about the identities 2322 of the object's features comprising the five-point tuple, the identity 2321 of the object where the five-point tuple belongs and possibly other information 2323. All this information comprises an entry 2312 in the bucket that is being identified by the index 2314. Note that the five-point tuple associated with index 2314 may appear more than once in a given object, or in more than one objects in a database containing a plurality of objects. As a result, there is, in general, more than one entry 2312 of vector information in a record 2325 of the data structure 2300. Consequently, each such entry, typically 2312, includes identification information for each of the objects 2321A, . . . , 2321N, . . . in which the tuple creating the index 2314 appears. The index 2314 is formed that represents the five-point tuple under consideration. This index 2314 can be built by appropriately quantizing the members u', v' and w' of the invariant 3-tuple. In addition, this index can be mapped to an offset in a one-dimensional linear array like 2300 by using standard offset computation methods (e.g. 'stride' computation).

Given the availability of the process 2200, it is now possible to build a hashing-based store and retrieve scheme as per the description found in the introduction. The steps of the process 2200 can be used during two distinct phases. First, process 2200 can be employed to populate a table (structured as a lookup or hash table) at step 2240 during a preprocessing phase: each of the various objects to be recognized are processed in turn and, by means of the process 2200, stored in the table. The dimensionality of the table is equal to 2, and the invariant 3-tuples (u',v',w') produced at step 2230 are used to identify a bucket of the lookup table where an entry pertaining to the object and the five-point tuple under consideration will be made; this entry typically contains enough information to uniquely identify the object, and the five-point tuple that generated it.

Second, and subsequently to the storage phase, the generated table can be used to provide fast access to information about the objects that are stored in the database. Again, the steps of the process 2200 are employed but in a different manner this time: when presented with an object whose identity is sought, invariant 3-tuples are produced at step 2230 for the query object and the respective bucket(s) of the table produced during the storage phase are accessed; all entries found in each such bucket are then collected and examined for multiple occurrences of some object's identifier—the query object is then claimed to be that database object with the most number of such entries in the retrieved collection of entries.

It should be pointed out that by design the association produced by the steps of process 2200 result in a table 2300 whose buckets each contain the same number of entries 2312, within a tolerance (see FIG. 25). As such, the present method leads to: (a) improved discrimination power through better use of the hash table data structure (table of associations); (b) improved I/O behavior since no bucket will contain excessively large numbers of entries, and all buckets will contain the same, on the average, number of entries; (c) improved load sharing characteristics in multiple-processor environments: a given query object will now incur the same computational load on each of the processors, as a result of the way the table has been designed. An additional comment can be made here regarding yet another use of the table 2300. Throughout our discussion, the assumption was that the five-point tuples of the database objects were uniformly distributed over a convex domain K Should this assumption be violated, the implication would be that some configurations of object features would be over-represented (recurrent configurations). Consequently, some five-point tuple configurations would be over-represented and so would the invariant 3-tuples generated by such configurations. The lookup table buckets corresponding to these invariant 3-tuples would thus contain a number of entries that would be observably larger than the number of entries in the remaining buckets of the table. Given that the expected occupancy of each bucket is constant, within tolerance, any observable deviation would directly reflect the existence of over-represented groups of features in the database of objects, thus permitting a qualitative assessment of the nature of the objects without necessitating a direct examination of each object: all the objects of the database that share these over-represented groups can be identified directly by scanning the entries 2312 of the fuller buckets and operating on the entry fields 2321/2322/2323.

Moreover, one could proceed even further and label one or more sets of hash table buckets as corresponding to certain types of structures, e.g. corners of a specific type. This can be done as follows: beginning with the structure of interest (for example, this could be a "Tjoint" corner), features are identified on the structure and the hash function is used to generate entries in the hash table for subsets of these features. The hash buckets that were the recipients of an entry are marked and their union reflects the set of hash buckets (equivalently: hash indices) corresponding to the structure of interest. Then, the hash table can be used to implement a predicate that answers the question whether a given database contains the structure of interest: the database is processed and for each considered object, the set of hash buckets in which an entry would otherwise be made is formed. Then this set is checked to determine whether it contains the set of marked hash buckets which correspond to the structure of interest. It is conceivable that occasionally a verification may be required -- this is, in the general case, related to the nature of the hashing function that is used. What has just been described, clearly obviates the need for a manual inspection of the database, something that would be particularly difficult if the database models do not have a direct bearing on actual physical apparatus such as a car, an airplane, a molecule or a surface.

A note: the described affine-invariant generation mechanism results in buckets containing entries that will in general correspond to different five-point tuple configurations; for example, a five-point tuple belonging to class 1 (RP arrangement) may produce an entry in the same bucket as a five-point tuple belonging to class 10 (NRP arrangement). It may be beneficial to enhance each entry 2312 with this additional information prior to carrying out any operation employing the table.

Having the above mentioned predicate available, one can proceed to answer whether two sets of objects, each comprising one or more objects, share any sets of features (e.g. configurations of points along their contours). One way of doing so is by marking those of the hash table bins that would contain entries corresponding to the fast of the two sets and then determining the extent of the intersection of this set of bins and of the set corresponding to the bins accessed by indices that the objects of the second set generate. We elaborate some on this issue in the description of FIG. 26 below.

Finally, it should be pointed out that although the whole discussion has focused on the affine transformation in 3D space that the database objects may undergo, the system and method are directly extendible to the cases of rigid and similarity transformations. Indeed, the 3D affine transformation being the most general transformation on the plane, it subsumes the cases of the rigid and similarity transformations. If one wishes to enforce a specific type of transformation, it suffices to enhance the entries 2312 with the appropriate amount of information. For example, if rigid is the transformation of interest, entries 2312 will need to be augmented for example with the lengths of the vectors $p_2$-$p_1$, $p_3$-$p_1$ and $p_4$-$p_1$, or another equivalent constraint. Analogous steps need to be taken in the case where one wishes to enforce and focus only on similarity transformations.

Also, it should be added that when the equalizer operates in the knowledge accumulation mode the necessary data need not be produced through a Monte-Carlo simulation, but instead real data can be employed. The assumption of course is that this set of data conforms to the assumption of uniform distribution of the feature points in the appropriate convex domain. FIG. 24 is a depiction of a table indexed by the invariants generated by Eqns. 2 and showing the occupancy distribution across the table's bins before the application of the method (FIGS. 16 and 22) described in this invention. As already stated, the invariants produced using the set of Eqns. 2 produce a non-uniform occupancy across the various hash table buckets. This was also shown in detail in FIG. 7; FIG. 24 can be thought of as a 'left-to-right-top-to-bottom' listing of the various hash table bins shown in FIG. 7.

FIG. 25 is a depiction of a table that shows the occupancy distribution across the table's bins after the application of the method (FIGS. 16 and 22) described in this invention. As already implied by the occupancy densities shown in FIGS. 15B through 15E, the proposed invention produces a uniform (within tolerance) occupancy across the various hash table buckets; FIG. 25 can be thought of as a 'left-to-right-top-to-bottom' listing of the various hash table bins shown in FIG. 15.

Although depicted only graphically in FIGS. 24 and 25, the improvement that these two Figures imply has been observed during experiments with both synthetic (Monte-Carlo generated) and real data. Indeed, the application of the method has typically been shown to be very rewarding since it leads to observable improvements in storage utilization, computational power utilization, load balancing, improved discrimination etc.

FIG. 26 shows a distribution of invariants that correspond to surface patches of the receptor site of HIV's reverse transcriptase enzyme, and of the ligand Nevirapine (an anti-HIV drug). The Figure elaborates on the use of the predicate discussed earlier. A typical task that has to be tackled in the context of rational drug design is that of docking a given ligand to a given receptor. What complicates the problem is the fact that neither the ligand nor the receptor are entirely rigid; instead they can assume any of a number of possibly distinct conformations. To determine whether a given ligand can assume a conformation that will allow it to dock on (i.e. interact with) a given receptor (i.e. enzyme) thus becomes a computationally very demanding problem.

An alternative method for tackling this problem relies on a certain way of using the presented invariant-generating scheme. Beginning with the molecule of the receptor, a surface is generated using any of a battery of known techniques. Typically, for the receptor molecule not all of the surface is of interest; instead, one concentrates only on the surface of the actual active pocket of the receptor. The surface of interest is then sub-sampled and local surface patches are generated. We have assumed that, when given a surface, a consistent method for selecting local surface patches is available; indeed, standard techniques exist for doing that. Then, a given shape could be broken down into a set of (smaller) local surface patches. Points are identified on each such patch and the presented 3D affine-invariant generating function is subsequently used to represent the patch under consideration by a triplet of numbers (u,v,w). Information about each such patch of the receptor's active site is then entered in the respective hash bucket. Notice that in order to generate the affine invariant that has been presented in this discussion, the only thing that is needed is five points; clearly, these five points can be five properly selected points from each of the considered surface patches. It then becomes possible to represent the global shape of the receptor's active site as a union of local surface patches and thus as a set of affine invariants (equivalently: hash indices) such as the ones presented here.

The process proceeds with the generation of a surface for the potential-ligand molecule under consideration. As before, the generated surface is sub-sampled and local surface patches are created. Points are identified on each patch, the affine-invariant generating function is used to map the patch under consideration to a triplet of numbers (u,v,w), and, finally, information about each patch of the potential ligand's surface is entered in the respective hash bucket.

For a ligand to bind to a receptor's active set, there must be agreement of their local steric (i.e. shape) characteristics. Moreover, and assuming binding interaction of the two molecules, where one surface's patch is locally convex, the other surface's patch will, in general, be concave and vice versa. Notice though that the presented invariant does not discriminate between convex and concave shapes, thus providing some form of normalization of the curvature direction. And what is more important, the better the global steric agreement between receptor and ligand the greater the number of local surface patches with complementary shapes and, thus, producing the same invariant values. What this translates to is the following: the two sets of hash buckets containing entries from surface patches of the receptor and the ligand respectively will have an intersection whose cardinality will change in direct proportion to the degree of the fit between the two molecules under consideration. The larger the intersection of the two sets of invariants, the larger the surface that is complementary between the two molecules and thus the better the quality of the docking. (Clearly, issues such as consistency of the orientations of the various surface patches corresponding to the intersection of the two sets of invariants need to be taken into account, but methods for doing so escape the scope of our discussion.)

To demonstrate this process, a specific problem for which structural data is publicly available has been selected. The ligand-receptor complex is the one corresponding to HIV's reverse transcriptase enzyme and the transcriptase inhibitor drug Nevirapine: the enzyme is the receptor and the inhibitor is the ligand. The Nevirapine molecule is in the conformation with which it interacts (i.e. binds to) the receptor. Carrying out the above-described process surface patches were identified on the surfaces of Nevirapine and the receptor site of the enzyme. As prescribed, affine invariants were generated for the two sets of surface patches and used to make entries. The buckets in which entries were made have been marked using two different shades of gray for the receptor (2610) and the ligand (2620) and shown in FIG. 26. As is clear, the two sets have as expected a considerable intersection indicating the fact that they interact with (bind to) one another. Evidently, the outlined approach is a potentially very useful method for determining the possibility of interaction between a receptor and a candidate ligand. Also, the outlined approach is computationally very efficient since it only necessitates the selection of the five-point sets on the various surfaces and the computation of the respective invariants. In the case where the ligand is in a conformation that is different than its binding one, the above described process can be augmented by a conformer-generation mechanism that will sample through the ligand's conformations checking for each one of them the intersections of the two sets of invariants. It is believed however that because of the use of local surface patches the process will provide sufficient indication of whether interaction is possible even if the ligand is in a different conformation.

A disclosure of a related invention that applies to a two-dimensional variation of this invention is disclosed in U.S. patent application Ser. No. 08/787,658, entitled "TWO-DIMENSIONAL AFFINE-INVARIANT HASHING DEFINED OVER ANY TWO-DIMENSIONAL CONVEX DOMAIN AND PRODUCING UNIFORMLY-DISTRIBUTED HASH KEYS" to Rigoutsos filed on the same day as this application and which is herein incorporated by reference in its entirety.

Given this disclosure, equivalent embodiments of this invention would become apparent to one skilled in the art. These embodiments are also within the contemplation of the inventor.

I claim:

1. A computer system of one or more processors for producing a uniform distribution of affine invariants for a plurality of one or more objects, comprising:

a database of one or more objects, each of the objects identified by a set of three-dimensional object points, the set of three-dimensional object points uniformly selected from an object feature domain, each of the objects further capable of being transformed through zero or more affine transformations, the database being stored in one or more memories that are accessible by the processors;

one or more five-point tuples of five object points, four of the points in the five-point tuple being non-coplanar and dividing the object feature domain into fifteen regions, the fifth point of the five-point tuple being in one of the fifteen regions, and defining one of two types of polyhedral arrangement of the five-point tuple that include a non reentrant polyhedral (NRP) arrangement and a reentrant polyhedral (RP) arrangement, five of the fifteen possible regions corresponding to the RP arrangements and the remaining ten of the regions corresponding to the NRP arrangements;

a transformer for representing each of the five-point tuples by a 3-tuple that is invariant under any of the affine transformations, the transformer producing a range of invariants for all arrangements of the five-point-tuples, a tagger that identifies each of the five-point tuples as having one of the fifteen region arrangements and one of the two types of the polyhedral arrangements; and an equalizer, executing on one or more of the processors, that creates a remapping for the 3-tuples corresponding to each of the fifteen region arrangements by redistributing a plurality of the 3-tuples to produce a new distribution that is uniform over the range of invariants, the redistributing determined by the region arrangement and the polyhedral arrangement of the five-point tuple as identified by the tagger.

2. A system, as in claim 1, further comprising a stacker that stacks the new distributions to produce a uniform distribution for all the affine invariants produced by the transformer.

3. A system, as in claim 1, further comprising a table having a plurality of records, each record having an index defined by the invariant 3-tuple, one or more information fields, each information field identifying one of the objects from which the invariant 3-tuple was generated and all of the objects from which the invariant 3-tuple was generated being in one or more of the information fields, where the number of information fields is the same for all of the records within a tolerance.

4. A system, as in claim 3, further comprising a loader, that loads each of the processors with part of the records so that the burden induced on each of the processors by a task that operates on the table is balanced.

5. A system, as in claim 1, where the object points are uniformly selected from the object feature domain, the domain being any one of the following: a convex polyhedron (e.g. cube, parallelepiped, etc.), a sphere, and a ellipsoid.

6. A system, as in claim 1, where the polyhedral arrangement is RP and the equalizer redistributes the 3-tuples by moving each 3-tuple from an original location to a new location that is dependent on the original location of the 3-tuple.

7. A system, as in claim 6, where the new location (u',v',w') is given by $$u'=v/(u+v)$$
$$v'=(w^2+2w(u+v))/((u+v+w)^2$$
$$w'=(u+v+w)^3$$

where u is the original u-coordinate, v is the original v-coordinate, and w is the original w-coordinate.

8. A system, as in claim 6, where the new location of some of the 3-tuples is derived from the original location of the respective 3-tuple via reflection.

9. A system, as in claim 1, where the polyhedral arrangement is NRP and the equalizer redistributes the 3-tuples by moving each 3-tuple from an original location to a new location that is dependent on the original location of the 3-tuple.

10. A system, as in claim 9, where the object feature domain is a cube and the redistribution can be approximated by:

$$u'=(0.00625+0.2\ (u-0.5)^5)a_1+(0.41666+0.33333(u-0.5)^3)(a_4+ \\ 0.08333(a_7+a_8))+(0.00625+0.01250\ (u-0.5))(150.60800+a_2+ \\ a_3+6.66666(a_5+a_6)+0.55555\ a_9)$$

$$v'=(0.00625+0.2(v-0.5)^5)a_2+(0.41666+0.33333(v-0.5)^3)(a_5+ \\ 0.08333(a_7+a_9))+(0.00625+0.01250(v-0.5))(150.60800+a_1+a_3+ \\ 6.66666(a_4+a_6)+0.55555\ a_8)\qquad 14$$

$$w'=(0.00625+0.2\ (w-0.5)^5)a_3+(0.41666+0.33333(w-0.5)^3)(a_6+ \\ 0.08333(a_8+a_9))+(0.00625+0.01250(w-0.5))(150.60800+a_1+a_2+ \\ 6.66666\ (a_4+a_5)+0.55555\ a_7).$$

11. A system, as in claim 1, where the object is a three dimensional representation.

12. A system, as in claim 11, where the three-dimensional representation is any one of the following: a three-dimensional curve, a surface patch, depth measurements, range data, and any collection of three-dimensional points.

13. A method for producing a set of 3-tuple affine invariants with a range, the affine invariants being distributed over the range, comprising the steps of:
   a. providing a set of three-dimensional object points that describe an object feature domain of an object in an object set of one or more objects, the object points being uniformly distributed over a convex domain, each of the objects being capable of being transformed through one or more affine transformations;
   b. selecting one or more five-point sets from the set of three-dimensional object points to generate one or more five-point-tuples, each of the five-point tuples dividing the object feature domain into a region arrangement with fifteen regions, the fifteen regions defined by the five-point tuple as one of five reentrant polyhedral arrangements and one of ten non-reentrant polyhedral arrangements;
   c. transforming each of the five-point tuples by affine transformation to produce a 3-tuple affine invariant representing each of the five-point-tuples;
   d. tagging each of the five-point tuples as having one of the fifteen regions and one of any of the reentrant and non-reentrant polyhedral arrangements; and
   e. remapping the 3-tuple affine invariants corresponding to each of the fifteen regions by redistributing all of the 3-tuple affine invariants to produce a new distribution of 3-tuple affine invariants that is uniform within tolerance over the range, the redistributing determined by the region arrangement and the polyhedral arrangement of the respective five-point-tuple to cause a frequency of occurrence of each of the new 3-tuple affine invariants to be the same within a tolerance.

14. A method, as in claim 13, further comprising the step of:
   f. stacking all the new distributions to produce a uniform within the tolerance distribution for all the new affine invariants.

15. A method for storing three-dimensional objects in a database, comprising the steps of:
   a. selecting an object from the set of objects;
   b. identifying a set of feature points in the selected object;
   c. producing one or more sets of five-point tuples from the set of identified features, each of the five-point tuples dividing the object feature domain into a region arrangement with fifteen regions, the fifteen regions defined by the five-point tuple as one of five reentrant polyhedral arrangements and one of ten non-reentrant polyhedral arrangements;
   d. transforming each of the five-point tuples by affine transformation to produce a 3-tuple affine invariant representing each of the five-point-tuples;
   e. tagging each of the five-point tuples as having one of the fifteen regions and one of any of the reentrant and non-reentrant polyhedral arrangements; and
   f. generating a new 3-tuple affine invariant corresponding to each of the fifteen regions by repositioning the 3-tuple affine invariant to produce a new distribution of 3-tuple affine invariants that is uniform within a tolerance over the range;
   g. associating and storing the new 3-tuple affine invariant with the respective five-point tuple from which the new 3-tuple affine invariant was generated.

16. A method, as in claim 15, further comprising the steps of:
   h. establishing a predicate about the database based on the labeling of one or more selected new 3-tuple affine invariants.

17. A method, as in claim 15, further comprising the steps of:
   h. qualitatively assessing information about one or more of the objects in the database by examining the size of the tolerance and one or more locations where deviations occur.

18. A method, as in claim 15, where the three-dimensional objects include any one of the following: a three-dimensional curve, a surface patch, depth measurements, range data, and any collection of three-dimensional points.

19. A method for accessing one or more three-dimensional objects from a database, using a query set of one or more objects, the method comprising the steps of:
   a. selecting an object from the query set of objects;
   b. identifying a set of feature points in the selected object;
   c. producing one or more sets of five-point tuples from the set of identified features, each of the five-point tuples dividing the object feature domain into a region arrangement with fifteen regions, the fifteen regions defined by the five-point tuple as one of five reentrant polyhedral arrangements and one of ten non-reentrant polyhedral arrangements;
   d. transforming each of the five-point tuples by affine transformation to produce a 3-tuple affine invariant representing each of the five-point-tuples;
   e. tagging each of the five-point tuples as having one of the fifteen regions and one of any of the reentrant and non-reentrant polyhedral arrangements; and
   f. generating a new 3-tuple affine invariant corresponding to each of the fifteen regions by repositioning the 3-tuple affine invariant to produce a new distribution of 3-tuple affine invariants that is uniform within tolerance over the range;
   g. using the new 3-tuple affine invariant to access a memory containing a plurality of associations between one or more stored 3-tuple affine invariants and respective information about one or more stored objects.

20. A method, as in claim 19, where the three-dimensional objects include any one of the following: a three-dimensional curve, a surface patch, depth measurements, range data, and any collection of three-dimensional points.

21. A computer system of one or more processors for producing a distribution of affine invariants for a plurality of one or more objects, comprising:

a database means for storing one or more objects, each of the objects identified by a set of three-dimensional object points, the set of three-dimensional object points uniformly selected from an object feature domain, each of the objects further capable of being transformed through zero or more affine transformations, the database being stored in one or more memories that are accessible by the processors;

one or more five-point tuple means of five object points for representing one or more object features, four of the points in the five-point tuple being non coplanar and dividing the object feature domain into fifteen regions, the fifth point of the five-point tuple being in one of the fifteen regions, and defining one of two types of polyhedral arrangement of the five-point tuple that include a reentrant polyhedral (RP) arrangement and a non-reentrant polyhedral (NRP) arrangement, five of the fifteen possible regions corresponding to the RP arrangements and the remaining ten of the regions corresponding to the NRP arrangements;

a transformer means for representing each of the five-point tuples by a 3-tuple that is invariant under any of the affine transformations, the transformer producing a range of invariants for all arrangements of the five-point-tuples;

a tagger means for identifying each of the five-point tuples as having one of the fifteen region arrangements and one of the two types of the polyhedral arrangements; and an equalizer means, executing on one or more of the processors, for creating a remapping for the 3-tuples corresponding to each of the fifteen region arrangements by redistributing all of the 3-tuples to produce a new distribution that is uniform over the range of invariants, the redistributing determined by the region arrangement and the polyhedral arrangement of the five-point tuple as identified by the tagger.

* * * * *